(12) United States Patent
Hyman

(10) Patent No.: US 9,744,800 B2
(45) Date of Patent: *Aug. 29, 2017

(54) COMPOSITIONS AND IMAGE MAKING MEDIUMS

(71) Applicant: Sydney Hyman, New York, NY (US)

(72) Inventor: Sydney Hyman, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/203,327

(22) Filed: Mar. 10, 2014

(65) Prior Publication Data

US 2014/0186646 A1 Jul. 3, 2014

Related U.S. Application Data

(63) Continuation-in-part of application No. 10/170,503, filed on Jun. 14, 2002, now Pat. No. 7,629,400, which is a continuation of application No. 10/012,259, filed on Dec. 11, 2001, now abandoned, which is a continuation-in-part of application No. PCT/US00/16111, filed on Jun. 12, 2000, application No. 14/203,327, which is a continuation-in-part of application No. 11/118,975, filed on Apr. 28, 2005, now Pat. No. 8,921,473.

(60) Provisional application No. 60/138,694, filed on Jun. 11, 1999, provisional application No. 60/567,022, filed on Apr. 30, 2004.

(51) Int. Cl.

| | |
|---|---|
| *B41M 1/30* | (2006.01) |
| *B44C 5/00* | (2006.01) |
| *B41M 5/36* | (2006.01) |
| *B44C 3/04* | (2006.01) |
| *C08K 5/00* | (2006.01) |
| *B44D 3/18* | (2006.01) |
| *B44F 1/00* | (2006.01) |
| *B41M 5/26* | (2006.01) |

(52) U.S. Cl.
CPC ............ *B44C 5/00* (2013.01); *B41M 5/36* (2013.01); *B44C 3/046* (2013.01); *B44C 3/048* (2013.01); *B44D 3/18* (2013.01); *B44F 1/00* (2013.01); *C08K 5/005* (2013.01); *B41M 5/26* (2013.01); *B41M 5/267* (2013.01)

(58) Field of Classification Search
CPC .......... B41M 1/30; B41M 5/36; B44C 3/046; B44C 3/048
USPC ............ 524/106, 609, 612; 428/15, 80, 174
See application file for complete search history.

(56) References Cited

U.S. PATENT DOCUMENTS

| | | | |
|---|---|---|---|
| 3,424,714 A | 1/1969 | Anspon et al. | 260/45.95 |
| 3,700,754 A | 10/1972 | Schmitt et al. | 260/878 R |
| 3,775,560 A * | 11/1973 | Ebeling et al. | 178/18.09 |
| 3,911,560 A * | 10/1975 | Amelio et al. | 438/144 |
| 4,320,174 A | 3/1982 | Rabinovitch et al. | 428/518 |
| 4,551,493 A | 11/1985 | Blinne et al. | 524/89 |
| 4,578,294 A | 3/1986 | Ouchi et al. | 428/35 |
| 4,935,275 A | 6/1990 | Ushida et al. | 428/31 |
| 5,102,597 A | 4/1992 | Roe et al. | 264/126 |
| 5,241,006 A | 8/1993 | Iqbal et al. | 525/196 |
| 5,461,114 A | 10/1995 | Kita | 525/216 |
| 5,512,620 A | 4/1996 | van Hout et al. | 524/84 |
| 5,523,167 A | 6/1996 | Hunt et al. | 428/484 |
| 5,532,053 A | 7/1996 | Mueller | 428/287 |
| 5,674,579 A | 10/1997 | Ladouce et al. | 428/35.7 |
| 5,700,894 A | 12/1997 | Krieg et al. | 526/323.2 |
| 5,725,990 A | 3/1998 | Hirai et al. | 430/203 |
| 5,859,141 A | 1/1999 | Tsubaki et al. | 525/218 |
| 6,214,422 B1 | 4/2001 | Yializis | 427/488 |
| 6,248,457 B1 | 6/2001 | Chen et al. | 428/690 |
| 2003/0008135 A1 | 1/2003 | Kawamura et al. | 428/336 |
| 2006/0255952 A1 | 11/2006 | Waegner | 340/572.8 |

FOREIGN PATENT DOCUMENTS

| | | |
|---|---|---|
| DE | 195 22 118 C1 | 3/1997 |
| EP | 0 120 296 B1 | 6/1986 |
| EP | 0827 981 A2 | 3/1998 |
| EP | 0 921 160 A1 | 6/1999 |
| GB | 974111 | 11/1964 |
| WO | WO 91/16143 | 10/1991 |

* cited by examiner

*Primary Examiner* — Edward Cain
(74) *Attorney, Agent, or Firm* — Winston & Strawn LLP

(57) ABSTRACT

The invention relates to compositions for forming two and three-dimensional artwork, pictures, works of design and architectural works that are interactive, responsive or able to change. These compositions can include at least one nanomaterial. They can include a light emitter that is one or a combination of: an OLED; a light-emitting display screen that is partially or entirely transparent or translucent; a light-emitting display screen capable of flexing or folding; or a thin light-emitting display screen. In different embodiments, the composition includes electronic paper; a visible tangible transparent or translucent form or display capable of aesthetic change; a visible interactive or responsive intangible hologram; or an organic transistor, a transparent transistor, an organic light-emitting transistor (OLET) or a transistor that is a combination of these; or a conductive polymer. Aesthetic works of the invention are created, developed, changed, reworked or recreated interactively, in a responsive process, repeatedly or continuously.

69 Claims, No Drawings

US 9,744,800 B2

COMPOSITIONS AND IMAGE MAKING MEDIUMS

CROSS-REFERENCE TO RELATED APPLICATIONS

This application is a continuation-in-part of (1) application Ser. No. 10/170,503 filed Jun. 14, 2002, now U.S. Pat. No. 7,29,400, which is a continuation of application Ser. No. 10/012,259, filed Dec. 11, 2001, which is a continuation-in-part of PCT Application No. PCT/US/00/16111, filed Jun. 12, 2000, which claims the benefit of Provisional Application No. 60/138,694, filed Jun. 11, 1999; and (2) application Ser. No. 11/118,975 filed Apr. 28, 2005, which claims the benefit of Provisional Application 60/567,022 filed Apr. 30, 2004. The content of each prior application is expressly incorporated herein by reference thereto.

FIELD OF INVENTION

The present invention relates to a medium for making art, design and architecture, a process for making the medium, and methods for using the medium to make art, design and architecture. Image-making support mediums of the present invention and art, design and architecture of the present invention are macroscopic works that are two or three dimensional, made with a means that enables them to be interactive, to be interactive and responsive, and/or to change.

BACKGROUND OF THE INVENTION

New mediums and new processes, and modifications of conventional mediums and processes often expand the use of formal elements thereby making the creation of new images possible, and enabling ideas to be realized in images that previously could not be achieved. Consequently, for thousands of years those making images of art, design, and architecture and those working with them have focused an enormous amount of work on image making mediums and processes, particularly on mediums and processes that were unconventional at the time. Science and cutting edge science has played a major role in this endeavor. Image makers are today deeply involved in exploring all kinds of areas of science in order to develop art, design and architecture; in order to use the formal elements in new ways; in order to realize their ideas e.g., without compromising; and in order to expand and innovate art, design and architecture. The present invention is part of this mainstream current of image making that is tied to science.

The present invention combines art, design and architecture with science as never before. Prior to this invention, the use of polymers in images was limited and problematic, (e.g., refer to US Patent Application 20030035917-A1). By taking advantage of a wide range of polymers, and using them with a wide range of other, unconventional and novel materials, processes, and advances on the frontiers of science, the present invention expands the formal elements available for making images considerably. This invention offers very desirable new mediums and processes for making images as well as novel variations of conventional image making mediums and processes, both of which have many variations. Examples are new polymeric compositions; polymers that change in response to stimulants like electricity or light; smart materials; e-materials like electronic paper; processes for these; as well as nanomaterials and nanotechnology which can enhance and impart remarkable properties or formal elements to inventive images. These can expand the use of light, space, transparency, form, structure, strength, conductivity, devices, visual effects, interactivity, and/or permanence of inventive images to such an extent that a wide range of new images can be created, some of which will be strikingly different from art, design and architecture made prior to this invention. By opening the horizon for image making, this invention will expand the variety of new images that will exist. Refer to further description in US Patent Application 20030035917-A1.

SUMMARY OF THE INVENTION

The invention relates to compositions for making images, art, design and architecture, and methods for making these compositions. These compositions are preferably in the form of a synthetic fine-artist's image-making canvas support medium that is a new reinvented version of the conventional utilitarian fine artist's canvas, wherein this new reinvented canvas support medium facilitates the creation of art, design or architecture therewith, thereupon or therefrom, sometimes referred to herein as an image. The invention also relates to a method for preparing the image-making support medium, and to the art, design and architecture created.

Image-making support mediums of the present invention and art, design and architecture of the present invention are macroscopic works that are two or three dimensional. They are made with a means that enables them to be interactive, to be interactive and responsive, and/or to change.

In embodiments, such works might be made with at least one nanomaterial. In different embodiments, such works might be made with a light emitter that is one or a combination of: an organic light emitting diode (OLED); a light-emitting display screen that is partially or entirely transparent or translucent; a light-emitting display screen capable of flexing or folding; or a light-emitting display screen that is approximately about 6 mm thick or thinner.

In different embodiments such works might be made with electronic paper or an e-material. Or such works might be made with a visible tangible transparent or translucent form or display capable of aesthetic change that is independent of any separate light source that may be part of the work.

In embodiments works of the present invention might be made with a visible interactive or responsive intangible hologram. They might be made with an organic transistor, a transparent transistor, an organic light-emitting transistor (OLET) or a transistor that is a combination of these. They might be made with a conductive polymer. Or they might be made with a combination of any of these, or with any of these and another variation such as a visible aesthetic element.

In different embodiments aesthetic works of the present invention might be developed, changed, reworked and/or recreated interactively, or interactively using a responsive process. For example, works of the present invention might change visibly in part or entirely, in response to movement, gesture, light, sound, a trigger, a stimulant or an influence. Works of the present invention made according to different embodiments, might also be partially or entirely: transparent, translucent, opaque, rigid, flexible, planar, showing subject matter pertaining to light and/or nature, light emissive, with a visible light effect, emissive of sound, made with two or more parts that are physically connected or separate, and/or with any of countless visible aesthetic variations.

DETAILED DESCRIPTION OF THE INVENTION

The present invention provides a medium for a work in progress or an image of art or design that can be formed, reworked, and controlled as desired. The inventive medium, a polymeric composition, is prepared by polymerizing one or more monomers to form at least one polymer in an amount sufficient to provide or enable the image to have at least one aesthetic element. Preferably, the inventive medium comprises a polymeric material with one or more of these properties: (a) transparency and/or translucency, (b) other desired optical properties, (c) strength, stability, and/or permanence, (d) it is conductive, (e) it enables the further processing desired, (f) it provides or enables the image to have another aesthetic or structural element, or (g) a combination of these.

This application expressly incorporates herein by reference thereto the entire disclosure of U.S. non-provisional application Ser. No. 10/170,503, filed Jun. 14, 2002, and published as 20030035917-A1 on Feb. 20, 2004 and unpublished application Ser. No. 11/118,975 filed Apr. 28, 2005. In particular, all of the drawing figures (Figs.) described herein are inventive images based on the drawings of application 20030035917-A1. Despite that they form part of the present application, the drawings are omitted here for convenience, because they are available from public sources such as the PTO website (www.USPTO.gov) in published and downloadable documents.

Any definitions used herein that are not explicitly defined can be found in application Ser. No. 10/170,503 or 11/118,975 and are incorporated herein by reference The term "stabilizer" as used herein, refers to any object, compound, component, or action that imparts chemical, mechanical, or dimensional stability to an item, either directly or indirectly, through initiation of one or a series of events or intermediate steps, in the formation of an image. Stabilizers include processing aids, as well as materials that reduce or eliminate changes to a polymer image after it has been formed. Moreover, an inventive image may have more than one stabilizer, which may be similar or different. Often a single stabilizer affects more than one property in cPRM or in the polymer. Typically, the stabilizer includes less than about 40% by volume of the total volume an image.

One class of stabilizers that are particularly useful in the present invention are color stabilizers, such as those that reduce or eliminate discoloration of polymers. Examples are ultra violet light stabilizers, ultra violet light absorbers, and hindered amine light stabilizers (HALS).

Other useful stabilizers are ingredients added to cPRM i) to cause surfaces of the cPRM exposed to air during the polymerization reaction to form smooth surfaces; or ii) to promote the complete curing of the cPRM. When added to cPRM, wax or mixtures containing wax (such as SILMAR®'s A-111, mixtures of monomers and wax, encaustic paints, other conventional painting media with wax ingredients, and mixtures of wax and a solvent) are examples of stabilizers that can fulfill both of these functions. Compositions superimposed upon incompletely cured polymer surfaces that further cure or fully cure them are stabilizers. Methyl ethyl ketone peroxide (MEKP) can function as such a stabilizer.

Still further useful stabilizers include layers and parts that strengthen, reinforce, support, or enhance the support of an inventive image, such as layers and parts that enhance an image's strength, its stability, its form, or its structure, e.g., so that the image can be set up, installed or displayed for viewing. These layers or parts are on or in the polymer in an inventive image. Though some of these stabilizers are non polymeric, it is preferable that many stabilizers in this class be polymeric. Also, it is often desirable that inventive images with these strengthening stabilizers have one or more additional, different stabilizers, such as a stabilizer that preserves the color stability of the polymer or a processing aid stabilizer, depending on the specifications of individual inventive images. Examples of these strengthening stabilizers follow.

(a) Fiber, such as fiberglass like surfacing veil fiberglass, and fabric fibers. It is preferred that transparent or translucent conventional fabric (such as shims) that, to the unaided human eye does not have an open weave, that is superimposed by transparent or translucent cPRM that becomes discolored (e.g., yellow or amber discoloration of a polymer caused by exposure to ultra violet light that appears within 3 years of the polymer's formation) is not used.

(b) The new unique means of installation and display described herein are in this class of stabilizers, such as the new rigid mount system, the new wire mount system, and the new combination rigid and wire mount system described herein;

(c) Other members of this class of stabilizers are types of 2D and 3D image supports used on or in a polymer in inventive images. It is often preferable that these stabilizers be polymeric. Among the many variations of these stabilizers are some of the examples which follow on this list;

(d) rigid layers or parts on or in the polymer that strengthen the polymer;

(e) layers including a strong polymer such as a cross linked polymer on or in a polymer in an inventive image that is less strong, the use of which makes the image stronger, more stabile, function more effectively, or more permanent;

(f) layers or parts on or in the polymer, that are or that function as backings, frames, stretchers, crossbars, reinforcing ribs or struts, lead lines (e.g., as in glass works), mats, and frameworks used to reinforce and strengthen conventional images;

(g) a layer or part (such as a substrate, an internal layer, or an external layer) that provides or enhances the support of a polymer part or layer which in its use in an inventive image, is weak or not strong, fragile, flexible, delicate, brittle, gelatinous or somewhat gelatinous, or at risk to change over time in form, structure or surface, such as a substrate supporting a conductive polymer or an absorbent polymer in an inventive image, or a rigid part that enhances the structure of flexible polymer in an inventive image;

(h) more than one of these examples (a)-(g) used on or in a single inventive image;

(i) a strengthening stabilizer with a form that is a combination of two or more of the forms described in examples (a)-(g) used in and/or on an inventive image.

Other types of stabilizers that are useful in the present invention include moisture scavengers; antioxidants (such as 2,6-di-tert-butyl-4-methylphenol as well as CYANOX® antioxidants by Cytec Industries Inc.; WESTON® and ULTRANOX® antioxidants by General Electric Company; and IRGANOX® LC Blends by Ciba Geigy); materials that remove bubbles from and/or defoam cPRM (such as BYK®-A 555 by Byk Chemie); antiozonants (such as Santoflex 1350PD by Flexsys America LP); leveling agents (such as wax or mixtures containing wax, as well as leveling agents marketed by Byk Chemie); optical brighteners and other compositions that absorb ultraviolet light and fluoresce in the visible blue spectrum (such as UVITEX® OB by Ciba Geigy); cPRM viscosity modifiers and associative thickeners (such as AEROSIL® by Degussa Corp.); and polymerization regulators for example, inhibitors (such as free radical inhibitors).

Other stabilizers protect polymer inventive images or parts thereof against changes in physical properties, or enhance physical or mechanical properties, dimensional stability, or heat resistance of polymer inventive images. Examples are stabilizers that enhance the physical or mechanical properties or the dimensional stability of absorbent polymers, such as ingredients used in absorbent polymers and in cPRM forming absorbent polymers that make them less gelatinous, stronger, or more solid. Other examples are stabilizers for use in inventive images that protect polymers or parts thereof (such as their surfaces) against delamination, peeling, chalking (e.g., pigment washes or rubs off), other reduced adhesion of the primer or top coat, cracking, checking, the loss of coating integrity, loss of surface gloss, loss of surface distinctness, loss of visual depth, or other surface degradation (such as HALS by Ciba-Geigy). There are stabilizers that affect mar resistance, surface slip, or surface flow (such as products by Byk Chemie and by Tego Chemie). There are impact modifier stabilizers (such as METABLEN® products by Elf Atochem); stabilizers that are plasticizers or that maintain or enhance polymer flexibility (such as dibutyl phthalate); and stabilizers that maintain or enhance the hardness of polymers or parts thereof. There are stabilizers that inhibit or protect against organic corrosion in polymers or deactivate metal (such as IRGACOR® by Ciba Geigy). There are thermal and heat stabilizers both for processing polymers and for protecting formed polymers (such as THERMOLITE® by Elf Atochem North America Inc., in Philadelphia, Pa.). There are stabilizers used in cPRM to control shrinkage as it cures (such as milled fibers). An ingredient added to polymerization reaction mixture or to a polymer to modify the polymer's absorbency is also a stabilizer.

The formation of some polymers typically requires certain stabilizers. For example, specific stabilizers are typically required for the formation of conductive polymers such as those conductive polymers that emit light. Both the process of doping or treating a polymer so that it becomes conductive or more conductive, and the dopant or agent used in such processes are stabilizers. For example, a polymer might be doped so that electrons are removed such as through oxidation (e.g., with chlorine, bromine, or iodine vapor) or so that electrons are introduced such as through reductive doping (e.g., with an alkali metal). Energy conducted by a conductive polymer is a stabilizer in any form, as is the form or device that can supply or carry that energy. Used with a conductive polymer in an inventive image, electrical current, solar power or another form of energy, a battery, and wires that carry energy to a conductive polymer are stabilizers. Moreover, spin casting processes and printing processes (such as ink jet printing) used to apply conductive polymers to image supports, other inventive image surfaces, or parts thereof, are also stabilizers. Stabilizers aid in processing polymers using conventional practices, e.g., affecting melt flow, lubricating, overcoming notch sensitivity (such as BLENDEX® Modifier Resins by General Electric Company and IRGANOX® HP products by Ciba Geigy).

In some embodiments, PRM is radiation cured, for instance, by the use of ultraviolet light or nearby blue light, or by electron beam (EB). Radiation that initiates or aids polymerization is a stabilizer. Thus, for example, visible light is a stabilizer with the photoinitiator camphoriquinone.

One or more ingredients that enable the formation or fortification of the bond between the polymer inventive image and at least one superimposed application or colorant are stabilizers. When mixed into cPRM typically in amounts of about 0.4% to 40% by volume of the total volume of the cPRM, conventional paints, sizes, primers, binders used in conventional image making media and materials, conventional media for painting, absorbent polymers, cPRM or PRM that forms absorbent polymers, and wax and compositions containing wax, can be stabilizers if they enable the formation or fortification of the bond between the polymer and one or more superimpositions made upon it. Examples of such stabilizers are conventional oil and acrylic paints and painting media.

The use of opposing charges can also enable the formation or fortification of a bond. Thus, the use of a negatively or a positively charged monomer stabilizer in a neutral cPRM can enable the formation or fortification of a bond between the polymer formed and an oppositely charged superimposed application, such as a paint, an ink, or another colorant. Such negatively or positively charged monomer stabilizers are preferably used in a neutral cPRM at about 0.4% to 40% (by volume), preferably at about 0.5% to 10%, and more preferably at about 0.5% to 6%. Adhesion promoters such as products made to promote the adhesion of a polymer to a substrate, may also be used as stabilizers in inventive images, such as adhesion resins by Creanova Inc.

Other stabilizers are ingredients added to applications made on polymer inventive images, typically in amounts from about 0.4% to 40%, by volume, but more preferably in amounts from about 0.4% to 25%, by volume of the application's total volume, (i) to cause or enhance the bond between that application and the polymer inventive image; or (ii) to further cure or fully cure the polymer inventive image onto which it is applied. Examples of such stabilizers are cPRM, solvents appropriate for the linear polymer surfaces they are superimposed upon, MEKP, photoinitiators, and other catalysts. Such stabilizers might be mixed into applications, for instance into a conventional image making material or medium (such as a conventional paint, a painting medium or paper pulp); into an unconventional image making material or medium; or into a glue or adhesive.

Surface preparation stabilizers are preferred stabilizers. A single inventive image may have one or more surface preparation stabilizers. The formula, y–about 40=about 0.786x, is a preferred linear relationship between "x", the approximate percentage of polymer in the inventive image's surface preparation stabilizers (by volume), and "y", the approximate maximum percentage of surface preparation stabilizer in the inventive image's total volume. Thus, for example, if there is no polymer in the surface preparation stabilizer in an inventive image, this stabilizer includes less than about 40% of the inventive image's total volume. If an inventive image's surface preparation stabilizer is made of about 35% or more polymer, it includes less than about 67.5% of the inventive image's total volume. If an inventive image's surface preparation stabilizer is made of about 70% or more polymer, it includes less than about 95% of the inventive image's total volume.

One kind of surface preparation stabilizer is a composition on the surface of an inventive image or part thereof that (i) causes or enhances bonding to one or more superimpositions; or (ii) functions as an underlayer for further processing by additive or subtractive processes (e.g., as a primer, as underpainting, as underdrawing, as a ground, or as an imprimatura). In completed inventive images, surface preparation stabilizers are at least in part superimposed by one or more compositions that are different from the surfaces they superimpose or different from the polymer beneath the surfaces they superimpose. In addition, or alternately, in completed inventive images, surface preparation stabilizers are at least partially carved, incised, or both. Such surface preparation stabilizers are typically made using polymers that may be carved or incised effectively, e.g., they used on image surfaces that cannot be carved or incised as effectively. Surface preparation stabilizers might contribute to inventive images aesthetically or structurally prior to further processing them.

Surface preparation stabilizers and the surfaces or image supports they are used upon may or may not be made or entirely made of polymers of the present invention. Surface preparation stabilizers may be continuous or discontinuous on part or all of one or more inventive image surfaces. For example, a surface preparation stabilizer on a polymer inventive image might be an imprimatura made of a composition that is not a conventional paint, serving as an intermediary enabling a superimposed conventional paint to bond to that polymer that might not have bonded or bonded as strongly to that polymer had it been applied directly onto its surface. The same surface preparation stabilizer or a different one might enable an inventive image to have a carved or incised drawing, pattern, or texture. Depending on their use in an inventive image, one or more conventional image making materials, media, or both may serve as a surface preparation stabilizer, such as conventional paints, binders, primers, etc. A mixed polymer may be a surface preparation stabilizer. Bonding spots and Separating Layers can be surface preparation stabilizers. Separating Layers may have surface preparation stabilizers on them.

Another kind of surface preparation stabilizer is SSI on a polymer inventive image surface. Whether they are continuous or discontinuous on a polymer surface, SSI are a surface preparation stabilizer, provided they are partially or entirely, yet directly superimposed by: (i) a conventional image making medium (such as paint, ink, pencil, pastel, chalk, pen, crayon, a photographic emulsion, printing, another marker); (ii) a colorant with an unconventional vehicle (such as a paint made with cPRM as its binder); (iii) a conventional or an unconventional underlayer (such as underdrawing, underpainting, a primer, an imprimatura or a ground); or (iv) a combination of these. Thus, for example, SSI superimposed by media or materials for the sole purpose of bonding are not stabilizers, and SSI superimposed by protective coatings, fixatives, or sealers are not stabilizers.

Image support stabilizers are both a class of stabilizers and a type of image support. Image support stabilizers are either made to bond to at least one superimposition (such as a paint or ink). Or image support stabilizers are comprised of a polymer composition which by its formulation or design, works well with one or more subtractive processes (such as cutting, carving, or incising). For example, polymers made for subtractive processes involving the use of tools that would be ineffective on linear polymer surfaces would typically be made of crosslinked polymer formulations (e.g., tools that heat up as they are used so that their bits or blades get clogged by the linear polymer). Image supports made of greater than about 85% (by volume) polymethyl methacrylate or methyl methacrylate, which are exact, even geometric shapes or forms (like conventional preformed acrylic sheets, rods, cubes, or spheres) and which are preferably transparent or translucent, are typically not image support stabilizers, unless for example, they have surface preparation stabilizers on them made of a different composition (preferably polymeric) in which case they might be image support stabilizers. Also, conventional polymer image supports in the form of sheets and films that are preferably transparent or translucent, are typically not image support stabilizers, (e.g., acetate, MYLAR® and vinyl have all been made into images by cutting), unless for example, they have surface preparation stabilizers on them made of a different composition (preferably polymeric) in which case they might be image support stabilizers.

One kind of image support stabilizer includes at least one polymer that is a transparent polymer or a synthetic translucent polymer. Typically, the volume of these image support stabilizers has a percentage of transparent or synthetic translucent polymer that is at least about 51%, preferably at least about 55%, more preferably, at least about 65%, still more preferably at least about 75%, and most preferably at least about 85%, in different embodiments. Another kind of image support stabilizer includes at least one polymer that is a synthetic absorbent polymer or a conductive polymer. Yet another kind of image support stabilizer includes a surface preparation stabilizer superimposed on at least a substantial portion of at least one surface of an image support.

Separating layer stabilizers are another kind of image support stabilizer. These are substantially planar polymer layers that are at least partially transparent or translucent. The two, planar, opposite sides of a separating layer stabilizer are made to separate superimposed applications, other colorants, carving, incising, or other marking. Thus, for example, separating layer stabilizers enable applications, other colorants, carving, incising, or other marking to be added to inventive images in unlimited layers, without having to be created directly on one another. Separating layer stabilizers may contain non polymeric ingredients, or other stabilizers. The compositions of applications or other colorants separated by a separating layer stabilizer must be different from that of the stabilizer, though they may be the same as one another. It is preferable that applications separated by a separating layer stabilizer be bonded to it. Conventional polymer image supports are typically not separating layer stabilizers without an additional stabilizer or additional polymer of the present invention (e.g., sheets and films of polyester, MYLAR®, acetate, and acrylic). As an example, in forming an inventive image, one or more separating layer stabilizers are used to separate layers of paint and incising. This separating layer stabilizer might, for example, be electrically active or comprised of a conductive polymer such as a polymer LED.

Image support stabilizers that are not separating layer stabilizers are typically the principal element in their inventive image's shape or form, and they typically remain so in the completed image. Of the completed inventive image's total volume, image support stabilizers typically comprise about 51% to 100%, preferably about 55% to 100%, more preferably about 65% to 100%, still more preferably about 70% to 100%, and most preferably about 75% to 100%, in different embodiments. Image support stabilizers which are not separating layer stabilizers are often part of their image's structure also. Among examples are image support stabilizers made using rigid polymers, and image support stabilizers made using flexible polymer, that may for example, be bonded to one or more other polymeric or non polymeric elements that provide structural support. An image support stabilizer may therefore be an inventive image's principal structural element, its entire structure, or almost its entire structure. In another example, flexible image support stabilizers can rely on another image part or on their method of installation or display for structural support to any degree, (e.g., a flexible image support might be draped over another image part or over a pedestal).

Image support stabilizers made to bond to at least one superimposition are typically, at least partially superimposed by at least one bonding composition that is different from their composition. Image support stabilizers made for further processing using a subtractive process are typically further processed as such. Image support stabilizers may be made of one or more polymers. If desired, image support stabilizers may have one or more other stabilizers as ingredients (e.g., they may have one or more fiber stabilizers, UV light stabilizers, doped conductive polymers, electrodes for conductive polymers, or surface preparation stabilizers). As an example, an inventive image support stabilizer might be a 2D or 3D transparent or translucent polymer form that bonds to a superimposed conventional paint, or that can be effectively incised or carved using a hand held tool. Typically, image support stabilizers that are not separating layer stabilizers do not have their function as the image's principal shape or form changed as they are processed.

It is preferable for image support stabilizers to be made with a percentage of one or more conventional polymer image supports or other conventional polymer image making media (e.g., conventional acrylic paints, gels, or sheets, or a conventional polymer film like acetate, MYLAR® or Denril made by Borden and Riley Paper Co. Inc. in Hollis N.Y.), which is up to about 60%, preferably up to about 55%, more preferably up to about 50%, still more preferably up to about 45%, still more preferably up to about 40%, still more preferably up to about 35%, still more preferably up to about 30%, and most preferably up to about 25%. Moreover, it is often desirable for image support stabilizers to be made without conventional polymer image supports or without other conventional polymer image making media with the exception of conventional polymer paints like acrylic paints. If the polymer in an image support stabilizer is comprised of a percentage (by volume) of one or more conventional polymer image making media that is preferably greater than the amounts listed above, then (a), (b) and/or (c) are typically preferable: (a) at least one stabilizer that is not an image support stabilizer (such as a fiber stabilizer, a color stabilizer like a UV light stabilizer, a doped conductive polymer, electrodes for a conductive polymer, or a defoamer stabilizer), is preferably added to the conventional polymer as part of the image support stabilizer; (b) the inventive image preferably has at least one other stabilizer that does not include conventional polymer image making media (in addition to this image support stabilizer), and/or (c) the image support stabilizer preferably also contains polymer of the present invention or the conventional polymer medium is not included in the calculation of the total polymer in the image support stabilizer.

In addition, it is generally preferable for an image support stabilizer to contain at least one stabilizer that is not an image support if the percentage (by volume) of one or more preformed conventional polymeric materials with exact, even geometric shapes or forms (like conventional polymer sheets, films, rods, bars, cubes, bowls, or spheres) used in the image support stabilizer is greater than about 65%, preferably greater than about 50%, more preferably greater than about 30%, still more preferably greater than about 18%, and most preferably greater than about 8%.

Underlayers, such as underpainting, underdrawing, grounds, imprimatura, primers and sizes, are one or more beginning or preparatory layers applied on an image surface with the intention that they will be partially or entirely superimposed (e.g., by painting), though they may remain visible or partially visible and contribute to its aesthetic. Both conventional underlayers and new and unique underlayers are used on inventive images. For example, surface preparation stabilizers, and separating layers (stabilizers) can be underlayers.

Inventive images are works in progress and images of art and design and include:

a) Images that are recognizable as one or more known forms of art or design, such as realistic, photorealist, abstract, geometric abstraction, surrealist, expressionist, minimalist, graffiti art, still life, figurative, portrait, landscape, modernist, folk art, primitive art, kitsch, shaped painting, installation, construction, painting, sculpture, mobile, print, photography, drawing, collage, assemblage, graphic art, architecture, furniture design, jewelry design, interior design, fashion design, product design, craft, set design, costume design, or a combination thereof.

b) Images that are recognized as art or design by a curator with proven expertise in contemporary art at an American museum of art which is accredited by the American Association of Museums or by an art scholar or an art critic with proven expertise in contemporary art.

c) Images that are original art or design.

d) Images that are interpretations, statements, expressions, or combinations of these.

e) Images that have an aesthetic that is at least minimally apparent.

f) Images that function as one or more known forms of art or design.

g) Images that are recognizable as creations by a specific individual, such as images recognizable as creations made in a specific circumstance or condition which are not ordinary circumstances or conditions.

h) Images made in limited editions, e.g., in an edition of one, preferably during their first 75 years of existence, in an edition of less than about 1500, more preferably less than about 500.

A typical process of the present invention involves the preparation of a 2D or 3D image by (i) preparing a mold or image support; (ii) preparing a PRM of one or more materials capable of forming a polymer, with other ingredients if desired; (iii) adding at least one catalyst to the PRM before or after it is put on the mold or image support; (iv) before or after the previous step or the step which follows, optionally adding at least one stabilizer to the PRM, to the cPRM (liquid or gelled), or to the polymer, (v) putting the PRM or the cPRM on at least one part of a mold or image support, made of polymer, wood, paper, stone, ceramic, metal, fabric, or glass. The inventive image making medium typically provides a shape or a form to the image.

Desirably, at least a part of an inventive image is transparent or translucent. It is typically desired that inventive images are permanent. For example, it is preferred that coloration of inventive images does not substantially change undesirably over time. For instance, over time changes such as a yellow or amber color develop on some polymers. To the extent that such changes or their effects are visible and undesirable, these polymers are not desirable for use in inventive images. It is generally desirable to use one or more stabilizers to enhance the permanence of inventive images.

After its initial polymerization, the polymer formed might for example, be the complete inventive image. Alternately, the polymer might be a work in progress that can be further developed or controlled to the extent as desired. Whether the inventive image is further processed and how it is further processed is at the sole discretion of its image maker. The inventive image can be processed in innumerable ways as desired. For instance, the polymer work in progress can be further processed repeatedly, in a myriad of ways, in any sequence, and over any period of time (continuously or otherwise). For example, its formal elements (such as its form, structure, coloration, light and spatial depth), can be reworked as desired and to the extent desired. It is likely that reworking any one of its formal elements will have at least a minimal effect on at least one of its other formal elements, such as just changing its form, might affect its structure, its color, its use of light, its function, its subject matter, its meaning, etc.

Typically, the amount of polymer in the total volume of an inventive image is at least about 5%, preferably at least about 10%, more preferably at least about 25%, still more preferably at least about 35%, and most preferably at least about 45%, in different embodiments.

The polymer of the present invention typically provides or enables an inventive image to have at least one aesthetic element. As such, polymer of the present invention is either a part of the inventive image or comprises the entire inventive image. Polymer of the present invention is not typically just a very thin, continuous, uniform, clear, colorless coating, covering, sealer, fixative, or varnish on an image that would be aesthetically complete without it. When the only polymer in an inventive image is a transparent or translucent external layer having a stabilizer that is not an image support stabilizer, and the external polymer layer has (a) and (b), described below, its typical thickness is at least about 0.2 cm, preferably at least about 0.3 cm, more preferably at least about 0.45 cm, still more preferably at least about 0.6 cm, still more preferably at least about 0.8 cm, and most preferably at least about 1.0 cm. (a) At least about 35% of the volume of the shape or form of the external polymer layer covers the image continuously, preferably at least about 50%, more preferably at least about 65%, still more preferably at least about 85%, and most preferably at least about 95%, in different embodiments. (b) At least about 60% of the volume of the external polymer layer has coloration or a lack of coloration that is uniform, but preferably at least about 75%, and more preferably it is at least about 80%.

In another embodiment of the present invention, the only polymer in an inventive image is a discontinuous transparent or translucent external polymer layer with a stabilizer, that is not an image support stabilizer. For example, such a discontinuous external layer of polymer might be carved, incised, embossed, embedded, inlaid, made of discontinuous applications (such as broken color or linear applications), colored discontinuously, or comprised of attachments, such as LEDs. Such an external polymer layer may be of any thickness or may vary in its thickness, e.g., its design may require that it be at least a certain thickness. If such a discontinuous external polymer layer is made with at least one conventional polymer image making medium and a stabilizer, and the percentage (by volume) of conventional polymer image making media in the external polymer layer is typically greater than about 25%, preferably greater than about 35%, more preferably greater than about 50%, and most preferably greater than about 65%, (c), and/or (d) are often preferable: (c) at least about 30% of the discontinuous external polymer layer is at least about 0.5 cm thick and preferably at least about 0.8 cm thick; and/or (d) it is often preferable for the inventive image to contain polymer of the present invention in another location or for the conventional polymer image making medium in this external layer not to be included in the total calculation of polymer in the inventive image.

In some embodiments, in which inventive images are made with an internal layer of polymer that is not an image support stabilizer, comprised of at least one conventional polymer image making medium and a stabilizer, and the percentage (by volume) of conventional polymer image making media in the internal polymer layer is typically greater than about 35%, preferably greater than about 50% and more preferably greater than about 60%, it is desirable that such inventive images have polymer of the present invention in another location (e.g., in another layer or in another part that may or may not be physically connected), or that the conventional polymer image making media are not included in the calculation of the image's total polymer. This preference is less desirable if: (e) the internal polymer layer's thickness is greater than about 0.15 cm, or preferably greater than about 0.2 cm, or more preferably greater than about 0.26 cm; and/or (f) the volume of the internal polymer layer's shape or form is typically at least about 40% discontinuous, preferably at least about 50% discontinuous, more preferably at least about 60% discontinuous, and most preferably at least about 70% discontinuous; and/or (g) there is inconsistent, non-uniform coloration or lack of coloration in at least about 70%, preferably at least about 80%, and more preferably at least about 90% of the total volume of the internal polymer layer.

In general, formal elements of an inventive image, can be used, or the choice made not to use them, more freely, more completely; with more workability, reworkability and control; and more in the manner desired, than in making most kinds of conventional images.

The following description of preferred embodiments of the present invention is generally arranged into sections, however, just as the formal elements are interrelated, these sections overlap. For instance, an embodiment in the "Process of Creation" section might also be an example of a process for developing and controlling an image's spatial depth, light and color. The use of one formal element in an inventive image can affect or even determine one or more of its other formal elements. Often, the workability, reworkability and controllability, offered by the artistic medium of the present invention enables image makers to use and to control the effects that work done to one formal element of an inventive image has on one or more of its other formal elements, to a far greater extent than is possible in conventional images.

Previously unknown to image makers and others, the inventive medium and inventive images offer new unique direct solutions to known limitations, problems and undesirable issues in conventional image making and images which are rooted at the heart of the formal elements, the most fundamental building blocks of images. Thus, in many examples, goals which have been sought but which could not be achieved in conventional images, can now be realized in inventive images. The new unique solutions offered by the present invention can expand image making and images profoundly. These are 24 examples. 1. While many kinds of conventional images are typically not fully workable, reworkable and controllable, inventive images typically can be. 2. While conventional practices do not always permit the free use of the Principle of Whole Development and Unity, the inventive medium typically does. Thus for example, the structure, the form, the use of light and the surface(s) of an inventive image can typically be considered, formed and unified as desired. 3. Whereas image makers often have to conform their thinking processes, their creative processes, their ideas, and their visions to a variety of limitations, problems and undesirable issues in order to make conventional images as desired, the image making processes of the present invention offer significant freedom from such restrictions. Typically, with the present invention: a) the thinking processes and the creative processes of image makers do not have to conform to such limitations at all or to such a great extent; b) image makers can develop their processes, their ideas and their visions spontaneously or as spontaneously as desired, e.g., as inventive images are formed, c) image makers can realize their ideas and their visions in inventive images, and d) image makers can often have greater control over the meaning of their images. 4. Whereas making and reworking the forms, shapes and structures of conventional images are often limited, problematic and burdened by undesirable issues, the present invention offers freedom from such. For example, using the present invention, the forms, shapes and structures of images can typically be formed as desired, within an enormous array of possibilities, using a wide variety of processes, (such as making images in layers, in parts, in one stage, in multiple stages over any period of time, combinations of these, etc). As another example, the present invention overcomes prior limitations in creating and affecting an image's form, shape and structure such as limitations in size, scale and dimensions; weight; balance; use of negative space; Compositional Arrangement; proportion; ingredients; physical attachments; and the like. 5. While desirable, conventional see-through images have been limited. The present invention enables a vast range of see-through images to be made with unprecedented creative freedom. 6. The present invention expands the use of coloration in images, e.g., the workability, reworkability and controllability of coloration in images; and the use of coloration with real spatial depth and real light in images. 7. The present invention expands the use of light in images. Inventive images can even use light in new unique ways, a number of which can not be done in conventional images and a number of which are desirable, important and valuable new effects in images, e.g., the present invention offers new uses of real light, of light and color, and of light and spatial depth in images. 8. Layering can typically be done in inventive images as desired, with the workability, reworkability, controllability, strength and permanence desired. Layering can even be done in inventive images as never before, e.g., the number of layers used to form an inventive image can be substantially unlimited. Layering in the inventive images can also form new and unique effects. 9. In contrast to the limitations, problems and undesirable issues inherent in using attachments (such as attached parts and inlays) in many kinds of conventional images, typically attachments are readily added to inventive images as desired, with workability, reworkability and controllability, for a myriad of different effects. 10. Whereas the use of real variable spatial depth in many kinds of conventional images is limited, problematic and burdened by undesirable issues, the inventive medium typically provides real variable spatial depth which is workable, reworkable and controllable as desired, and which offers a myriad of aesthetic options, many of which are not available in conventional images. 11. Inventive images can typically be made with strength and/or permanence not possible in comparable conventional images, which can be formed, controlled, maintained and changed as desired, using a variety of means, methods and manners, during or after an inventive image's initial formation.

12. The present invention expands the use of air pockets and embedding in images as well as the ability to form objects and devices within images. 13. The inventive medium can successfully produce images that have a vast range of special qualities and effects, many of which are new and unique, and some of which have never been possible in images before. Furthermore, special qualities and effects can typically be formed, reworked and controlled as desired in inventive images. Examples are special qualities and effects in inventive images involving the use of space, color, the perception of light, weight, balance, reality and illusion, movement, time, etc. 14. The inventive medium being typically workable, reworkable and controllable as desired, permits a wide range of experimentation, a substantial portion of which has never been done before. 15. While inventive images often need not be sealed, fixed, coated, covered or protected, they can be, as desired.

16. Whereas some uses of some of the formal elements available, desired or needed to form conventional images (e.g., some uses of real light, real transparency, real translucency, and real spatial depth), impose limiting, problematic, and undesirable specifications on the method, the manner and the means of their presentation, set-up, installation, display, and/or exhibition, the inventive medium offers ways to overcome such limitations which can result in new and unique images. For example, because inventive images can use real light in new ways, they no longer have to be lit according to conventional practices (though they can be), and because inventive images (such as 2D images like paintings, prints, and drawings) can be made with new shapes, forms, structures and for a new sense of objecthood, they no longer have to be presented, set-up, or displayed according to conventional practices.

17. Inventive images can be made which function in ways which comparable conventional images cannot be made to successfully function. 18. Though inventive images can use reality and illusion as these have been used in the past, in addition or instead, inventive images can use these formal elements in ways that are new and unique. For example, inventive images can use real formal elements (such as real light and real space), to produce new and unique illusions. Inventive images can be produced without relying on illusions, or without illusions. 19. Inventive images can often have the quality of otherness (even inventive images which look conservative). This is a desired, useful quality that is limited using conventional practices. 20. The inventive medium expands the use of objecthood in images substantially. The use of objecthood in inventive images can even give them new and unique qualities. 21. The inventive medium opens up possibilities for new unique images within known art forms, expanding art forms in ways which could not be comparably done heretofore. 22. While the use of formal elements to form conventional images is often problematic, the inventive medium offers new and unique, direct solutions. The inventive medium expands the use of the formal elements, e.g., 3D inventive image paintings can be made using color with real light and real spatial depth that have no illusions. 23. The inventive medium permits the image maker to dematerialize volume in images in new and unique ways and in ways that go beyond that which is possible in conventional images. 24. Inventive images can typically be made as easy to care for as desired. Conservation work can typically be done on inventive images (on both their polymer parts and non polymeric parts they may have).

The following are examples of general ways formal elements can be used in inventive images. (a) They can be used the same way as have been used in conventional images. The resulting inventive images may be like conventional images or they may differ to any extent. For example, light can be depicted illusionistically in inventive images. (b) Inventive images can use formal elements in a way that are similar to, but not the same as, in conventional images. For example, light can be depicted illusionistically in inventive images using layers of polymer. (c) Inventive images can use formal elements in new ways that resemble conventional images. For example, a polymer image support can be painted on its reverse side for viewing through its unpainted front, clear and colorless side and thus function as a reverse painting on glass. But this inventive image can be stronger, and more permanent than comparable conventional images, and it can have a wider range of optical properties such as light properties if desired. (d) The formal elements can be used in inventive images, in ways that are similar to, or that relate to, conventional uses, but which are also new and unique. For example, conventional techniques and processes, can be used in combination with unique effects of the present invention. (e) The formal elements can be used anew in inventive images to create unique, novel effects. For example, an inventive image painting can be made using paint with light from its see-through polymer form, that may have light effects within its colored or colorless layers from one or more prisms, electroluminescent lamps (EL Lamps), LEDs, conductive polymers, photochromic layers, photographic transparencies, or reflective ingredients none of which are comparably possible using conventional practices. (f) The formal elements can be used in a single inventive image in a combination of these ways.

Inventive images can, if desired, have one or more other ingredients and processes in addition to a polymer of the present invention and its process or processes, such as conventional practices. Examples are, materials, media, objects, devices, processes, and their combinations other than polymers of the present invention, such as: (1) ingredients used to make conventional images, (2) other art forms in inventive images like a traditional painting, print, drawing, photograph, or found object, (3) particles, items and other colorants, textural ingredients, other such materials, (4) devices which enable inventive images to physically move, (5) materials or devices for light and light effects and the use of conventional science to make light effects or to enable the image to give off light; (6) ordinary and custom hardware (e.g., to set up, install or mount images), and/or (7) practices used in construction, architecture, chemistry, electronics, physics, printing, or engineering. These and other non polymeric ingredients and conventional practices may or may not have the same characteristics as they have in their conventional uses. For example, their aesthetic properties and possibilities, their workability, reworkability, and controllability and their permanence, may or may not be the same or similar to those in their conventional uses. Often their aesthetic possibilities expand when they are used with the present invention, along with their workability, reworkability, controllability, and permanence. For instance, traditional oil painting can be layered as never before in inventive images. In inventive images, however, other known, and conventional ingredients and processes may or may not have the same or even a similar aesthetic; or the same or even a similar level of workability, reworkability, and controllability; the same or similar limitations, problems and undesirable issues; the same or a similar level of strength and permanence; and other qualities which are the same or similar to those in their regular and conventional uses. For example, frequently it is the use of other ingredients with polymers of the present invention that enables inventive images to be unique and important, such as electrical ingredients, colorants, stabilizers, etc. As a specific example, the ability to form inventive images or parts thereof in layers which can be unlimited, enables many conventional practices (such as conventional paint applications) to be used in ways that are more workable, more reworkable, more controllable, freer, more versatile, easier, stronger, and more permanent than their conventional uses. Nevertheless, the characteristics of ingredients and processes other than those of the inventive medium, and the use of conventional practices with the present invention are often dependent on the specifications of each use in specific inventive images.

One or more polymers can be used as, or to form an inventive image. One or more polymers and one or more other subjects (such as other materials, media, objects, or devices) can be used in any proportion to form an inventive image. For example, an inventive image can be almost entirely made of polymer, with a very small percentage of other ingredients. It can be made of roughly half polymer, and roughly half other ingredients. It can be made with a very small percentage of polymer and a very large percentage of other ingredients. For example, one or more of layers shown in Fig. 11 might be completely made or principally made of polymer, while the rest of the layers may be made of polymer or non polymeric ingredients. Any of the layers in Fig. 11 might be a layer of a conventional paint or other conventional image making medium, and any of the other layers might be electrically active, e.g., polymer LED(s). In Fig. 20, the internal layer shown might be an image support made of polymer and the external layer might be non polymeric, or vice versa.

The inventive medium enables 2D and 3D inventive images to be made in any shape, form, or structure desired, using any methods, means, and manners desired, and in any size or scale desired, (ranging from very tiny to monumental in size). The inventive medium can create forms that are as precise, as delicate, and as intricate as desired, even on a very small scale. As the drawings show, inventive images can be made of one or multiple, 2D or 3D, parts or layers as desired, even in conventional forms of art and design (such as paintings and drawings where this can be problematic). Inventive images (or parts of them), may or may not be flat, continuous, or regular in shape or form (such variations are often difficult to achieve in conventional images). For example, inventive images may have protrusions; texture; undulations, curves, indentations, a concave or convex form, embossing, embedding, inlays, or attachments; layers superimposing them partially or entirely; negative space, or irregularities in form, shape, structure, or surface, etc.

A number of the illustrations (the Figures) focus on specific formal elements in inventive images. As the Figures, by necessity, were made using conventional drawing practices, such practices often hide aspects of the present invention not being illustrated. For example, it is essential to the practice of the present invention that image makers may use coloration without limitations. Yet, the use of coloration in the Figures is limited for the purposes of clarity and the Figures are rendered in black, white and shades of gray, thus they do not show the use of coloration in inventive images. For instance, for the purposes of clarity in the illustrations, variation in the coloration of a number of the inventive images shown in the Figures is minimal in order to allow their shapes and parts to be seen easily (otherwise, a single inventive image part might appear to be made of multiple parts, etc.). As another example, areas in these illustrations of inventive images which are colored darkly, might be colored lightly and they might be transparent, translucent, and/or opaque in actual inventive images. In order to create the illusion of seeing through inventive images with real spatial depth which are transparent, translucent or not consistently opaque, on the 2D planar paper of this patent which is consistently white paper, some of the Figs. illustrate inventive images using lines (e.g., black or grey, dotted and/or solid lines) in places where the inventive image depicted has no lines. As another example, for the purpose of effective illustrations, many inventive images and parts thereof are drawn with black outlines (e.g., black outlines around layers in the inventive images) even though few if any of these lines would typically exist on these or other such inventive images. And often in the Figs., dotted or gray lines are used to show changes (typically previous changes) to an inventive image. In addition, in actual inventive images, a number of the bonding spots illustrated clearly herein would not be visible to the human eye as bonding spots within actual inventive images, (e.g., because they are camouflaged to appear continuous with the aesthetic of the inventive image, for example, by their color and/or dimensions).

Inventive images and their parts may be partially or completely solid, hollow or open in form, e.g., using a polymer in hollow or solid volumetric forms, rods, bars, and strips. Inventive images can have negative space within their positive forms, between their parts, or both, e.g., negative cut-outs, perforations, or holes formed when medium is cast, carved, or cut in gelled cPRM or in polymer. This opens novel possibilities for image making and for images, such as inventive images made in conventional art forms that are completely or partially hollow, e.g., drawings, paintings, prints, collage, decollage, images with writing, graphic art, photography, tiles, partitions, windows, doors, table tops, walls, or images which are a combination of these. For example, the use of one or more air pockets, negative spaces, or both, in inventive images made in art forms which conventionally, are generally continuous and solid, can yield effects which are new and unique. For example, their hollow forms can contain something such as air, water, rose petals, a piece of silver, a lens, a prism, a mirror, a piece of crystal, or anything else inside. In addition or instead, these hollow spaces might produce one or more light effects, such as an air pocket that might form a prism or a lens, or light sources, such as LED(s), that may be inside. Hollow and solid forms can be used in inventive images to make them stabile (i.e., bottom heavy), to balance their weight, to enable images to move or to be moved as desired (e.g., for kinetic images, to enable images to float, or to make images easy to transport), so that an image can hold, carry, or contain something inside of it (such as water that must flow through an image that is a fountain), or to make inventive images function more effectively in other ways. Moreover, the formation, workability, and uses of solid and hollow forms in inventive images offer many more options than can be obtained from comparable transparent or translucent conventional images, e.g., the medium of the present invention can be significantly more workable, reworkable, and controllable than glass or crystal and it can be stronger than conventional acrylics, glass, or crystal. As another example, in the inventive images in Figs. 41.I., II. and III., negative spaces and polymer planes enable layers of coloration to be superimposed without contacting one another.

By its variations and by its ability to be worked, reworked, and controlled as desired, the use of the inventive medium to make images' shapes, forms, and structures in some embodiments offers solutions to limitations and problems in conventional image making and conventional images, as well as the opportunity to use shape, form, and structure in images of the size and scale desired, in ways which are not possible in conventional images.

If desired, one or more parts or layers in an inventive image may be partially, principally, or completely comprised of one or more ingredients other than the inventive medium, e.g., light sources and other elements to give it light effects (such as light bulbs, LEDs, EL Lamps, reflective materials, iridescent materials, prisms, etc.); found objects; conventional image supports; conventional paints; conventional materials for making photographs; or conventional images in an inventive image. Further examples are commercially available. For example, tin cans, cardboard, metal or metallic foil, newspaper, rubber, devices (like flashlights, projectors, monitors, calculators, sensors, electrical wiring, solar panels, microphones, speakers, computers or computer parts, and controls), etc. As another example, mounts and frames for inventive images can be made using conventional practices. Attachments, parts or both which are not principally made of polymer of the present invention or are completely non polymeric can be added to inventive images, affecting or even creating their forms or structures to varying extents.

Polymers of the present invention can be formed with very accurate impressions of their molds, even if those molds are very detailed. Polymers can also be formed with less accurate impressions of their molds, to any degree desired. For example, using conventional practices, molds can be taken off of real things (e.g., a mold of a bottle, a shoe, a leaf, a person, a pineapple). In one embodiment, a 2D polymer is made in a mold. It may be left as is, if it is the desired finished inventive image or if it will be further developed at a later time, even years or decades later. Alternately, the inventive image can be further processed as desired. One method is to apply one or more colorants to one or more of its exposed surfaces. In addition, or alternately, one or more layers of one or more different PRMs or polymers can be added, e.g., a conductive polymer or a polymer with desired aesthetic or structural properties. This image can be finished, or it can be further processed. One way to further process it is to superimpose a layer of cPRM, which is the same or different from the image's initial layer, over part or all of one or more of the image's surfaces after which this inventive image may be finished. Alternately, this image can be further processed, as desired. For example, any number of additional layers can be added, or the image can be further processed using subtractive processes. The finished image may be 2D or 3D. Such an image might, for example, be a painting, a sculpture, or an image of design. For instance, it might be a rigid or partially flexible, permanent, self-supporting colored 2D or 3D image that does not require any added means of support or installation that is not considered an aesthetic part of the image. Such an image may have color visible which is at different depths within its form.

In another embodiment, an inventive image is made wherein one or more forms of light (such as light from conductive polymer or other lights), and one or more pigments or dyes are combined by (i) preparing a polymeric composition (which will be an image support), desirably made using one or more monomers, at least one of which can form a transparent or translucent polymer (in one or more layers); (ii) applying one or more colorants to one or more portions or to all of the image support; and (iii) exposing the colored work in progress to one or more forms of light or energy, to complete the image. The light can be visible light; light capable of inducing fluorescence, phosphorescence, or iridescence in the image. The energy can be energy that causes light to be emitted. Examples are ordinary tungsten, halogen, fluorescent, or neon lighting; sun light; light from fire (such as candle light); reflected light (such as light reflected onto the image off of a white wall); x-radiation, solar power, or electricity. One or more of the colorants applied on this image might by cured by radiation such as a colorant cured by UV light from the sun or from an electric light.

Whether they are stabilizers or not, image supports used to make inventive images may include one or more ingredients which are polymeric or non polymeric. Image supports may be 2D or 3D, their shapes and forms may be of any description, and they may be made in any process desired. Image supports may or may not have one or multiple dimensions or any dimensions which remain the same after they are further processed or finished, e.g., maintaining the same length or width after further processing. For example, an image support might be an inventive image's underlying support (e.g., supporting the development of the rest of the image in a manner which resembles the way that conventional images are supported on canvases, paper, wood, bases, underlying frameworks), for instance, to make inventive images that function as paintings, drawings, collages, icons, prints, books, sculptures, photography, windows, or walls. Alternatively, an image support might be an inventive image's internal support (e.g., similar to an armature, internal skeleton, or internal framework on a conventional image), for instance, to make inventive images that are sculpture, installations, paintings, or architecture. As another example, an image support might support an inventive image externally, either without underlying it or only partially underlying it, and it may be visible or partially visible. Such an image support might be the wire or other structure for an inventive image that is a mobile, a sculpture, an installation, a construction, or a painting.

In a preferred embodiment, inventive image supports are made using the polymer, with or without other ingredients. They may or may not be stabilizers. These image supports have noticeable irregularities or imperfections in their shapes or forms. For example, they look handmade, whether or not they are, e.g., they have irregularities like those commonly seen in handmade papers and in papers with deckled edges (papers with deckled edges can look handmade when they are not). In comparison to the shapes and forms in which conventional polymer is commonly available commercially, (e.g., in smooth even sheets, and rods, cubes, pyramids and spheres with exact forms, etc.), the image supports in this embodiment are not even, perfect, exact, smooth, or they do not have other such regular or machine made appearances. Though they might be symmetrical, geometric, or machine made, image supports of this embodiment have clearly visible irregularities or imperfections in shape or form. Another example is a 3D rectangular image support with undulations or irregular bumps (not a perfect even texture). Image supports of this embodiment might be used as initial image supports. Image supports of this embodiment might be further processed as desired, e.g., as paintings. It is often desirable to further process image supports of this embodiment such that they remain the major part of the shapes or forms of their inventive images once they are completed, e.g., initial image supports of this embodiment might make up most or all of the forms of the images once they are completed.

In other embodiments, inventive images are made without initial image supports. For instance, the shape or form develops as the inventive image is made. For example, these inventive images are made without the use of underlying, internal, external, or other initial image supports. They are, for example, inventive image paintings, drawings, and collages made without a canvas like or paper like support, and inventive image sculptures made without armatures. These inventive images can be made in many ways, such as using conventional methods. For example, such an inventive image can be made of one or more polymer components that are complete once they come out of their mold, they are not further processed. Such inventive images can be made by arranging parts, which remain separate or are connected, without any single part or any set of parts serving as an initial image support. Inventive images made without initial image supports might be made in superimposed layers, none of which serves as an initial image support, e.g., these images might be made in multiple layers, some or all of which superimpose one another to some extent, partially or entirely, and these superimposed layers may or may not be physically connected to one another. Because polymers of the present invention can be made as strong and as permanent as desired, layered inventive images made without an initial image support, can be made strong and permanent enough to give inventive images the desired structure and the desired aesthetic. Inventive images made without initial image supports can typically be worked according to the Principle of Whole Development and Unity to the extent desired, for instance, in a WYSIWYG manner, whether it is preplanned, spontaneously developed, or both, e.g., they may be paintings, shaped paintings, sculptures, walls, etc., with or without negative space within their forms, etc.

In an example, all of the parts of an inventive image are connected to a single common part, e.g., an image support (which may or may not be a stabilizer), for instance, all of the parts are connected to a 2D or 3D polymer, to a piece of fiber, to a block of wood, to a sheet of metal, to a 2D or 3D mesh form, to a framework or lattice, to a common mount, frame or base, etc. For instance, an inventive image made of multiple parts one or more of which serves as an image support made of one or more parts, connecting all of the rest of that image's parts. In a second example, a fiber stabilizer is used as one part of a two part image support. On this fiber image support, a polymer part, a paper part, and a plaster part are formed. A wire mesh is used as the other part of this same image support. In a third example, ten translucent and opaque paper parts are formed on cheese cloth image support, and painted with colored cPRM. In a fourth example, multiple planar polymer parts of any shape or form, are made separately and used as an image support, to form a painting of the present invention.

Inventive images or image supports can be rigid, flexible, or they may have both rigid and flexible areas, parts, or layers. In some embodiments, inventive images are made sufficiently strong, rigid, or flexible, or they are made with other such specifications so that they can endure their function and their set up, installation, or other display practices as desired. The rigidity, flexibility, and strength of inventive images enables them to be new and unique. Examples are transparent and translucent inventive images, such as those in forms conventionally made in glass, architectural images, kinetic images, images that have to take impact, shock, that have to be transported, stored, or endure other wear.

In some embodiments, inventive images are made with rigid polymer, as strong and as permanent as desired. Inventive images, their effects, useful properties and the processes for making them, can frequently be attributed to or enhanced by the rigidity of polymers. For example, rigid polymer can facilitate superimposed applications or layers (e.g., of cPRM; weak or fragile polymers, bonding substances; conventional image making materials, non polymeric applications, etc.). It can provide support or additional support, enhance the strength, the permanence, the aesthetic properties, and sometimes the function(s) of inventive images. Rigid polymers may enhance properties of superimposed applications and layers such as (1) materials and media that tend to flake, chip, tear, or dust off of their conventional surfaces (such as layered gouache, pastel, charcoal; brittle applications and layers like some polymers and paints, and paints with high pigment content and little or weak binder); (2) applications and layers adversely effected or risking adverse effects from expansion and contraction (e.g., materials and media that must be layered in order of their rates of expansion and contraction for permanence, brittle materials and media, conventional applications on canvas or paper, and wet applications that cause or risk causing paper to buckle); (3) materials and media that are soft, fragile, weak, brittle, gelatinous, and the like, such as encaustic paint, conductive polymers, and absorbent polymers; (4) applications and tools that damage or risk damaging surfaces, such as wet applications on paper, applications that fray or tear the fibers of paper, and tools that make undesirable and often irreversible indents on conventional surfaces (like hard pencils which indent paper); (5) applications that weigh too heavily upon conventional supports such as collaged materials and found objects; (6) materials and media that conventionally require, use, or benefit from the sturdy support of a rigid surface, such as fresco, images made in relief, conductive polymers; (7) reworked applications that damage or risk damaging conventional surfaces; and (8) combinations of these. As an illustration, the uses of conventional image-making materials and media on polymer surfaces of inventive images that are limited, due to the flexibility of their conventional surfaces (like paper and fabric both of which are generally given added structural support, though they still remain flexible), can yield new and unique qualities and effects in polymers in inventive images because its flexibility can be controlled as desired, e.g., in aesthetically desirable ways. Rigid polymers can also enhance or enable the use of subtractive processes.

The strength and rigidity of inventive images enables their aesthetic and their structure to be as integrated and unified as desired, developed, and reworked in concert to the extent desired. Thus, often decisions regarding structure that have to be made in conventional images (such as use of visible reinforcement) can be ignored, delayed, or made for other reasons (such as aesthetic reasons), completely or to a greater extent in forming inventive images. Elements conventional images need for structural support may not and often do not have to be present for structural support in inventive images, though they can be used if desired. Inventive images in conventional art forms which conventionally require these added elements, do not require them at all or to as great extent as conventional images, e.g., they are aesthetic options. For example, inventive images in conventional art forms can be made without conventional stretchers, initial image supports, backings, mats, frames, stands, bases, internal structural supports (like armatures or skeletal supports), various external structural braces or other external supports; supports beneath them; cross bars, ribs or struts of various kinds. Thus the strength and rigidity of inventive images can effect their other formal elements. Among other special qualities and effects the strength and rigidity of polymer can create or contribute to inventive images are a sense of being light, precarious, airy, threatening, floating, ethereal, a sense of defying the laws of gravity and nature, or a sense of objecthood. The strength and rigidity of inventive images overcomes prior limitations in conventional images, such as paintings, shaped paintings, stained glass and other glass images, drawings, prints, photographs, and other conventional images on paper.

The forms and the structures of inventive images can be as integrated and as unified as desired, they can even be completely unified. For instance, the polymer of an inventive image can give it both its form and its structure and even its method of display. The strength and rigidity of a polymer enables inventive images to be as self supporting as desired, (e.g., freestanding) with or without the use of additional structural supports. In some embodiments, inventive images are made that are self supporting, or even completely self supporting. Thus, for example, inventive images can be new unique paintings, shaped paintings, drawings, prints, photographs, books, and other forms of graphic art; they can be new unique forms of images conventionally made in glass such as windows, new unique light emitting forms, and new unique kinds of architecture. Among the notable examples of these are self supporting inventive images made without any initial image support, inventive images made of multiple layers or inventive images made in conventionally planar or 2D art forms. The strength and rigidity of inventive images enables the integration and unification of their aesthetic, their structure, their method of installation or display, their function for visual observation, and often other functions to the extent desired. For example, such novel inventive images can be large, rigid, permanent paintings, the visible forms of which are their structures, thus, these images do not require any additional or hidden structural support. For example, such an image might have painting, printing, or drawing at real varying depths within it as well as on its external surfaces.

An inventive image can be made with a structure that is strong enough or rigid enough to be able to be mounted from a single point (e.g., from the wall or ceiling), to be able to be held securely at a distance out from the wall it is mounted on, to be able to balance supported by one or more parts which appear insufficient or unstable, or to be able to be held from a moving mount or structure. One inventive image, 45 inches in diameter, made with a crosslinked polymer that has one fine layer of invisible fiber stabilizer positioned medial within its 1.5 inch width, is hung from the ceiling using a single wire secured through the 1.5 inch width of its center. The resulting inventive image has the special effects of appearing to float, appearing light, as well as spontaneous movement, a twirling, set off by normal indoor air currents or by viewers with no special accommodations made to the space in which it is displayed to cause or affect this movement.

Strength and rigidity in inventive images can be used in many other ways too. In an embodiment, one or more parts or areas of an inventive image are sufficiently rigid, sufficiently strong or both, to support, one or more other parts or areas of it as desired.

In some inventive images and parts thereof, it is preferable to fix flexible polymer onto a backing, mount, brace, stretcher, or another such structural support, for example, a flexible polymer secured over a curved metal form, a board, or over a conventional stretcher. (Refer to strengthening stabilizers described herein.) As an example, a transparent polyvinyl chloride inventive image is made, painted as desired with transparent, translucent, and opaque coloration (such as inks and paints made using oil soluble dyes), and finally draped on the wall. In another example, three small painting surfaces are made with a clear transparent silicone elastomer, irregularly colored, with embedding. They are mounted on support structures and hung on the wall or from the ceiling. In a further example, one or more flexible polymer parts in a kinetic inventive image might move.

Unlike many conventional images, inventive images can be as strong and as permanent as desired, and these properties can be formed, reworked, and controlled using any methods, means, and manners desired, such as when forming a polymer or anytime afterwards, often without affecting its aesthetic undesirably. The strength or permanence of inventive images may or may not be consistent. It is generally preferred that inventive images be strong and permanent, to the extent that there is no conflict with a more desirable preference for a specific inventive image. It is generally preferable for everything physically connected to inventive images to be bonded to them. Methods for controlling and enhancing the strength or permanence of inventive images are described herein. If, for example, two superimposed polymers do not bond together, or if they do not bond together as well as desired, bonding methods described herein or conventional bonding methods might be used. All desirable methods, means, and manners for achieving the level of strength and permanence desired in inventive images can be used. It is generally preferable that reworking and cleaning inventive images not decrease their strength or permanence, and that such practices depend on specifications of and undesirable changes to individual images.

Polymer in an inventive image may be strengthened further, made rigid or more rigid, or its permanence enhanced by thickening it or reinforcing it. This might, for example, be done with a fiber stabilizer, with a stronger polymer (such as one that is rigid or crosslinked); with a non polymeric material (such as metal, or wood). (Refer to other descriptions herein such as strengthening stabilizers.) In some embodiments, strengthening elements are physically bonded to inventive images, such as a strengthening element that is an image support, a mount, a frame, embedding, an attachment, or an inlay. Some strengthening elements which are physically bonded to polymers are stabilizers. Further examples are image support stabilizers, fiber, wire mesh, and other metal mesh, netting, macrame and other knotted forms (e.g., made of wire or string), forms made of linked chains (e.g., metal or plastic), other open weave forms that are not fibers or that are combinations of fiber and other materials (such as woven straw, string, wire, grasses, strands of rubber or leather, ribbons, stems, or strips of bark).

Any and all ingredients used in or on inventive images can affect their strength and permanence, as can processes used to make inventive images. Some polymers are stronger than others (e.g., crosslinked polymers and certain polymers are stronger for particular uses, etc.), some are more resistant to particular elements, and some polymers are more permanent than others. Manufacturers of polymer forming materials generally provide useful information about the properties and conventional uses of their products.

In various embodiments, inventive images are designed with two or more different polymers that are at least partially superimposed or connected. One or more of these polymers might be in layers, parts, or applications in or on the image (e.g., on the other, different polymer or polymers). The compositions of these polymers may or may not also contain non polymeric ingredients. At least one of these superimposed or connected polymers in the images of these embodiments provides or enables the image to have at least one aesthetic element, such as emitted light, other light effects, video effects, coloration, optical effects, transparency, translucency, the ability to bond to at least one superimposed medium (such as a colorant like paint or ink), or the ability to be developed by subtractive processes. In addition, at least one different polymer in the polymeric compositions of these embodiments, provides support to the polymeric composition. Thus, for example, a polymer which is desirable for use in an inventive image for aesthetic purposes, but which is weak or less strong or permanent than desired, is strengthened or made more permanent, and often is made more functional in the image desired too. Such designs using different polymers are often desirable in the use of absorbent polymers, conductive polymers, flexible polymers, and other polymers that are aesthetically desirable but might be weak.

In some embodiments, inventive images are made that are less strong or less permanent than they might be, as an aesthetic choice, to facilitate the process of creation desired, or to enable the image to function best for its purpose or for one of its purposes.

When using more than one kind of material or medium in an inventive image, and these different ingredients are not on physically separate parts of the image, it is desirable to be mindful of differences in the parameters of their expansion, such as differences in their coefficients of thermal expansion and differences in comparable parameters of any other kind of expansion (like expansion due to absorption of moisture such as humidity absorbed by a hydrophilic plastic or by paper in an image). When differences in the parameters (coefficients) of expansion of different inventive image ingredients are significant or great, it is desirable to ensure that these differences do not risk or cause undesirable effects to the resultant inventive image (such as a decrease in its strength, actual cracking, or bending or the risk of loss of strength). It is preferable that all measures taken for this purpose be tailored to the precise specifications of each inventive image, e.g., ingredients can be substituted, or the image can be designed to avoid or decrease the likelihood of such undesirable effects.

As a further illustration, if the difference between the parameters (coefficients) of expansion of different ingredients within an inventive image are significant or great, and if the area of contact between them is significant or great, it is generally desirable to make changes which reduce or eliminate these differences and their potential undesirable effects, such as by the following example methods. (1) Alter the size of the area of contact between the ingredients so that it is insignificant or minor. For instance, subdivide one or more of the ingredients so that areas of contact are discontinuous, and spaced as far apart as possible. (2) In the area of contact between the ingredients, interpose one or more materials, media, objects, devices or combinations of these, that are elastic enough or that flow freely enough to absorb the differences in their expansion and contraction. (3) In the area of contact between the ingredients, interpose one or more other materials, media, objects, devices or combinations of these which have intermediary parameters/coefficients of expansion to form a transition from the ingredients with the different parameters/coefficients of expansion. (4) Use a combination of these solutions. These solutions will not work in all circumstances in all inventive images, or they will not be equally desirable. For example, (2) and (3) are not generally desirable with 3D embeddments. With large 3D embeddments, it is generally preferable to match or approximately match the coefficients of thermal expansion and other expansion of different individual inventive image ingredients.

Thus, it is often desirable to be aware of such significant differences in coefficients of thermal expansion when embedding; inlaying; when adding layers, when connecting or adding parts and other attachments; when adding other coloration, and when installing mounts and frames.

For example, it is desirable to be mindful of significant differences in the coefficients of thermal expansion between inlays on inventive images and their host surfaces when the inlays are large and completely or continuously bonded to their host surfaces. It is also generally preferable to be mindful of significant differences in the coefficients of thermal expansion between the fiber and the image part to which it is bonded such as when using layers of fiber, dense fiber, tightly woven fiber (e.g., glass cloth), areas of chopped fiber. Also, some polymers expand and contract significantly, while others do not. For example, hydrophilic and absorbent polymers expand and contract at different rates as they absorb substances (like water or paint) and as these substances go out of them. Thus, when using an absorbent polymer (e.g., part or layer, such as a surface preparation stabilizer), it is most desirable that its expansion and contraction not alter its bond to any different compositions on the image undesirably. As another example, mixed polymers (such as stabilizers) are often desirable for use in between different polymers in an inventive image when they have coefficients/parameters of expansion that are significantly or greatly different.

In another example, a polymer is painted with a paint whose vehicle is a bonding cPRM with a compatible coefficient of thermal expansion. Then, before applying a continuous material with a significantly different coefficient of thermal expansion over 90% of this painted polymer, one or a combination of the following three methods may be used to effectively reduce or eliminate the risk to this image's strength and permanence. (1) The initial continuous material is replaced by one with a coefficient of thermal expansion which is as close as possible to that of the polymer. (2) The initial continuous material is cut into smaller pieces and then applied to the painted polymer, e.g., as a discontinuous non polymeric Separating Layer, for instance made of metal. (3) One or more intermediary layers are applied to the painted polymer arranged so that their coefficients of thermal expansion provide a progressive transition between that of the painted polymer and that of the continuous material. Then, the continuous material is applied onto the intermediary layer or layers on the painted polymer.

Regardless of the method of their incorporation, it is preferable for each non polymeric ingredient in contact with cPRM, to be able to withstand the cPRM, the polymerization process (such as its heat), and its inclusion in or on the polymer and in or on the inventive image over time without undesirable consequences to it, to the inventive image, or both. This condition is often preferred for many inlaid, embedded, and attached non polymeric ingredients. If this preferred condition is not met, it may be desirable to create it by making and test samples.

One preferred method useful in many embodiments is to change non polymeric ingredients in a way that protects them from the risk of undesirable consequences resulting from their innate inability (or the risk of this inability), to withstand the cPRM, the polymerization process, to have and maintain the aesthetic desired in the formed inventive image, or to remain permanently as desired in the inventive image over time. For example, many non polymeric ingredients can be sealed or coated with a protecting agent (by spraying), prior to their inclusion in or on inventive images. It may be preferable to seal such ingredients with one or more stabilizers or with substances which contain one or more stabilizers, such as sealants or coatings. For example, a UV light stabilizer can be added into an acrylic medium, a varnish, or in both, to seal small pieces of paper before they are mixed into cPRM, and coating might be applied on organic materials before they contact cPRM. Non polymeric inventive image ingredients might reinforce it in an aesthetically acceptable or desirable way, to withstand inclusion in or on the polymer without undesirable consequences. For instance, small paper forms which will be stirred into a cPRM may be reinforced beforehand by thickening each of them with additional paper pulp, cardboard, wood, thin metal, fiber stabilizer, or a coat of paint. Fiber can be used to reinforce inlaid, embedded, connected, or attached non polymeric ingredients. For example, delicate red rose petals could be sprayed with a transparent, colorless polyurethane varnish to protect their color and form before they are added into cPRM. In addition or instead, one or more stabilizers might be used as sealants. It may be preferable to use one or more stabilizers in one or multiple of the aforementioned sealants or coatings used on non polymeric ingredients prior to their inclusion in inventive image. A paper form may be sealed with an acrylic medium that contains an UV light stabilizer, prior to being inlaid in a polymer inventive image, whereas without this protection, this paper may turn yellow or brown with exposure to UV light, and, it may also be undesirably deformed or damaged by moisture.

Absorbency

In some embodiments, polymer in inventive images can be: absorbent, not absorbent, hydrophobic, hydrophilic, or a combination thereof. These are collectively referred to as "absorbency level" or "absorbent level." One preferred method of forming such polymers is by using particular active ingredients in cPRM and/or one or more particular stabilizers in cPRM, on polymer, or a combination of these (e.g., a fiber stabilizer). In addition or instead, such polymers can be formed using other ingredients in and/or on polymer, such as absorbent papers, paper pulp, colorants and strands of various kinds. Examples of desirable uses of polymer that is hydrophobic, hydrophilic, absorbent, and/or not absorbent are: (1) as a final coat on inventive images, e.g., non absorbent surfaces desired for permanence; (2) as surface preparation stabilizers (so that paint might soak into an absorbent polymer); (3) for forming image supports (such as absorbent image support stabilizers); and (4) for visual effects on inventive images (e.g., with superimposed coloration); or combinations thereof. Among examples of mediums or colorants which might be desirable to superimpose onto absorbent polymer in forming an inventive image are: paints, dyes, inks, primers, binders, or photographic emulsions.

Because the absorbent level quality of the polymer in inventive images can differ from conventional practices, conventional practices which use these qualities (e.g., materials, media and techniques) and effects used in conventional images dependent on these qualities (e.g., effects of painting, drawing and printing on absorbent paper, canvas, or other fabric) can be used with the inventive medium for effects and images that are new and unique. For example, unlike conventional images, all effects using the absorbency level of the invention may typically be transparent, translucent, and/or opaque; colored and/or colorless; combined with one or more other additive and/or subtractive processes (such as incising, carving and/or inlaying); used with a myriad of other aesthetic variations (such as light effects); worked, reworked and controlled; and be as strong and permanent as desired. In contrast, many such options are not possible in conventional image making, particularly using paper or fabric image supports. The following are more specific examples of the absorbency feature of the invention.

Using hydrophilic and/or absorbent polymers, inventive images can be made with new effects of real light, color, real transparency and real spatial depth, e.g., effects of stained, bleeding and poured color. In preferred embodiments, a synthetic absorbent polymer inventive image surface is superimposed by one or more mediums that might for example be paint(s), dye(s), ink(s), primer(s), binder(s) and/or photographic emulsion(s), e.g., which may bond to the absorbent polymer.

In preferred embodiments, an inventive image is made using at least one synthetic absorbent polymer capable of absorbing more than, for example, about 20% of its weight in water. In preferred embodiments, an inventive image is made using a synthetic absorbent polymer that is capable of being penetrated by an oil soluble dye. The absorbent polymer(s) in such inventive images might, for example, be polyvinyl chloride or polystyrene. Inventive images made in these embodiments might be further developed, for example, with one or more applications of which might be mixture(s) containing oil soluble dye(s) and solvent(s), or which might be oil soluble superimposed medium(s), e.g., paint(s), dye(s), ink(s), primer(s), binder(s), or photographic emulsions. Absorbent polymer formed in inventive images in these embodiments might be plasticized with a stabilizer to accelerate penetration of the oil soluble dye thereinto.

In an illustration, an inventive image is made using an absorbent polymer such as 2-hydroxyethyl methacrylate (HEMA), mono-glycerol methacrylate, and/or another polymer which either has the same or a greater number of oxygens than glycerol. For instance, using such an absorbent polymer, an initial image support stabilizer is made which is then superimposed by conventional paints and/or inks which absorb into it to varying extents forming a 2D or 3D inventive image painting which may be viewed from one or multiple sides, as desired. In an example, such an absorbent polymer is used (e.g., with a colorant mixed into it) as a surface preparation stabilizer on an inventive image and then superimposed by colorant(s) which absorb into it to form an inventive image. This might be the completed image desired, but if not it might be further processed, such as by incising drawing into it, and then optionally filling in some of this incised drawing with cPRM, such as cPRM that is a colorant (e.g., paint with a cPRM binder which may perhaps be cured by a radiation stabilizer), and/or this image may by superimposed by other coloration on one or more of its sides, e.g., coloration which absorbs into the newly formed polymer.

In preferred embodiments, an ingredient that modifies the absorbency of polymer is added to polymerization reaction mixture or to a polymer. This ingredient is a stabilizer.

In a preferred example, in embodiments, an inventive image is made of a mixed polymer or a copolymer comprised of at least one absorbent polymer and at least one polymer that is not absorbent. Thus for example, the absorbent polymer ingredient(s) might provide the image with aesthetic qualities (e.g., enabling desired further processing such as superimposed applications), while the non absorbent polymer ingredient(s) might provide the image with desired physical, structural and/or dimensional properties such as stability, strength and/or permanence.

In preferred embodiments an inventive image is formed by placing a PRM or cPRM capable of forming an absorbent polymer on a support surface where it polymerizes. The support surface may be a mold, or it may be wood, paper, stone, ceramic, metal, fabric, polymer and/or glass. In embodiments, an absorbent polymer or a cPRM containing at least one polymer that is absorbent, is superimposed on an image support comprised of a different polymeric formulation which provides support to the image, enhancing the structure, stability, strength and/or permanence of the superimposed absorbent polymer layer. In preferred embodiments, an image support (e.g., stabilizer) is made with a first, non-absorbent polymer layer bonded to a layer of a second, absorbent polymer, e.g., made with a synthetic absorbent polymer. In these embodiments, the second polymer may for example, be made with polymer(s) having hydroxyl, amide, amine, ester, or ether functional groups, or, the second polymer might, for example, be made with alkyl acrylate(s), alkyl alkacrylate(s), and/or functionalized derivative(s) thereof. The second polymer might, for example, be made with 2-hydroxyethyl methacrylate (HEMA), it might be made with 2-(Acetoacetoxy)ethyl methacrylate, and/or it might contain no more than, for example, about 4% (by volume) HEMA. The first, non-absorbent polymer layer might, for example, have about 10% (by volume) of absorbent polymer.

When added into or on cPRM or into or on polymer in an inventive image to form or fortify the bond between the polymer and one or more superimposed applications and/or colorants upon it, one or more absorbent polymers, and cPRM or PRM which forms absorbent polymer, are preferred stabilizers.

Inventive images can have effects which rely on the absorbency of polymer being less than or different than that of comparable conventional images, as well as effects which rely on the lack of absorbency of polymer. Examples are effects made by using conventional applications on polymer inventive image surfaces, which are conventionally used on absorbent surfaces, like canvas or paper. For example, among these are inventive images and effects made by working, reworking and controlling applications from bleeding, staining, running and absorbing into inventive images undesirably. Such an effect can be seen in the use of color on the inventive image support illustrated in Fig. 5 VI. which may have an absorbent surface. Also, inventive images and effects can be made in processes in which applications are reworked, e.g., intentionally removed, erased, smudged, rubbed, blotted, etc. (Often working and reworking the surfaces of conventional images is limited and problematic, for instance it tends to fray, tear, or break these surfaces undesirably, e.g., paper or fabric surfaces). Unlike many conventional image supports, many kinds of polymer surfaces of the invention can undergo working and reworking without being undesirably changed in an irreversible manner. The polymers of the invention are not typically fibrous, interwoven, or made of macroscopic strands like many conventional images, though such elements can be used in inventive images e.g., fibers, paper and strands of all kinds can be used as part of inventive images, for example, on and/or in their surfaces.

Conductive Polymers and Related Subjects

In various embodiments, conductive polymers and monomer precursors may be used in inventive images. They may, for example, enable or create desired aesthetic and/or utilitarian effects in inventive images. In making inventive images, both the process of doping or treating polymer so that it becomes conductive or more conductive, and the dopant or agent used in such processes, are stabilizers. For example, a polymer might be doped so that electrons are removed such as through oxidation (e.g., with chlorine, bromine or iodine vapor, or halogen doping) or so that electrons are introduced such as through reductive doping (e.g., an alkali metal). It is often preferable to use conductive polymer in inventive images in layers with one or more non-conductive layers which may or may not be comprised or entirely comprised of polymer. Often layers of conductive polymers in an inventive image are thin or extremely thin, e.g., enabling them to be very light weight. Thin, for example, can refer to less than about 1 mm, preferably less than about 0.2 mm. In one preferred embodiment, the thinness can be only about 0.01 to 0.1 mm. An inventive image may be partially or entirely made of conductive polymer, but often inventive images made with conductive polymer are partially non-conductive, e.g., non conductive layers and/or portions. Conductive polymer and/or cPRM capable of forming conductive polymer may be used in inventive images. Conductive polymers are, for example, desirable in making inventive images for their ability to conduct electricity, such as for their ability to emit visible light, e.g., using conventional practices to set up and install the image for such purposes. Electroactive conductive polymer can be desirable in inventive images. In selecting and in forming a conductive polymer for use in an inventive image, the level of electrical conductivity can be precisely controlled over a wide range. If desired, a particular conductive polymer can also be blended with one or more other polymers to produce the desired medium for use in an inventive image. Conjugated polymer systems can show electroluminescence. As illustrations, an inventive image made with conductive polymer capable of emitting light is installed so that it gives off light. An inventive image may be made with a polymer light emitting diode (LED) using conductive polymer, or a polymer LED might be an inventive image. A polymer LED inventive image or part thereof might, for example, be made with precursors to homopolymer and copolymer polyphenylene vinylenes (PPVs), such as polymer LEDs made by Cambridge Display Technology of Cambridge, UK.

Light emitting polymer (also called LEP) devices, are a kind of light emitting diode. They are also called polymer light-emitting diode (PLED, pLED or polyLED), organic light emitting diode (OLED, oLED, poly OLED, Poly OLED), and organic electroluminescent (EL).

On an image support or other inventive image surface, conductive polymer might be used for marking, as a colorant, and/or as a coating, which may be electroactive, e.g., which may illuminate if desired. Conductive polymer might be used in and/or on inventive images, for example in the forms of PRM or cPRM inks, paints, colorants, coatings, dots and/or pixels which may be electrically active, e.g., which may illuminate in one or more colors or create other effects in images. These might, for example, be painted or drawn on, and/or they might be applied by an ink jet printing process. A simple coating process can be used to apply conductive polymer (such as a light emitting polymer) to a surface. Conductive polymer might for example, be applied onto an image support (e.g., stabilizer) in a manner which provides the image with a desired aesthetic which may be as simple or as complex as desired, for example, adding a pattern, a design, drawn or painted shapes, alphanumeric shapes (which may or may not be legible), and/or pixels to the image, e.g., using one or more painting and/or printing processes. In various embodiments, conductive polymer layers can be applied by painting and printing application processes, spin coating processes, as well as other processes on an image support or other inventive image surface. Conductive polymer, such as that applied on an image surface by painting and/or printing, might, for example, be connected to at least one electrical power source.

Conductive polymer might also be used in inventive images for batteries and/or solar cells, e.g., solar calls made of polyvinyl alcohol (PVA) and polyacetylene such as in films of the copolymer as those patented as Lumeloid, Alvin M. Marks inventor. Conductive polymer might be used give an inventive image the element of sound or to contribute to its element of sound, e.g., recording sound, responding to sound (such as voice command, footsteps, or music), and/or emitting sound of any kind. Conductive polymer might also be used in inventive images for transistors, capacitors, coatings, photovoltaics, photodiodes, photoconductors, photorefractive devices and sensors, conductive adhesives, conductive coatings, circuits, as inks, paints and/or other colorants, computer memory and hard disks, sensors, for similar uses and for other uses. For example, a polymer solid state laser could be used in an inventive image, feeding energy to it with a conductive polymer "wire" or conduit. In a further example, electricity could be generated in an inventive image from a conductive polymer photovoltaic device that is hidden or that receives an invisible light, or both. Although conductive polymer can be used to reduce static on photographic film and computer screens which are part of inventive images, it is preferable that conductive polymer used for such purpose in an inventive image is not considered part of that image's polymer of the present invention and thus it is preferable that conductive polymer used for such purpose is not included in any calculation of that image's total amount of inventive polymer.

Inventive images made with conductive polymer can be in any shape, form or size desired. Conductive polymer in inventive images (e.g., as a LED) can be formed as desired. It can for example, be in any or all 2D or 3D, non planar or planar forms, as desired, such as in the form of sheets, as films, as fiber of various types such as fabrics (e.g., for use as a canvas); as rods, strips or bar shapes; in volumetric forms (which might be hollow and/or solid), in other forms, and/or in a combination of forms. Conductive polymer in inventive images and inventive images made with conductive polymer, (e.g., images that emit light from conductive polymer) may be transparent, translucent and/or opaque, as desired. Moreover, they might be flexible and/or rigid (e.g., a self supporting image that is partially or completely rigid, or an image that can be rolled up, draped, folded, or flexed). For example, a polymer LED inventive image or part thereof might be on an image support made of polymer, film, metal, foil, glass and/or any other non polymeric material. A polymer LED inventive image, or portion thereof, is preferably transparent, translucent, or partially opaque. An image support (e.g., stabilizer) for such a polymer LED might be transparent, translucent, and/or opaque, it might also have other marking or coloration, other light effects, negative spaces, incising, and/or other aesthetic effects. The polymer LED might for example contribute to the aesthetic of the image, e.g., providing a design, a drawing, light effects such as reflectivity, other light effects described herein, etc. For instance, polymer LED devices might be on commercially available ITO (indium tin oxide) coated PET (polyethylene-terephthalate), and if desired, subsequently encapsulated with a transparent or translucent, rigid and/or flexible barrier on one, two or more sides, e.g., to protect against the ingress of moisture, water and oxygen.

Conductive polymer (e.g., a polymer LED) might be: (a) an underlayer in or on an inventive image, (b) within an inventive image, (c) on one or more of its external undersides and/or front external sides; (d) attached to, connected to, inlaid in and/or embedded in an inventive image, and/or (e) a part of an inventive image which is physically separate from the rest of the image. Conductive polymer enables one or more sides, surfaces and/or internal areas of an image, or all of an image, to be electrically active and/or light emitting in one or multiple emission colors, as desired. Inventive images made with conductive polymer (such as inventive images with polymer LEDs, or other electrically active polymer), might example, be paintings, drawings, sculptures, constructions, shaped paintings, collages, prints, drawings in space, cut-outs, Light Art, Computer Art, Light and Perceptual Art, Video Art, art with film, an Installation, an image that serves as a wall or as an image on a wall, a table, a bench, a window, a tray, a bowl, a floor, graphic design, clothing or fashion design, book design, another kind of design or architecture, a combination of these, etc.

Conductive polymers are one of many ways of creating light emitting image supports (e.g., stabilizers), and inventive images according to the invention, which can, if desired, be further processed (e.g., using additive and/or subtractive processes such as those described herein). Light emitted from an inventive image and light hitting an inventive image can be modified in a many ways, e.g., using coloration, marking, attachments, filters, lenses, subtractive processes, etc.

In various embodiments, conductive polymer can be used to make inventive images using spin casting, and/or printing processes (e.g., ink jet printing processes, lithography, photolithography, soft lithography, high resolution optical lithography, silk screen, block printing, etchings, monotypes, etc). Such processes are stabilizers. In other embodiments, conductive polymer is used in inventive images in melt and/or in solution processing techniques, by blade coating, and/or by evaporation of low molecular weight dyes. For example, polymer (100 nm) might be added onto an image support by spin coating of a solution. As other examples, conductive polymer might be used in inventive images with processes such as: blow molding, calendering, fiber spinning, compression molding, extrusion, coating processes, spraying processes, solution spinning processes (e.g., fibers), casting processes, coating processes, painting, drawing, writing, rolling processes, and/or gel processes.

In embodiments, conductive polymer is used in inventive images in blends. For example, a conductive polymer such as one based on polyaniline (like those made by Panipol Ltd of Porvoo, Finland), might be blended with one or more other polymers, such as polyethylene, polypropylene, polystyrene, PVC, poly(methylmethacrylate), phenol-formaldehyde, epoxies, melamineformaldehyde resins, thermoplastic elastomers, etc.

It is important to note that the use of conductive polymers in making inventive images is not restricted in any way by the limitations which typically exist in the conventional use of conductive polymers for other purposes. Therefore, inventive images can be made using conventional or non-conventional practices for using conductive polymer such as those described herein. As an example, conductive polymers are conventionally used in extremely thin layers, even layers, homogeneous layers, typically on image supports that are rectilinear, geometric, smooth, and/or even. Conductive polymers can be used in these ways in inventive images, as desired. Since conductive polymers have no limitations when used in making inventive images, they can be used in a variety of other ways, including unevenly, irregularly, discontinuously, in any thickness desired, in layers that are heterogeneous, in any number of layers with or without other ingredients, or in a combination of these ways, on image supports and/or on other image surfaces of any description, that comprise one or more internal and/or external parts of an inventive image or that comprise all of it, with or without other aesthetic effects or further processing, such as any described herein or known to those of ordinary skill in the art.

In various embodiments, one or more electrodes, parts, layers, batteries and/or other devices (stabilizers) can be added to an inventive image for its use and/or supply of energy to a conductive polymer, e.g., enabling its conductive polymer to emit visible light. As an example, an inventive image is made with one or more layers of conductive polymer (e.g., thin layers) between two electrodes which are stabilizers (e.g., additional layers, preferably thin). It is preferable for each of these layers to be transparent or translucent, however it is often preferable for one of the electrodes to be opaque, e.g., a reflective cathode. For example, one electrode may be indium tin oxide (ITO) and the other might be calcium (Ca), which might be evaporated on in a thin layer. Between these electrodes there might be one or more conductive polymers, (e.g., in layers), such as poly-fluorene and/or poly(ethylenedioxythiophene) (PEDOT). Such inventive image compositions may or may not be formed and/or superimposed on an image support (e.g., stabilizer) made of polymer and/or non polymeric ingredients, e.g., a polymer (such as polyester or heat stabilized polyester), glass or paper image support. This inventive image composition might for instance, be a layer of conductive polymer in between an anode and a cathode (e.g., metal or metallic), for example, in a composition made of at least three superimposed layers, or perhaps even on a fourth substrate layer. When voltage is applied, such as by the use of wires and a battery (stabilizers), positive charge carriers move into the anode (a stabilizer) and negative charge carriers move into the cathode (a stabilizer). Both positive and negative charge carriers migrate into the conductive polymer. They approach each other, combine, and generate an excited state (e.g., neutral), which decays and generates visible light. This might for example, occur many times a second. For example, on each cm of such a layered light emitting polymer composition running at standard brightness, this may happen about 1,000,000,000,000,000 ($10^{15}$) times a second. The specific rate is not critical, and will depend on various factors including the type of material, such that the rate can be altered by one of ordinary skill in the art through routine experimentation. It is preferable to encapsulate polymer LEDs or parts thereof against the ingress of water and oxygen, e.g., using glass and/or polymer, such as epoxy.

In other embodiments, a polymer light emitting device can be made using two superimposed layers of conductive polymer between its anode and cathode. Such a device might, for example, have an anode (e.g., ITO) on a glass or polymer image support, or other inventive image surface. Then it might have two conductive polymer layers (preferably thin or extremely thin). One could be a polymer hole conducting layer, e.g., polyethylene dioxythiophene polystyrene sulphonate (PEDT/PSS) made by Bayer AG of Pittsburgh, Pa. and Krefeld, Germany, for instance, deposited from aqueous solution to form a thin film. The second conductive polymer layer is a conjugated polymer emissive layer (EL), (e.g., such as polyarylene systems, or a polyfluorene), for example, deposited from an organic solution. Then the LED might have a cathode system, e.g., deposited by physical vapor deposition, which might include a low work function metal, for instance, capped with aluminum. It is preferable to then encapsulate the device to inhibit or prevent the inward migration of oxygen, water, or both.

Conductive polymer, such as in the form of polymer LEDs, can be made to emit light in any color or in multiple colors, the brightness of which can be very low, very high or anywhere in between (e.g., as bright as a television screen or brighter), with only a small power source (such as a battery or current from an outlet), and if desired, at a low operating voltage (e.g., about 2 to 6 volts). Such a polymer LED may be an unfinished or a finished inventive image. It may, for example, be superimposed by additional layers of cPRM, polymer or colorants, it may have other light effects, etc., as desired.

Among the valuable properties in the use of conductive polymer to produce light in inventive images (such as in the form of polymer LEDs), are the relatively low power required compared to conventional electrical components such as neon, and the lack of significant heat produced by the emission of light, even over long periods of time. Less power is required than other light sources which might be and have been used in images, which can lead to longer life of the light source. The power source can be any suitable source, but is preferably DC power. In addition or instead, this may facilitate hiding a power source (such as a battery or solar cell) and/or associated materials (such as wires or conduits) from view, and/or facilitate working the visibility of the power source and/or associated materials into the design or aesthetic composition, if desired. The reduced heat output of the light source is typically highly desirable for the stability and permanence of many inventive images, such as images which have conventional image making mediums and materials (e.g., oil paints, colorants containing wax, egg tempera, cellulose paper, photographic mediums, etc.), which can change undesirably with exposure to heat such as that produced by conventional light sources such as bulbs.

In one example, a polymer light emitting device is formed in an inventive image by surrounding a semi-conductive polymer asymmetrically with a hole-injecting electrode (e.g., ITO) on one side, and on the other side, a low work function, electron injecting metal contact (such as aluminum, magnesium or calcium). Radiative charge carrier recombination in the polymer results in the emission of light as electrons from one side and holes from the other recombine. As another illustration, a transparent or translucent polymer or glass image support (e.g., stabilizer, perhaps made of polyethylene-terephthalate also known as PET), might be superimposed by a transparent indium tin oxide (ITO) electrode. Using a spin coating process, a thin film of a semiconducting polymer is superimposed onto the ITO from a solution. Then, the second electrode is deposited onto the polymer using a vacuum evaporation of a metal (e.g., calcium), sputtering, or the like, or a combination thereof.

In another example, a layer of poly(dioxyethylene thienylene) doped with polystyrene sulphonic acid or polyaniline-chloride is used between a layer of indium-tin oxide and an emissive polymer layer. Another example shows the use of two different conductive polymers, (e.g., in superimposed layers), between the two electrodes in forming a polymer LED inventive image. One of these conductive polymers might, for example, be a conductive polymer precursor (e.g., heat-converted into its final form before deposition of the next layer), and the other might be the light emissive conductive polymer. For instance, a conducting polymer layer might be used between the emissive PPV and the ITO in a polymer LED image.

In a further example, a light emitting polymer (LEP) device used in an inventive image is made using an anode, such as ITO, preferably on a polymer image support (though it could be on a glass image support). This is superimposed by two layers of polymer, which are preferably thin or very thin. One is a polymer hole conducting layer, such as a film of polyethylene dioxythiophene polystyrene sulphonate (PEDT/PSS) (made by Bayer AG of Pittsburgh, Pa. and Germany), and deposited from an aqueous solution. The other is a conjugated polymer emissive layer. Then a cathode (or cathode system) is deposited, comprised of a low work function metal, typically capped with aluminum. Then, the device is preferably encapsulated. Another, more specific example of a polymer LED, which can be used in inventive images has ITO as the contact anode on a polymer or glass image support. Then, the hole injecting material is poly(3, 4-ethylene dioxythiophene)/poly(styrenesulphonate) (PEDOT:PSS) (from Bayer AG). The light emitting polymer layer can be polyfluorene, polyarylene or polyphenylenevinylene. The device has a low work function cathode material, such as Ca, and it is encapsulated with a lid.

Another example is a polymer LED made with a low work function stable alloy of aluminum as the cathode material, a high PL efficiency PPV precursor and an ITO protector layer. A further illustration provides a thin layer of a conducting polymer deposited (e.g., spin or blade coated) between ITO and PPV copolymer. This central layer of conducting polymer might be polyethylene dioxythiophene/polystyrene sulphonate (PEDT/PSS). The cathode might be a sputtered low work function Al alloy.

In a further illustration, an inventive image has a polymer light emitting device made of one or more spin-cast, extruded and/or printed layers of polymer, on an image surface made of polymer or glass pre-treated with a transparent electrode material patterned (before the polymer is superimposed) to help define the device configuration. The other electrode can be deposited by vacuum metallization and patterned, and the device is sealed in a hermetic package. One or both of these electrodes might, for example, be in linear patterns.

The chemical structure of a polymer and its conductivity can be controlled, engineered, or designed to be appropriate for different aesthetic, utilitarian and other purposes in inventive images, e.g., by altering the polymer's molecular chains. For instance, the chemical structure of a light emitting polymer can be engineered to produce any or all emission colors. This light might be emitted from one or multiple parts, sides and/or surfaces of a single inventive image. As another example, using a solvent to alter the molecular chains of a polymer can change its conductivity, e.g., chloroform decreases conductivity, and m-Cresol increases conductivity, in varying polymers.

In inventive images, light emitted by any portion of the conductive polymer or by all of it, can be any color desired, i.e., one or more colors and/or colorless. Inventive images made with conductive polymers can have full color light emission, if desired, which can be extremely useful in making images, e.g., full color passive and active matrix display, such as created using direct patterning techniques. Moreover, the light emitted can change over time in any way desired. For example, over time, some or all of the light emitted by any portion of the conductive polymer (e.g., even a portion as small as a pixel), or by all of it can change (e.g., in brightness, in color, in direction, it can go on and off, or a combination of these, as desired). Conductive polymer offers fast response, or switching time, on and off. All of these elements can, if desired, be used to contribute to the inventive image's aesthetic, and/or if desired for other purposes, e.g., to give the image an interactive or utilitarian element. Such an inventive image might for example, have a computer as part of it or it might function like a computer screen. Thus, it might have a screen, a computer chip, a viewer input device to control the image (such as a drawing device, trackball, a button, a mouse, voice command, or switch), an optional audio component (e.g., producing sound and/or responding to sound such as to the viewer), or a combination thereof. The inventive image might also present a moving image (e.g., realistic and/or abstract), such as a film or video image or image part, which might be controlled and/or altered by a viewer controlled input device. Viewed from any angle or from multiple angles, the same light, color or image projected by a polymer LED can be seen. In comparison to liquid crystal displays, polymer LEDs do not have to be viewed straight on for the light, color and/or image they display to be seen, and they do not have to be backlit. Polymer LEDs offer high brightness at a wide viewing angle. Organic LEDs are compatible with standard silicon driving circuitry, which may be used as desired in inventive images.

Conductive polymer can be applied onto an image support very thinly (or in any other thickness desired), in layers, in designs, drawings, patterns and/or compositions which can be as controlled and as precise as desired, even if they are complex, intricate, and/or light emitting (e.g., light intensity is proportional to current). For instance, conductive polymer can be applied onto an image support or other image surface in pixels, e.g., using an ink jet printing process. For example, each pixel may be comprised of multiple sub-pixels (e.g., in layers), each of which might for example, be capable of emitting one color, e.g., three sub-pixels, one can emit red, one can emit green, and one can emit blue light. Using conductive polymers, any pixel shape or size is possible and very high resolution can be achieved. Moreover, light emitted by a conductive polymer can have any level of brightness or contrast, even very high brightness and contrast, and switch at any desired speed. Note that although typically pixels are extremely small, in inventive images they may be any size, e.g., from extremely small to large. Pixels may or may not be visibly apparent in actual inventive images.

Like other polymers of the present invention, conductive polymers can be applied to an image support or other inventive image surface using one or more painting and/or printing processes. Ink jet processes are among those preferred for making inventive images of conductive polymers, both charge conducting and emissive polymer layers, and for other polymers. Examples are ink jet practices specially developed for handling conductive polymers, e.g., by Seiko Epson and Cambridge Display Technologies, or by Philips Research of Eindhoven, The Netherlands. Such processes can be used according to the invention to apply conductive polymer in one or multiple layers, on part or all of any size image support, or one or more other inventive image surfaces. Ink jet printing conductive polymer can be done with the level of precision and resolution desired, it can even be done with great precision and a high resolution, e.g., using LEP inks based on poly(dialkylfluorene) derivatives chosen for high luminescent efficiency in blue, green and red.

Specific examples of the use conductive polymers in inventive images will become more sophisticated as the technology is further developed for utilitarian applications in products which are not images, e.g., such as for phone displays, internet appliance displays, utilitarian computer monitors having higher resolution and more sophisticated pixels, instrument panels, clocks, television screens, privacy glass, "smart" windows, batteries, solar panels, cameras, sensors, transparent coatings, fibers such as fabrics, transistors, capacitors, photovoltaics, conductive adhesives, computer memory and hard disks, circuits, photodiodes, lasers, and the like.

In an illustration, a 2.5 inch full color, 16 gray level active matrix display can be made (e.g., with materials from Cambridge Display Technology) that has 200×150 pixels each comprising 9 sub-pixels, 3 per color. Such a display might offer 16 gray levels per color, based on low temperature, polysilicon active matrix technology, using a digital drive scheme, and temporal and spatial dither. Its structure may, for example, have a common cathode efficiently injecting electrons into the lowest unoccupied molecular orbital of the three polymer emitters (i.e., like a conduction band in inorganic semiconductors).

In another example, the source-drain and gate electrodes might be comprised of a water-based ink made of one or more conducting polymers, such as poly(3,4-ethylenedioxythiophene) doped with polystyrene sulfonic acid (PEDOT/PSS, Baytron P from Bayer, Krefeld, Germany). In yet a further example, the active semiconducting polymer might be poly(9,9-dioctylfluorene-co-bithiophene) (F8T2), for example, used in a xylene solution which might be applied by spin coating. Photolithographic processes may also be used to pattern layers of polymer LEDs, such as those processes used by Philips. A further illustration provides the formation of a dot matrix screen made from a thin film of light emitting polymer on a glass or polymer image support, coated with a transparent ITO electrode, with an aluminum electrode evaporated on top of the polymer. Such a design might have the electrodes patterned in orthogonal rows and columns. When current is applied, the area at the intersection of these lines emits light.

In the use of ink jet processes with PRM, cPRM, and/or polymers, a number of variables can be used and/or controlled as desired, e.g., for aesthetic effects as well as practical ones. Different ink jet processes, different PRM, cPRM, polymer, and/or image surfaces might be desired for different purposes. For example, among these variables are the ingredients used in a polymer ink (e.g., the viscosity of the PRM, cPRM or polymer, how it dries, if it bleeds or beads up, etc.), the effect of any ingredients in the ink on the ink jet printer itself (e.g., a solvent dissolving the print head), the ability of the print head to deposit the ink in the manner desired (e.g., for both aesthetic and practical purposes, such as to inhibit ink clogging of the print head nozzle, and in a way so that the print head deposits the ink as desired), the interaction between the ink deposited and the image surface it is deposited upon, and the like. Ink jet processes for conventional polymer LED displays, which typically strive for qualities like precision, control, high resolution, and perfect registration, can be used as desired in making inventive image. The use of ink jet processes for making inventive images, however, does not have the same kinds of limitations, and one of ordinary skill in the art can envision a wide array of applications in accord with the invention herein.

Conductive polymers or polymer LEDs may be formed into inventive images and/or onto inventive images or image supports that are even, regular, flat, planar, rectilinear, geometric, and/or exact, but they are not restricted to such kinds of forms. Conductive polymers and polymer LEDs are formable using a variety of processes in any way, shape or form desired, on inventive images or image supports and/or into inventive images of all descriptions, such as those that are irregularly shaped, uneven, non planar, not flat, discontinuous, in shapes or forms which are not rectilinear and/or non-geometric. Conductive polymer and/or a polymer LED might be used (e.g., disposed) on an image support that is carved, incised, embossed, textured, undulating, angled, rigid, flexible, foldable, discontinuous, or a combination of these, as desired.

It is generally preferred that conductive polymer used in inventive images be stable and permanent, or as stable and as permanent as possible. Thus, it is often preferable that conductive polymer parts, layers, LEDs, other such devices, power sources for any of these, and associated materials are capable of being reworked, replaced, repaired and/or restored if they change over time in an undesirable manner (e.g., if their ability to function decreases or if they stop functioning), and/or if the technology advances in a way which is more desirable for the specific inventive image.

Inventive images made with conductive polymers (e.g., made with any of these devices, made electrically active, and/or made with any of these qualities) can of course be further processed, e.g., painted, incised, developed with additional parts, and/or layers, etc. Such devices and effects might also be added to inventive images which already are developed to any extent, e.g., a polymer LED added to an image support stabilizer that already has light effects such as those described herein, painting, carving, multiple layers, and/or non polymeric parts. Light emitted from an inventive image can be modified in many ways, e.g., using coloration, attachments, filters, lenses, subtractive processes, etc.

In addition to, or combination with, these polymers and/or blends, dopants, dyes, and/or complementary materials may be desirable. Examples of dopants include, but are not limited to, metal ions, e.g., Pt(II), Ir(III), etc.; non-metal ions; organic protic acids, e.g., phosphoric or sulfonic acids, such as p-toluenesulfonic acid, and mixtures thereof; and combinations thereof. Examples of dyes include, but are not limited to, low molecular weight and/or branched molecules, e.g., oligomeric polyphenylenevinylenes and/or polythiophenes, such as polythiophene octopus and spiro-6-PP, which are commercially available, e.g., from Covion Organic Semiconductors GmbH of Frankfurt, Germany. Charge transport materials and/or photo-sensitizers may also be added in an amount sufficient to improve the conductivity or light emissivity of the conductive polymers or light emitting materials.

Preferred conductive polymers are too numerous to mention here but they are recited in application Ser. No. 10/170, 503 and are incorporated by reference herein.

In various embodiments, conductive polymer is used to create or enable one or more aesthetic elements in inventive images. For example, this conductive polymer may emit visible light, it may affect light transmission or the direction thereof, image color, movement, mobility, sound, form, structure, one or more other formal elements, or a combination of these. Such conductive polymer may, for example, be a transparent coating or layer on or in an inventive image.

In some embodiments, inventive images can be interactive. Conductive polymer may be used to create this interactivity, and/or it may be created by another means. Such inventive images might have computers, camera, control devices, microphones, recording devices, movable parts, changing light effects, changing colors, changing forms, projections, video, film, devices that play sound, printers, sensors, and the like, as desired.

In various embodiments, one or more formal elements of an inventive image or part(s) thereof is varied or changed, using energy such as electricity, heat, light, and/or magnetism. After the image is finished, this variance or change of one or more of an image's formal elements may or may not continue and/or be visible, e.g., the finished image may have changing or variable formal elements. Such effects might be created using conductive polymer, and/or one or more other mediums, materials and/or devices in inventive images. For example, exposure to electricity or voltage might cause or enable aesthetic and/or functional elements of an inventive image or part thereof to change or vary, such as its transparency, its translucency; other aspects of the manner in which it relates to light (e.g., the direction of its light or its reflectivity); the hue, the value, and/or the intensity of its color; its use of film, video and/or sound; any other interactive devices or features it may have, other formal elements and/or combinations of these. In another example, an image or a part thereof varies according to changes in the temperature around it, e.g., due to the use of crystal violet lactone, for example in a PRM and/or in a colorant that is in and/or on an image. Inventive images of these embodiments might be exposed to energy in any way desired, e.g., continuously or for controlled and/or uncontrolled time periods. The variance or change in the image might be controlled directly and/or indirectly or in any other manner. For example, it may be controlled by a switch or other device, with or without human initiation, such as a timer, a computer, a camera, or a sensor (e.g., responding to: a viewer's presence, sound, light, change in the environment, or a combination thereof). Such variance or change might be controlled by a viewer speaking, or pressing or touching part of the image, such as a button or a sensor. As an illustration, such variance or change might even be controlled from a distance, and/or regularly, e.g., an image's formal elements changed via wireless communication (or broadcast) and/or changed daily, weekly or monthly. Such effects can be desirable to use or control visible spatial depth and other formal elements in images of the invention. Such effects can also constitute or enhance interactivity in an inventive image. In other examples, an inventive image's form is changed using electricity, which may enable an inventive image or part thereof to be mobile. Electricity might run one or more devices in an inventive image, such as a camera, a printer, a screen, a display, a projector, a monitor, a computer, a fan, a light source, a recorder; a radio, a machine or player that emits sound (e.g., music), or the like.

In embodiments, a colorant, paint or ink is used in and/or on inventive images that can be varied and/or changed, as desired, using energy such as electricity. The change or variance in these images can be done in any manner and at any rate desired, e.g., changing part or all of an image very slowly, very fast or at any rate in between. Thus, for example, moving images, full motion images, video and film images can be made in various embodiments. (Refer to the prior descriptions of the fast response or switching time conductive polymers offer for use in inventive images, as well as their full range of emission colors, etc.)

In some embodiments, the colorant, paint or ink used in and/or on inventive images that can be varied and/or changed, as desired, using energy (such as electricity) is made using tiny microcapsules of transparent or translucent fluid (e.g., microcapsules of a polymer, each of which may be about the diameter of a human hair). In the inventive image, each microcapsule might be capable of functioning like a pixel. These microcapsules are placed between electrodes, at least one of which is at least partially transparent or translucent. Within each of these microcapsules there are suspended particles (e.g., pigment) of one or more colors, e.g., white and black; or white and red, blue, green and/or yellow. Each suspended particle either has a negative charge or a positive charge. A microcapsule might contain particles with a positive charge and/or particles with a negative charge, e.g., it is often preferable for a microcapsule to contain both. Suspended particles can move within their microcapsules, e.g., moving to the side of the microcapsule that is against one of the electrodes. So, when one electrode is negatively charged, it draws the positively charged particles to the part of the microcapsule that is against that electrode. If that negatively charged electrode is transparent or translucent, the color of the positively charged particles drawn to it, is visible at that spot on the inventive image. Likewise, when one electrode is positively charged, it draws negatively charged particles to the part of the microcapsule that is against that electrode. If that positively charged electrode is transparent or translucent, the color of the negatively charged particles drawn to it is visible at that spot on the inventive image. Thus, if a microcapsule that contains both positively and negatively charged particles is in between a negatively charged electrode and a positively charged electrode, the particles will position themselves in opposite areas of the microcapsule, against the oppositely charged electrodes. Thus, to the extent that one or both electrodes are transparent or translucent and to the extent that any other part of the inventive image which is against each electrode is transparent or translucent, the microcapsule with show a color on one or both sides of the image.

In various embodiments, electrochromic mirrors, coatings, and/or effects are used on or in inventive images. For example, such a mirror, coating or effect changes its surface and/or its use of light (for example darkening it) in response to an electrical charge, e.g., when a sensor detects the presence of bright light, the image darkens. Examples are electrochromic mirrors made by Gentex Corporation of Zeeland, Mich. Conductive polymers might be used in such inventive images. In some embodiments, inventive images or parts thereof function as electrochromic windows, "intelligent" windows, "smart" windows, and/or it enables them have these kinds of effects, whether or not these images function as transparent windows or not. Such images can vary, control, block, and/or reduce the amount of light, the color of the light and/or other properties of the light that can pass through them. Such effects may be created in inventive images using conductive polymers. Also, in certain embodiments, "switchable" mirrors, the effects of switchable mirrors and/or similar effects are used to make inventive images or parts thereof. For example, switchable mirrors, or the effects of them, can be used in inventive images, such as the switchable mirrors made by Philips Research in Eindhoven, The Netherlands. Inventive images of these embodiments might be made with conductive polymers. Examples of switchable mirrors can change from a reflective to a transparent state and back when voltage is applied and turned off. It is possible to modify this effect and create variations of it as desired in inventive images, e.g., for aesthetic purposes. In switchable mirror inventive images or parts thereof, made using the same technology as Philips or made with technology that is similar or related, a rare-earth metal is induced by exposure to hydrogen, to convert to its ionic hydride. The hydrogen can be transported into a transparent hydrogen storage electrode when energy (e.g., voltage) is applied and back when it is switched off. If desired, such features can be part of a system or a "smart" system of inventive images e.g., a system in which one or more aesthetic elements and/or functions of an image are controlled, varied, and/or changed over time. For example, such features can be part of a smart system that varies or effects the properties of light that pass through the image or part thereof, e.g., varying or effecting the amount of light, the path of light beams, the color of light, and/or its other properties in the inventive image.

The inventive images herein are not limited by the restraints which conventionally determine the designs of items made using the conventional practices described in the paragraphs above and in other conventional practices, because inventive images need not serve the same utilitarian functions. This leads to a wide array of aesthetic possibilities. For example, a mirror, a window or an effect like that in a conventional mirror or window, which is part of an inventive image, need not be smooth, even, consistent, or planar, and need not have the same light properties as a conventional mirror or window, e.g., it may have distortions, any other irregularities desired, as well as further processing such a superimposed layers. In making inventive images, conventional practices such as those described in the paragraph above, can be used in any manner desired. Various conventional chemicals, processes, and the like can be used to make the inventive images of the invention, as will be readily determined by those of ordinary skill in the art.

In certain embodiments, suspended particle devices are used in inventive images, e.g., in between layers. In these devices, the random positioning of particles suspended in a material, liquid or film inventive image layer and/or part inhibits or prevents light from passing through until an electrical charge causes these suspended particles to align or position differently, thereby modifying the amount of light passing through the inventive image layer and/or part, which has increased or decreased transparency or translucency than before the electrical charge. The use of such suspended particles might create a filter in an inventive image that changes over time, (e.g., quickly), as desired, e.g., controlled by a switch, a timer device, a viewer-controlled device, or the like. Mirrors or mirrored surfaces in inventive images might also have layers or parts with these kinds of suspended particles. The suspended particles in such layers and parts of inventive images might for example be liquid crystal, including liquid crystal dispersed (e.g., droplets) in a layer or matrix of polymer (which is preferably transparent or translucent, and typically thin, e.g., a conductive polymer), in an inventive image, sandwiched between two conductive layers and/or electrodes (which are preferably transparent or translucent and typically thin also, e.g., layers of ITO). Moreover, the entire layered form might then be superimposed on one or both sides by a polymer (like polyester) and/or by glass. Such technology is currently used in cars, windows and privacy glass.

As an alternate example, the polymer layer or film with the dispersed liquid crystals might be sandwiched between layers of polyvinyl butyral (PVB), then, if desired, glass might be superimposed on one or both sides. Alternately or additively, glass coated with PVB might be superimposed on one or both sides of the polymer layer or film with the dispersed liquid crystals. For instance, a conductive layer comprised of polymer with suspended particles such as dispersed liquid crystals, is sandwiched in between electrodes (e.g., ITO). Then, this is preferably sealed or encapsulated to inhibit or prevent the ingress of water, oxygen, or both. For example, it might be superimposed by polyester on one or both sides. In addition, or instead, PVB and/or glass are superimposed, e.g., as separate layers.

In other embodiments, a liquid crystal display, optionally illuminated, is used in an inventive image. Typically, electronic practices (e.g., electricity and electronic processes) are used in inventive images with liquid crystals.

In certain embodiments, polymer in an inventive image serves as insulation for one or more other parts thereof, e.g., it is insulation for a conductive polymer in the same inventive image.

Further Processes of Creation—Workability—Adding and Subtracting Matter

The medium of the present invention typically offers full and free workability, reworkability and controllability which does not diminish during or after formation of the image. Processes for working with the medium typically can be reworked and controlled, e.g., reversed or changed. This creative freedom and aesthetic control can be a substantial advantage which many conventional practices do not offer.

Additive and/or subtractive processes can typically be used to make and/or rework inventive images, one or more times, at one or more stages in the image's formation or anytime thereafter, as desired. In various embodiments, more cPRM, polymer and/or one or more other ingredients are added to an inventive image, (e.g., to its polymer). In various embodiments, cPRM, polymer and/or one or more other ingredients are subtracted from an inventive image, e.g., by cutting, sanding, sandblasting, other abrading processes, carving, engraving, cutting, chiseling, incising, and/ or by breaking it, using any of a wide variety of tools, and/or by hand. The addition and/or subtraction of polymer and/or other ingredients typically offers unprecedented workability, reworkability and controllability in making inventive images and it can create and/or affect one or more formal elements of an image. Those of ordinary skill in the art will be able to envision many other suitable additive and/or subtractive processes for use in working the medium of the invention.

Compositional Arrangement

The compositional arrangement of inventive images are unlimited and typically workable, reworkable and controllable as desired. Using the present invention, a compositional arrangement can be made, and then if desired, it tyically can be further worked, reworked and controlled as desired, repeatedly if desired, over any period of time, e.g., typically in a WYSIWYG process, in a sight unseen process, in a preplanned process, in a spontaneous process, or in a process that combines these. The compositional arrangement which can be formed using just cPRM and one color are infinite. The use of compositional arrangement can bring real light and real spatial depth into images as never before, and affect other formal elements typically without lessening the inventive image's strength, its permanence, or its other desired elements undesirably.

When considering compositional arrangements, one or more parts of images can be rearranged, adjusted, or modified; painted, carved, cut or enlarged; removed or minimized; developed, integrated, and unified with other parts, with other formal elements, and in their relationships to the image as a whole. By making images in parts, their compositional arrangements, forms, and structures can be made as desired in a myriad of variations, using real space, in addition to or instead of other forms of space. The ability to create in parts using the inventive medium image offers freedom, aesthetic possibilities and control, which was heretofore limited or non existent. The Figs. show a variety of examples of inventive images made in different compositional arrangements, many of which are images made in multiple parts such as the images shown in Figs. 65-67 and 79.

Further Creation Processes

Inventive images can be formed in any process or processes desired, as will be readily understood by those of ordinary skill in the art. In an example, inventive images or part thereof are made which are positive cut-outs, but these can be rigid, flexible or both; transparent, and/or translucent; they can have internal designs and coloration; they can emit light or have light effects; texture, etc. See Fig. 4. For instance, (a) polymer can be cut into the desired shape to make a cut-out, (b) a cut-out can be cast in polymer, (c) a cut-out can be made by connecting multiple parts, (d) a cut-out can be made by partially or completely covering, backing or encasing one or more forms with cPRM and/or with polymer (such as covering, backing or encasing materials, devices, found objects, or image supports, e.g., paper forms or forms made of the inventive medium), and/or (e) a cut-out is formed by hand (with or without tools) using a malleable polymer, or (f) a combination thereof.

Polymerization and Image Making

Polymers of the present invention may have linear chains, and/or may be crosslinked. Materials used in forming polymer of the present invention typically include one or more polymerizable monomers, and one or more initiators or catalysts which are appropriate for polymerizing the specific monomer or monomers, preferably mixed together. For example, a cPRM for the present invention might be comprised of only one monomer and its initiator or catalyst. However, multiple monomers (preferably mixed), pre-polymers, polymers, multiple initiators and/or catalysts (preferably mixed), or combinations of these can be used to form polymer, as desired. Should any of the monomers require a specific catalyst, it is preferable to add that catalyst into the mixture. In forming many inventive images, the monomer, or at least one of the monomers, used is capable of forming polymer that is preferably transparent or translucent, has desired optical properties (such as a particular refractive index and/or light transmittance), has other desirable aesthetic properties, is strong in a manner which enables the image to be permanent, can be further processed as desired, or a combination of these. In particular, preferred monomers include esters, urethane-forming components, acrylics, ethylene-forming monomers, monomers that form conductive or absorbent polymers, or any other suitable monomer. Preferably, the PRM forms polymer with desired aesthetic properties or so that it enables desired aesthetic properties in the image.

Inventive images or part thereof, are one or more sun prints, photograms, negative photographic prints, positive photographic prints, negative photographic transparencies, positive photographic transparencies, holograms, or as combinations of these, as desired. These can be transparent, translucent, opaque, partially opaque, or combinations of these, and they can be further processed as desired. For instance, inventive images or part thereof might be transparent photographic transparencies made on polymer that is transparent, translucent, opaque, partially opaque, or a combination of these, e.g., portraits landscapes, abstractions, photographs of conventional images, etc. If desired, these photographs may be altered as desired in a computer program before they are part of an inventive image. As an illustration, a conventional photograph on conventional photographic paper might be bonded to the flat backside of an inventive image using any singular or multiple methods, means and manners desired, for viewing through its other sides, any and all of which might be painted, carved, flat, undulating, perforated, textured, inlaid, printed upon, written upon, designed with one or more photographs on them, with embedding, designed in one or more other ways, or a combination of these. In a further illustration, one or more photographic transparencies are made or transferred onto the backside or the underside of transparent or translucent polymer in making an inventive image.

It is sometimes desirable to cover photographic emulsions on external surfaces of inventive images with a material that protects them from undesirable changes. For example, a photographic emulsion can be coated with a stabilizer, a material or a medium, that protects it from UV light, e.g., cPRM with a UV stabilizer in it, or a standard protective spray available in a photographic or art supply store that might, for instance, be an acrylic spray containing a substance that absorbs UV light. For example, the polyacrylic spray described above can be applied on a photographic emulsion on an inventive image, preferably in more than one layer, letting each layer dry before applying the next layer. Care and precaution to avoid or to prevent undesirable changes to a photographic emulsion on an inventive image are often desirable prior to superimposing it with anything. A photographic emulsion on an inventive image might, for example, be superimposed by: cPRM, polymeric or non polymeric ingredients.

The present invention expands the use of photographs, transparencies, parts thereof, and combinations of these in images far beyond its prior boundaries, e.g., with a wide variety of qualities and effects that are not available in conventional practices, such as: real variable spatial depth; real variable light; light effects; layered effects, etc.

In an embodiment, one or more holograms are part of an inventive image or part thereof, e.g., in or on the image. For example, a hologram can be attached to an inventive image, inlaid in it, embedded in it, or it can be a part of an inventive image that is not physically attached to it but which is visible through its transparent polymer or glass. For instance, holograms made by DuPont Displays in Logan Utah may be used in inventive images. In a further embodiment, one or more conventional images or part thereof that are stereoscopic, autostereoscopic, lenticular, computer generated, or a combination of these are part of an inventive image.

In addition, all of the inventive images described herein might, if desired, be further processed using any method(s) and material(s), such as the examples provided herein and/or in U.S. in Patent App. No.'s 20030035917-A1 (application Ser. No. 10/170,503). The inventive image specifications described herein might be further understood when used with embodiments described in U.S. in Patent App. No.'s 20030035917-A1, and/or when they are applied to fitting examples, illustrations and drawings from U.S. in Patent App. No.'s 20030035917-A1. For instance, specifications for the compositions of surface preparation stabilizers provided herein can be further understood by examples, illustrations and drawings (Figures) in U.S. in Patent App. No.'s 20030035917-A1 describing and showing surface preparation stabilizers.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for making an image-making support medium that is a new reinvented version of a conventional utilitarian fine artist's canvas, wherein the reinvented image support medium facilitates artistic expression and the creation and display of art, design that is applied art, and/or architecture made therewith, thereupon and/or therefrom, comprising:

preparing a macroscopic two or three-dimensional image-making support having distinct edges or boundaries with a feature that is interactive or interactive by being responsive, requiring the work to be active rather than entirely passive, with this interactive feature more complex than or other than a conventional on/off switch or dimmer; and also preparing this work with at least one or one combination from A)-G):

A) at least one nanomaterial;
B) a light-emitter that is one or a combination of: an organic light-emitting diode (OLED); a light-emitting display screen that is partially or entirely transparent or translucent; a light-emitting display screen capable of flexing or folding; or a light-emitting display screen that is approximately about 6 mm thick or thinner;
C) an electronic paper display or e-material, and the work is: fine art; it is architecture; it is clothing design, fashion design, a work of design that is a clothing or fashion accessory, hat design or belt design; it is a work of design that functions as a tote bag, a handbag, or a container; it is costume design; it is jewelry design, it is jewelry design that is a necklace, a bracelet, an anklet, a ring, a pin or earrings; it is furniture design or furniture design that is a table, it is a mural; it is a work of fine art or design for viewing or display on or in a wall or architectural structure; or it is a work of design for viewing or display apart from being worn directly upon the human body as jewelry design, clothing design or watch design;
D) a visible tangible transparent or translucent form or display capable of aesthetic change that can be seen from one or more sides or angles, with its visible aesthetic change capable of occurring independent of any separate light source that may be part of the work, with its visible aesthetic change requiring the work to be active rather than entirely passive, and with the transparent or translucent form or display being part or all of the work which is other than conventional privacy glass;
E) a visible interactive or responsive intangible hologram;
F) an organic transistor, a transparent transistor, an organic light-emitting transistor (OLET), or a transistor that is a combination of these; or
G) a conductive polymer that is: capable of conducting electricity that flows or is non-static, emits light and/or is in a device so that the conductive polymer is separate from any e-material display, photographic film or photographic paper that might also be part of the work;

and in addition, the specifications described above are incorporated into a two or three-dimensional artwork, picture or design that is applied art, and this aesthetic work is: sculpture, a painting, a mural, a kinetic work, a mobile, an openwork art form, pictorial, fine art, applied art, or architecture; it shows a figure, an animal, a still life, landscape, nature, the sky, a part or aspect of any of these, subject matter that is not physically present, drawing, collage, a pattern, a depiction or representation of a recognizable subject, or a combination of these; it has the visible signature or distinguishing mark of the artist, designer or group of artists and/or designers who created it which is other than the mark of an industrial or commercial manufacturer or scientific organization; that has a title as art or design that is applied art; or a combination of any of these; and preparing the two or three-dimensional aesthetic work as a whole in and of itself, free from any separate alternative functionality or purpose that differs from that described in this claim, and the work is free of being purely commercial or informational, and it is also other than a conventional computer, camera, phone, personal digital assistant device, digital photo frame, digital picture frame, portable media player device, a utilitarian wrist watch, or a conventional window that changes uniformly to serve purely utilitarian purposes.

2. The method of claim 1 wherein the two or three dimensional image-making support medium, artwork, picture, work of design, or work of architecture is made so that it responds to and/or is activated by gesture and/or movement.

3. A method of making a two or three dimensional image-making support medium which is a new reinvented version of a conventional utilitarian fine artist's canvas, canvas panel, canvas pad, art board or drawing pad, wherein the reinvented image-making support medium facilitates artistic expression and the creation and display of art, design that is applied art, and/or architecture made therewith, thereupon and/or therefrom, comprising:

preparing a macroscopic two or three-dimensional image-making art-design support with distinct edges or boundaries and with the means to create, further develop, rework or otherwise show a two or three-dimensional artwork, picture or design that is applied art, preparing the two or three-dimensional image-making art-design support with a feature that is interactive or interactive by being responsive which enables an artwork element, a pictorial element, an architectural element, or an element of design to be created, developed and/or changed once, twice, multiple times and/or in an ongoing process, so that the two or three-dimensional visual creation can be seen, and the change or changes to it can be seen from one or more of its sides or areas, thus the two or three-dimensional work enables a means for creating, developing, changing and/or recreating art, design that is applied art, and/or architecture or part thereof in a process in which one or more sketches, versions, variations, and/or unfinished or finished images might be generated over any period of time, using one or more of the work's sides or angles, and note, the interactive feature requires the work to be active rather than entirely passive and the work is made with the means to be active; the creation, development or change in the visible artwork, pictorial or design element is more complex than or other than that from a conventional on/off switch or dimmer; and the work is free of a computer or it is other than a conventional computer, and preparing this two or three-dimensional aesthetic work with at least one or one combination of:

A) at least one nanomaterial;
B) a light-emitter that is one or a combination of: an organic light-emitting diode (OLED); a light-emitting display screen that is partially or entirely transparent or translucent; a light-emitting display screen capable of flexing or folding; or a light-emitting display screen that is approximately about 6 mm thick or thinner;
C) an electronic paper display or e-material, and the work is: fine art; it is architecture; it is clothing design, fashion design, a work of design that is a clothing or fashion accessory, hat design or belt design; it is a work of design that functions as a tote bag, a handbag, or a container; it is costume design; it is jewelry design, it is jewelry design that is a necklace, a bracelet, an anklet, a ring, a pin or earrings; it is furniture design or furniture design that is a table, it is a mural; it is a work of fine art or design that is applied art for viewing or display on or in a wall or architectural structure; or it is a work of design that is applied art for viewing or display apart from being worn directly upon the human body as jewelry design, clothing design or watch design;
D) a visible tangible, transparent or translucent form or display capable of aesthetic change that can be seen from one or more sides or angles, with its visible aesthetic change capable of occurring independent of any separate light source that may be part of the work, with its visible aesthetic change requiring the work to be active rather than entirely passive, and with the transparent or translucent form or display being part or all of the aesthetic work which is other than conventional privacy glass;
E) a visible interactive or responsive intangible hologram;
F) an organic transistor, a transparent transistor, an organic light-emitting transistor (OLET), or a transistor that is a combination of these; or
G) a conductive polymer that is: capable of conducting electricity that flows or is non-static, emits light and/or is in a device so that the conductive polymer is separate from any e-material display, photographic film or photographic paper that might also be part of the work;

and in addition, preparing the two or three-dimensional aesthetic work described above as a whole in and of itself, free from any separate alternative functionality or purpose that differs from that described in this claim, and the aesthetic work is free of being purely commercial or informational, and it is also other than a camera, phone, personal digital assistant device, digital photo frame, digital picture frame, portable media player device, a utilitarian wrist watch or a conventional window that changes uniformly to serve purely utilitarian purposes.

4. A method of making a two or three dimensional image-making support medium which is a new reinvented version of a conventional utilitarian fine artist's canvas, canvas panel, canvas pad, art board or drawing pad, wherein the reinvented image-making support medium facilitates artistic expression and the creation and display of art, design that is applied art, and/or architecture made therewith, thereupon and/or therefrom, comprising:

preparing a macroscopic two or three-dimensional image-making art-design support with distinct edges or boundaries and with the means to create, further develop, rework or otherwise show a two or three-dimensional artwork, picture or design that is applied art, preparing the two or three-dimensional image-making art-design support with a feature that is interactive or interactive by being responsive which enables an artwork element, a pictorial element, an architectural element, or an element of design to be created, developed and/or changed once, twice, multiple times and/or in an ongoing process, so that the two or three-dimensional visual creation can be seen, and the change or changes to it can be seen from one or more of it's sides or areas, thus the two or three-dimensional work enables a means for creating, developing, changing and/or recreating art, design that is applied art, and/or architecture or part thereof in a process in which one or more sketches, versions, variations, and/or unfinished or finished images might be generated over any period of time, using one or more of the work's sides or angles, and note, the interactive feature requires the work to be active rather than entirely passive and the work is made with the means to be active; the creation, development or change in the visible artwork, pictorial or design element is more complex than or other than that from a conventional on/off switch or dimmer; and the work is free of a computer or it is other than a conventional computer, and preparing this two or three-dimensional aesthetic work with at least one or one combination of:

A) at least one nanomaterial;
B) a light-emitter that is one or a combination of: an organic light-emitting diode (OLED); a light-emitting display screen that is partially or entirely transparent or translucent; a light-emitting display screen capable of flexing or folding; or a light-emitting display screen that is approximately about 6 mm thick or thinner;
C) an electronic paper display or e-material, and the work is: fine art; it is architecture; it is clothing design, fashion design, a work of design that is a clothing or fashion accessory, hat design or belt design; it is a work of design that functions as a tote bag, a handbag, or a container; it is costume design; it is jewelry design, it is jewelry design that is a necklace, a bracelet, an anklet, a ring, a pin or earrings; it is furniture design or furniture design that is a table, it is a mural; it is a work of fine art or design that is applied art for viewing or display on or in a wall or architectural structure; or it is a work of design that is applied art for viewing or display apart from being worn directly upon the human body as jewelry design, clothing design or watch design;
D) a visible tangible, transparent or translucent form or display capable of aesthetic change that can be seen from one or more sides or angles, with it's visible aesthetic change capable of occurring independent of any separate light source that may be part of the work, with it's visible aesthetic change requiring the work to be active rather than entirely passive, and with the transparent or translucent form or display being part or all of the aesthetic work which is other than conventional privacy glass;
E) a visible interactive or responsive intangible hologram;
F) an organic transistor, a transparent transistor, an organic light-emitting transistor (OLET), or a transistor that is a combination of these; or
G) a conductive polymer that is: capable of conducting electricity that flows or is non-static, emits light and/or is in a device so that the conductive polymer is separate from any e-material display, photographic film or photographic paper that might also be part of the work;
and in addition, preparing the two or three-dimensional aesthetic work described above as a whole in and of itself, free from any separate alternative functionality or purpose that differs from that described in this claim, and the aesthetic work is free of being purely commercial or informational, and it is also other than a camera, phone, personal digital assistant device, digital photo frame, digital picture frame, portable media player device, a utilitarian wrist watch or a conventional window that changes uniformly to serve purely utilitarian purposes.

5. The method of claim 3 in which the two or three dimensional image-making art-design medium or work has one or more of these specifications:
(a) the two or three dimensional image-making support medium is an artist's canvas, canvas panel, art board, canvas pad or drawing pad; it is similar to one of these or it serves as a new reinvented version of one of these;
(b) its interactive or responsive feature responds to one or more stimuli, triggers or influences; it's interactive or responsive feature is capable of responding by changing, by repeatedly changing or by continually changing at least one element that is visible and/or audible to viewers; the work is triggered, stimulated, and/or influenced in a way that is unseen by viewers and it is capable of responding in a way that is visible to viewers; the work is capable of responding by changing in a way that is different from the way it is triggered, stimulated, and/or influenced; the work is triggered, stimulated, and/or influenced in a way that is inaudible to viewers and it is capable of responding in a way that is audible to viewers; or
the work's interactive or responsive feature is for the purpose creating, further developing, reworking and/or showing a two or three-dimensional artwork, picture or design from one or more of the work's sides or angles, and this interactive or responsive feature is free of functionality that is a separate alternative to this purpose;
(c) the work has two or more parts that are physically connected or separate; the work has at least one display device and it is made and/or used with one or more additional display devices which are: an additional interactive image-making support; a light-emitting display or device; an e-material or electronic paper display; or a combination of these; and this or these additional display devices are part of the work by being physically connected to and/or by being physically separate;
(d) the work is capable of presenting an artwork, a pictorial element or a design element or the work is capable of showing an artwork, picture or design with interaction, with human interaction or by the use of its responsive capability;
(e) the work's interactive or responsive feature is activated free of physical contact between a person and any tangible part of the work and/or the work's interactive or responsive feature functions free of physical contact between a person and any tangible part of the work;
(f) most or all of the utilitarian elements of the image-making art-design support medium are integrated into the work as a whole by being hidden from view and/or by being entirely or predominantly unobvious or unapparent to viewers looking at the work as a whole, or they are integrated in this way until the work is activated, triggered or stimulated; or
(g) the work is woven, it is a textile, and/or it is non-woven; or
(h) the work has conductive polymer as part of a non-woven form that is other than a textile; or
(i) the work is made as or developed into art, design that is applied art or architecture that is static or that is capable of partially or entirely changing, changing interactively or changing by a responsive process; or the work is made as or developed into art, design that is applied art or architecture and then further developed, reworked or altered.

6. The method of claim 4 in which the two or three dimensional image-making art-design medium or work is either free of a computer, or it has a computer for the purpose of creating, further developing, reworking and/or showing a two or three-dimensional artwork, picture or design from one or more of the work's sides or angles, and this computer is free of functionality that is a separate alternative to this purpose, or the work has such a computer in a supportive or subsidiary capacity; or
the work has a computer free from a functionality that is a separate alternative to the purpose described in claim 4; or the work has a computer that is subsidiary or subordinate to the work's visible aesthetic effect or effects.

7. A method for making an image-making support medium that is a new reinvented version of a conventional utilitarian fine artist's canvas wherein the image support medium facilitates artistic expression and the creation and display of art, design that is applied art, and/or architecture, made therewith, thereupon and/or therefrom comprising:

preparing the work as a two or three-dimensional artwork, picture, design that is applied art, or architecture, preparing this two or three-dimensional aesthetic work with, or by use of and with a means enabling at least one visible artwork, pictorial or design element to change or to change using an interactive and/or responsive feature, at any rate of speed or at more than one rate of speed, with the work active rather than entirely passive, and with the change more complex than or other than the effect of a conventional on/off switch or dimmer, and preparing this aesthetic work so that it is macroscopic, so that it is a whole in and of itself with distinct edges or boundaries, and also preparing this aesthetic work with one or more of the specifications in (i)-(iv) and one or more of the specifications in (A)-(G):

(i) preparing the aesthetic work so that it is: sculpture, a mobile, a mural, an openwork form, a kinetic work, pictorial, a painting, fine art, collage, design that is applied art, architecture, or so that it has a visual effect or design resembling that in a well known work of art or design that is applied art, or resembling that by a well known artist or designer; or (ii) preparing the aesthetic work so that the change described above is visible in: the subject matter of the artwork, picture or design; in a figure, an animal, a still life, landscape, nature, the sky, subject matter that is not physically present, drawing, a pattern, a depiction or representation of a recognizable subject, the illusionary depiction of spatial depth or form; the design; one or more pictorial elements or abstract shapes; the aesthetic work's physical shape, form or structure; a part or aspect of any of these; it is a change in color, in light transmitted through the work, in light emitted from the work and/or in a light effect; it is change in a photographic image, it is change in a video or film; the change is visible in response to or activated by a subject or change in a subject that is separate from the work, not present with it or distant from it; the visible change is initiated using a means that is free of physical contact between a person and the aesthetic work; the change is visible in a combination of these ways; or (iii) preparing the aesthetic work so that most or all of its utilitarian elements or most or all of its interactive or responsive feature or features are integrated into the work as a whole by being hidden from view and/or by being made to be entirely or predominantly unobvious or unapparent to viewers looking at the work as a whole, or preparing the aesthetic work so that it is integrated in this way until it is activated; or preparing the aesthetic work so that most or all of its utilitarian elements are integrated into it as a whole by being hidden from view and/or by being entirely or predominantly unobvious or unapparent to viewers looking at the work as a whole, or preparing the aesthetic work so that its utilitarian elements are integrated in this way when it is inactive; or (iv) preparing the aesthetic work with the visible signature or distinguishing mark identifying the artist, designer or group of artists and/or designers who created it which is other than the mark of an industrial or commercial manufacturer or scientific organization; or preparing the aesthetic work with a title as art or design;

and in addition, preparing the aesthetic work described above so that it also has at least one or one combination of the specifications in A)-G) below:

A) at least one nanomaterial;

B) a light-emitter that is one or a combination of: an organic light-emitting diode (OLED); a light-emitting display screen that is partially or entirely transparent or translucent; a light-emitting display screen capable of flexing or folding; or a light-emitting display screen that is approximately about 6 mm thick or thinner;

C) an electronic paper display or e-material, and the work is prepared as: fine art; architecture; clothing design, fashion design, a work of design that is a clothing or fashion accessory, hat design or belt design; a work of design that functions as a tote bag, a handbag, or a container; costume design; jewelry design, or jewelry design that is a necklace, a bracelet, an anklet, a ring, a pin or earrings; furniture design or a table; a mural; a work of fine art or a work of design that is applied art for viewing or display on or in a wall or architectural structure; or a work of design that is applied art for viewing or display apart from being worn directly upon the human body as jewelry design, clothing design or watch design;

D) a visible tangible, transparent or translucent form or display capable of aesthetic change that can be seen from one or more sides or angles, with its visible aesthetic change capable of occurring independent of any separate light source that may be part of the work, with its visible aesthetic change requiring the work to be active rather than entirely passive, and with the transparent or translucent form or display being part or all of the work which is other than conventional privacy glass;

E) a visible interactive or responsive intangible hologram;

F) an organic transistor, a transparent transistor, an organic light-emitting transistor (OLET), or a transistor that is a combination of these; or G) a conductive polymer that is: capable of conducting electricity that flows or is non-static, emits light and/or is in a device so that the conductive polymer is separate from any e-material display, photographic film or photographic paper that might also be part of the work;

and in addition, preparing the aesthetic work made according to the description above, so that it is free from any separate alternative functionality or purpose that differs from that described in this claim, so that it is free of being purely commercial or informational, and so that it is also other than a conventional computer, camera, phone, personal digital assistant device, digital photo frame, digital picture frame, portable media player device, utilitarian wrist watch or a conventional window that changes uniformly to serve purely utilitarian purposes.

8. The method of claim 7 wherein: the aesthetic work is sculpture, a mobile, a mural, an openwork form, a kinetic work, pictorial, a painting, fine art, a collage, a design, architecture, or a picture and/or it shows one of these that is figurative, realistic, representational, abstract, surrealistic, a landscape or a still life, and/or the work has collage, it has a photographic depiction or picture or it has a visual effect or design resembling that in a well-known work of art or design or resembling that by a well-known artist or designer.

9. The method of claim 7 wherein the change is visible in: the subject matter of the artwork, picture or design; in a figure, an animal, a still life, landscape, nature, the sky, subject matter that is not physically present, drawing, a pattern, a depiction or representation of a recognizable subject, the illusionary depiction of spatial depth or form; the design; one or more pictorial elements or abstract shapes; the aesthetic work's physical shape, form or structure; in part or all of its presentation of a photographic image, a video, a film, a moving picture, or in the presentation showing of a story or a narrative; a part or aspect of any of these; it is a change in color, in light transmitted through the work, in light emitted from the work and/or in a light effect; it is change at any rate of speed, it is change in a photographic image, it is change in a video or a film; the change is visible in response to or activated by a subject or change in a subject that is separate from the work, not present with it or distant from it; the visible change is initiated using a means that is free of physical contact between a person and the aesthetic work; the change is visible in a combination of these ways.

10. The method of claim 7 which includes a means for one or more visible aesthetic elements to be created, changed, developed and/or reworked, and one or more of the following:

the work has such a means of change that is responsive, and/or responsive to a stimulant, activation, a trigger or an influence;

the means for one or more visible aesthetic elements to be created, changed, developed and/or reworked is activated by or in response to: a person, a subject or change in a subject that is separate from the work, not present with it or distant from it; touch, movement, gesture, sound or voice; light, electricity, the environment or an aspect of it, change in any of these, heat, temperature, pressure, strain, bending, a stimulant, trigger, influence or means of input;

the work or part of it is capable of showing an aesthetic change that resembles, occurs in response to, in relation to, or is activated by: change that occurs in the real version of its subject matter or in a related subject; change in a subject that is separate from it, not present with it or distant from it; light, natural light, skylight, nature, a part of nature, an aspect of the environment, change in any of these; gesture, movement, voice or touch; or a combination of any of these; and/or the work shows an aesthetic presentation that changes at any rate of speed.

11. The method of claim 7 in which the change or changes show or can be activated to show subject matter pertaining to light or a portrayal or representation of light in any form, with this subject matter static or capable of changing over time at any rate, with this subject matter visible on one or more of the sides or angles of the work; wherein this subject matter is visible with or without the use of emitted light, and with or without the use of light transmitted through the work's form that might be partially or entirely transparent, translucent, with open space and/or opaque.

12. The method of claim 7 in which the image-making support medium or work show or is capable of being activated to show subject matter that wholly or partially presents, represents, resembles or portrays: the horizon, fireworks, stars, the sky, skylight, natural light, sunset, sunrise, subject matter that looks like light that is visible apart from the work or distant from it, or subject matter that is abstract and/or realistic pertaining to light, representing light or about light; or part or all of this subject matter employing light emitted by the work continuously, unchanging, discontinuously, in gradations or changing over time at any rate, or any combination of these.

13. The method of claim 7 in which the image-making support medium or work includes a means by which it can change or an interactive or responsive feature, with most or all of its the utilitarian elements of this means or feature hidden from view or entirely or predominantly unobvious or unapparent to viewers looking at the work as a whole, or the work has most or all of its utilitarian elements integrated in this way until the work is activated; or most or all of the aesthetic work's utilitarian elements are integrated into it as a whole by being hidden from view and/or by being entirely or predominantly unobvious or unapparent to viewers looking at the work as a whole, or most or all of the aesthetic work's utilitarian elements are integrated in this way when the work is inactive.

14. The method of claim 7 wherein: the aesthetic work is prepared with the visible signature or distinguishing mark identifying the artist, designer or group of artists and/or designers who created it, which is other than the mark of an industrial or commercial manufacturer or scientific organization; or the aesthetic work has a title as art or design.

15. The method of claim 7 in which the image-making support medium or work has at least one: light-emitter that is one or a combination of: an organic light-emitting diode (OLED); a light-emitting display screen that is partially or entirely transparent or translucent; a light-emitting display screen capable of flexing or folding; or a light-emitting display screen that is approximately about 6 mm thick or thinner.

16. The method of claim 7 in which the image-making support medium or work is prepared with conductive polymer.

17. The method of claim 7 in which the image-making support medium or work has an electronic paper display or e-material.

18. The method of claim 7 in which the image-making support medium or work has at least one nanomaterial, and/or it has an organic transistor, a transparent transistor, an organic light-emitting transistor (OLET) or it has a transistor that is a combination of these.

19. The method of claim 7 in which the aesthetic work or part of it has a visible tangible, transparent or translucent form or display; it has such a form or display that is capable of aesthetic change; and/or it has a visible interactive or responsive intangible hologram.

20. The method of claim 7 in which the two or three-dimensional image-making support medium or work is prepared so that it has one or more of these specifications:

(1) it shows a two or three-dimensional artwork, picture or design from one or more sides or angles, a design, a figure, an animal, a still life, landscape, nature, the sky, a part or aspect of any of these, subject matter that is not physically present, drawing, collage, a pattern, a depiction or representation of a recognizable subject; a two-dimensional depiction or representation of three-dimensional form; or a combination of these;

(2) the image-making medium or work shows a drawing, picture or design that is complete, finished, partial, and/or unfinished, and/or it shows one of these that is figurative, realistic, representational, abstract, surrealistic, a landscape or a still life;

(3) the image-making medium or work has a visible two or three-dimensional, pictorial, artwork or design element created by adding to it and/or by subtracting from it; the image-making medium or work has embossing, inlay, incising or carving; and/or
(4) the work has a visible, two or three dimensional, pictorial, artwork or design element that employs light emitted from and/or transmitted through part or all of it that can be seen from one or more of it's its sides or angles;
(5) the image-making medium or work has subject matter pertaining to or concerned with light or a portrayal or representation of light in any form, it has such subject matter and it is realistic, representational or abstract; it shows fireworks, stars, the sky, skylight, natural light, sunset or sunrise; it shows light emitted in gradations; it has one or more other effects of light; or it has a combination of these; or
the image-making medium or work has the means for such subject matter to be created, and/or for part or all of it to be changed, developed and/or reworked,
(6) the work has a visible aesthetic effect or design resembling that: in a known conventional work of art or design; resembling that is a known kind of art or design; or resembling that in an image by Rembrandt van Rijn, Vermeer, a Dutch Old Master, Turner, Van Gogh, Monet, Seurat, an Impressionist artist, Jackson Pollock, Marc Rothko, Brancusi, Noguchi, Tiffany, I.M. Pei or another well-established image-maker; or it is a combination of these, and
this effect or design is static or part or all of it is capable of changing at any rate of speed, even though these conventional images may be unchanging, still or with other specifications that are different; and/or
or the work has such a visible effect or design and the means for part or all of it to be changed, developed and/or reworked,
(7) the image-making medium or work has: a photographic image, a photographic emulsion, or a photographic transparency; a colorant; a conventional image making medium, a conventional artist's medium, a conventional artist's medium, painting, drawing, a primer conventionally used to make images or an underlayer; development from the use of a conventional image-making process; it has an imprimatura, a ground and/or collage; the work has metal, fabric, paper, wood, clay, ceramic, a gem, or a stone; or a combination of these;
(8) the image-making medium or work has at least one aesthetic property from: an additive or subtractive process; a conventional image-making process; a conventional image making medium, a conventional artist's medium or a conventional artist's painting or drawing medium; at least part of a drawing, picture or design, or one of these that is figurative, realistic, representational, abstract, surrealistic, a landscape or a still life; a depiction or representation of a recognizable subject; a primer conventionally used to make images; an underlayer; a colorant; a light source, light emitting display or means of emitting light; a material, a device or another means that provides or effects light properties; a filter; crystal, gem, stone, fabric, paper, clay, ceramic, wood, metal, an air pocket; a conductive, semi-conductive or holographic pigment; a photographic image, a photographic emulsion or a photographic transparency; writing, text, incising, inlay, carving or embossing; texture, irregular texture or texture deeper than a sandblasted surface or a sanded surface; or moving part or means to be capable of movement; music or sound; or a combination of these;
(9) the image-making support or work is made with the means for the creation, development, reworking or change of one or more visible light effects in addition to any light the work might emit, and/or it is a light effect that: i) is photochromic, dichroic, iridescent, reflective and/or holographic; ii) employs a lens, a Fresnel lens, a grating, a filter, a diffraction grating, a prism, crystal, glass, a gem or a lenticular lens or form; iii) is a change in the work's transparency, translucency, opacity, reflectivity or mirror reflectivity, is change in the path of the light passing through the work, and/or change in its coloration; or it is change from being reflective or mirror-like reflective to being light transmissive or transparent and/or the reverse; iv) it is a change from being entirely or partially light-emitting to being entirely or partially non-light-emissive and transparent, translucent or opaque, with the aesthetic work other than an installed window or group of windows with simple geometric shapes that look like conventional windows and that can change reversibly from being entirely transparent to entirely emitting uniform white or colorless light, and that might change with a conventional on/off switch and/or dimmer; v) it is a projection, or a visible two or three-dimensional hologram, or such a hologram that is: partially or entirely intangible, capable of aesthetic change, interactive or part of an interactive system, or a combination of these; or vi) it is a combination of these;
(10) the image-making medium or work have a hologram or it has a hologram that appears two or three dimensional and partially or entirely intangible, it has a hologram that is capable of change or it has a hologram that is a combination of these; or
(i) it has at least one such hologram and it or part or all of the work: can change over time, can self-actuate, is unchanging, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; and/or
(ii) it has at least one such hologram that partially or wholly: activates, triggers, stimulates, produces, interactively, by the use of sensing, detecting or recognition capability or by sensing or detecting touch, movement or gesture, is at least part of a process by which part or all of the work or one of its aesthetic elements: changes, modulates, moves or stop moving; becomes visible, hidden, audible or silent; or changes it's its electrical current, color, a light property, form, shape, position, volume, density, viscosity, appearance, a physical property or a visible aesthetic property;
(11) the image-making medium or work is prepared as or with one or more light emitting devices; light emitting materials; light emitting silicon; or electroluminescent materials;
(12) the image-making medium or work is prepared with one or more of:
(i) it has at least one visible light effect; it has at least one visible light effect and at least part of its form is light-emissive, transparent and/or translucent; and/or it has a material, a device or another means that provides or effects light properties;

(ii) it has a visible element, effect or part that is partially or entirely: reflective, photochromic; dichroic; iridescent; a hologram; crystal, a filter; an air pocket; a pigment that is conductive, semi-conductive or holographic; or a combination of these;

(iii) it has a form that functions as: a lens; a Fresnel lens; a grating; a diffraction grating; a prism; or a lenticular lens or form; or a combination of these; or a visual effect from one or more of these, (iv) it has the ability to visibly change it's its level of transparency; the ability to visibly change from being entirely or partially transparent or translucent, to being entirely or partially opaque;

or the ability to visibly changing from being entirely or partially light emitting to being entirely or partially transparent or translucent;

(v) it has an electrochromic technology, material, display or effect, or it is electrochromic and capable of changing color; capable of changing its state of or level of transparency, translucency, reflectivity and/or light emission; and/or capable of changing the light passing through it; or (vi) it has means of having and using energy or electricity from a source that is part of it or separate from it; it has a battery, a power source, a solar cell and/or photovoltaics; or it has its means of having and using energy is hidden from view and/or entirely or largely unobvious or unapparent to viewers looking at the work as a whole; or (vii) it has one or more of the variations above, that is visible continuously, that is visible discontinuously, the visibility of which changes over time, that self-actuates, that is visible by interactivity, that is visible as a response, and/or that is visible in using: a trigger, a stimulant, an influence, programming, means of activation or input; using means or a part that enables the work or part of the work to be interactive, controlled, modulated or changed; using a control mechanism or device; using sensing, detection or recognition capability; and/or using a wireless method, the Internet or a broadcast method; and/or part or all of the image-making medium or work is capable of emitting sound, speech and/or music, showing text and/or writing, or emitting light; part or all of the image-making medium or work shows color, light and/or a light effect that is unchanging or capable of change; part or all of the image-making medium or work is capable of flexing, rolling, scrolling or folding; or any combination of these;

(viii) the image-making medium or work has one or more of the specifications above that is part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (ix) it has any combination of these;

(13) the image-making medium or work has sound, music or voice; and/or the ability to responding to sound, music or voice; the image-making medium or work has writing or text; the image-making medium or work has the ability to move or to move a part, and/or it is kinetic;

(14) the image-making medium or work is free of a computer; it is free of a visible computer; or it has a computer with a visible display screen that provides or contributes to an aesthetic element, and the utilitarian elements of this computer are mostly or entirely hidden from view, they entirely or predominantly unobvious or unapparent to viewers looking at the whole, or a combination of these; or the image-making medium or work has a computer that leaves the work free from a functionality that is a separate alternative to the purpose described in claim 7; or the image- making medium or work has a computer that is subsidiary or subordinate to its visible aesthetic effect or effects; or the image-making medium or work has a computer for the purpose of creating, further developing, changing, reworking and/or showing a two or three-dimensional artwork, picture or design from one or more of the work's sides or angles, and this computer is free of functionality that is a separate alternative to this purpose, or the image-making medium or work has a computer for this purpose in a supportive or subsidiary capacity;

(15) the image-making medium or work has a computer with one or more of these specifications:

(a) this computer is free of a visible display screen; this computer is hidden part of the image-making medium or work;

(b) this computer is free of word processing capability; this computer is free of a tangible alphanumeric keyboard; this computer is free of communication capability using visible legible text or numbers;

(c) this computer has a display screen that is: (c-i) free of visible clearly legible text and numbers, (c-ii) showing clearly legible text and numbers: only temporarily and/or only on part of the image-making medium or work; and/or (c-iii) showing text, numbers or both that are poetic, nonsensical, unclear in appearance, with an aesthetic purpose, or a combination of these;

(16) the image-making support or work provides the means for a unique work of art or design to be created on it, in it, with it or a combination of these, thus the image-making process and the art or design that can be created is free from dependence on the input, the display, or the input and display of an image, a photograph, a film or video made externally, and art or design might be made free of such image input or using it;

(17) the image-making support or work has one rectangular OLED and the image-making support or work provides the means to create an image of art or design using image-making options that are greater, more complex or different than a viewing device for displaying photographs made externally and input into it; or such an image-making support or work capable of being displayed on a table; such an image-making support or work that also has an extreme minimal style means of display with an extreme minimal style frame; or an image-making support or work with a combination of these features;

(18) the image-making support or work is made by one image-maker or by one group of image-makers, and transferred to one or more different image makers who further develop it, display it or both;

(19) the work is pictorial and/or it is visually more complex than conventional uniform privacy glass or window;

the work is other than a conventional window that might be called a smart window, that is capable of change, capable of uniform change, or capable of change for purely utilitarian purposes, to adjust light transmitted, heat and/or glare;

and in addition or instead, the work or part of it shows a subject that is: not physically present, realistic, representational, abstract, surrealistic, and/or visually non-uniform; and/or

(20) a combination of any of these.

21. The method of claim 7 in which the two or three dimensional image-making support medium or the work is prepared to have one or more of these specifications:

(1) the image-making medium or work is prepared as or with one or more: light-emitting diodes (LEDs); organic light emitting diodes (OLEDs); liquid crystal displays (LCDs), liquid crystals, cholesteric liquid crystals, and/or liquid crystal elastomers, or it is or it has at least one these and one or more of them is: at least partially flexible, thin, very thin, transparent or translucent; or it is or it has one or more of these and part or all of it or them can change over time, can be changed, can self-actuate, or can be changed by interactivity, using a responsive feature, using a trigger, stimulant or influence; using means or a part that enables the image-making medium or work or part of it to be interactive, controlled, modulated or changed; using a control mechanism or device; using sensing, detection or recognition capability; using programming or using means of activation or input; using a wireless method, the Internet or a broadcast method; or it is or it has a combination of these;

(2) the image-making medium or work is made with or as: a visible display device that has multiple non-light-emissive colorants capable of changing their visibility, their color or both with energy; or it is made with or as a technology, material or display that is one or more of: electronic paper; an e-material; electro-optic, reflective, a reflective display, a non-light-emitting display, bistable and/or electrophoretic; or it is made with or as a technology, material or display prepared with:

(i) cells, globes, capsules, spheres, a honeycomb structure, or enclosed parts, electrochromic molecules, conductive polymer, liquid crystal, cholesteric liquid crystal, microvariations of any of these, or organic electronics;

(ii) parts that show different coloration when their position changes or when the position of their contents or parts changes;

(iii) non-light-emissive colorants in one or multiple microcapsules; and/or (iv) charged non-light-emissive colorants that are able to change from visible to hidden, or from hidden to visible with electrical current which causes their position to change within a fluid with respect to an electrode; or (3) the image making support and/or the work are made with one or more of: means of having and using energy from a source that is part of it or separate from it; a power source, a battery, a thin film battery, a solar cell or panel, a non-silicon solar or photovoltaic cell; a photovoltaic device or cell; a circuit, conductive ink, or a composition, material or technology that provides or carries power; one or more of these made with at least one nanomaterial; a means of conducting energy or electricity using at least one nanomaterial; or one of these that is at least partially transparent or translucent, flexible, thin or very thin; or a combination of these;

(4) the image making support medium or the work is accompanied by instructions for developing it as or into art, design or architecture; and/or it is accompanied by instructions for displaying it as art, design or architecture;

(5) the work has a title as art; the work is has a visible signature or distinguishing mark identifying the artist, designer or group of artists and/or designers who created it, which is other than the mark of an industrial or commercial manufacturer or scientific organization;

(6) the image-making medium or work has texture, and/or it has irregular texture, it has texture deeper than a sandblasted surface or a sanded surface, it has embossing, carving or incising, it has texture made by taking one or more positive or negative impressions from one or more organic or natural materials, or it has a texture resembling this; and/or it has texture that provides at least one aesthetic property;

(7) most or all of the utilitarian elements of the image-making support medium or the work are integrated into the work as a whole by being hidden from view and/or by being entirely or predominantly unobvious or unapparent to viewers looking at it as a whole, or they are integrated in this way until it is activated; and/or most or all utilitarian elements of the feature that enables the image-making medium or work to change or most or all utilitarian elements of its interactive or responsive feature are integrated into it as a whole by being hidden from view and/or by being entirely or predominantly unobvious or unapparent to viewers looking at it as a whole, or they are integrated in this way until it is activated;

the image making support medium or the work are made with one or more parts for mounting, installation or display; with electronics, wiring, electrical parts, cords, control buttons, the battery or power source; a framework, support or bracing hidden from view and/or entirely or largely unobvious or unapparent to viewers looking at the work as a whole;

(8) the image-making support or work is woven, it is a textile, and/or it is non-woven;

(9) the image-making support or work is made with two or more parts that are physically connected or separate;

(10) the two or three-dimensional image-making support or work has any size or shape, it is a sculpture, an aesthetic work with a utilitarian function, a work of design, a mural, a kinetic work, a mobile, an openwork art form, a pictorial work, or fine art free of utilitarian function,

(11) the image-making support or work is or it is made into a two or three-dimensional pad of any size and shape, or it is or it is made into a two-dimensional pad that is planar;

(12) the image-making support or work has at least one display device and it is made and/or used with one or more additional display devices; the image-making support or work has one or more display devices or light-emitting display devices, OLEDs, LEDs, LCDs, interactive image-making supports; e-material or electronic paper displays; or a combination of these; and this or these additional display devices are part of the work by being physically connected to and/or by being physically separate;

(13) the image-making support or work is prepared with one or more of:

(i) a form that is largely or almost completely made of a conventional artist's support medium or of its ingredient or ingredients;

(ii) a form that visually resembles or looks similar to a conventional artist's support medium, canvas, paper, acrylic sheeting or clay, or it is such a form that also functions in a manner that is like or similar to the conventional artist's support medium it looks similar to or resembles; and/or
(iii) the visual appearance of or resembling a conventional artist's canvas; texture resembling conventional canvas; deckled edges; irregularities resembling handmade paper;

(14) the image-making support or work has a form or a part that is substantially or entirely transparent or translucent; it has a form or part made with at least one nanomaterial and/or polymer; or it has a form or a part with a combination of these specifications;

the image-making support or work is partially or entirely: rigid, inflexible and/or flexible; capable of folding, unfolding, rolling out or scrolling; or a combination of these; or the image-making support or work is partially or entirely: linear; planar or non-planar; geometric, non-geometric, non-uniform, irregular, uneven; or with at least one curve, angle or undulation; it has a form that is at least partially hollow, with at least one open space within it, or openwork; it has at least one air pocket; it has a form that has irregularities so that it looks handmade; it has deckled edges; or a combination of these; or the image-making support or work has an overall shape or form that depicts or represents a recognizable subject or that is figurative; or

(15) the image-making support or work has a forms that is: (i) discontinuous, (ii) made with two or more parts that are joined or that are separate; (iii) it has a strong, stabile or permanent form made of two or more parts with joints, bonds or points of contact that appear visually to be too slight, too small or too few in number for the form to be strong, stabile or permanent; or (iv) a combination of these;

(16) the image-making support or work has a form that it partially or entirely: (i) layered,
(ii) transparent and/or translucent; (iii) made with one or more image supports; (iv) made with a layer, part or other ingredient that enhances it's its permanence or stability; and/or (v) a combination of these; or

(17) the image-making support or work has a planar or two dimensional form that is transparent or translucent and made with polymer, glass or both, with (i) one or more light sources, OLEDs or other LEDs within it, attached to it, or included as part of it; (ii) a conductive polymer; and/or (iii) an electrical conductor that is not visible or not apparent to viewers; or

(18) the image-making support or work has a layered form that has conductive polymer in between two or more layers that are: transparent, translucent, polymeric, glass, non conductive or poorly conductive or a combination of these; or such a layered form with conductive polymer between it's its other layers wherein this conductive polymer is capable of conducting electricity to one or more devices or light emitters that are also sandwiched in between its other layers;

(19) the image-making support or work has a form or a planar form with sufficient mechanical or structural properties so that it can support its own weight or be freestanding; or

(20) the image-making support or work has a form with sufficient mechanical or structural properties so that it can support its own weight or be freestanding, and this form or part of it: (i) bonds to a conventional artist's medium; and/or (ii) is one or more of: transparent, translucent, planar, polymeric, resembling a conventional artist's canvas, canvas board, acrylic sheeting or sheet of paper, made with a fine art stabilizer that provides or enhances it's its ability to remain unchanged with exposure to ultraviolet light, or made with a fine art stabilizer that enables or enhances bonding; or

(21) the image-making support or work has a form that is sufficiently strong, stabile or permanent, and one or more of:

it has a structural form or its form is sufficient to serve as the work's structure; it is rigid, planar, slight, thin or very thin; unreinforced, unbacked or unbolstered; it has a form made with a strengthening stabilizer; it is a form that is an image support or an image support stabilizer or it is a form made with an image support or image support stabilizer; and/or it has a form prepared as a mural or as a design on a wall, ceiling or other architectural structure;

(22) making the work as or developing it into an aesthetic work, with a visible overall aesthetic and a visible purpose for visual observation or display; and/or

(23) integrating all of the aesthetic work's elements visibly into the work as one whole, making the aesthetic work a whole in and of itself;

(24) the image-making support or work is made with a means of display as two or three dimensional art or design; it is displayed as art or design; it is hung, installed or mounted for display; or a combination of these;

the image-making support or work is prepared for viewing with one or more of: a framework, a support or bracing or a support or bracing hidden from viewer's visibility; a matt or a frame; a rigid mount system, a wire mount system, or a combination rigid and wire mount system; the image-making support or work is prepared with a means of installation, mounting or display on a wall or vertical surface or by hanging; it has a hook or wire attached to enable hanging; or it has holes to enable hanging;

the image-making support or work has a means of installation, mounting or display that leaves space between it and the wall, ceiling, floor or other structure from which it is installed, mounted or-displayed; the image-making support or work has a base, a stand or a pedestal for viewing; or the image-making support or work has the ability for at least part of it can scroll, roll out and/or physically unfold;

(25) the image-making support or work is made with at least one nanomaterial such that:

(i) it is stronger than it would be if it were entirely free of nanomaterials while it's weight, structure, form and/or mass are about the same or less than they would be if it were entirely free of nanomaterials;

(ii) it is made as or developed into art, design or architecture, and this work is stronger than it would be if it were entirely free of nanomaterials while it's weight, structure, form and/or mass are about the same or less than they would be if the work were entirely free of nanomaterials;

(iii) it is about as strong as it would be if it were entirely free of nanomaterials while it's weight, structure, form and/or mass are less than they would be if it were entirely free of nanomaterials; or (iv) it is made as or developed into art, design or architecture, and this work is about as strong as it would be if it were entirely free of nanomaterials while it's its weight, structure, form and/or mass are less than they would be if it were entirely free of nanomaterials;

(26) the two or three dimensional image-making support or work is made in any shape or size, and it is made with a utilitarian part, it is made so that it can serve a utilitarian function, or it is made so that it can serve a utilitarian function as one of these or as a reinvented version of one of these works: furniture, a table, a chair, a stool, a chest, a cabinet, a cart, a bench, a gate, a fence, an awning, a fountain, a stage set, a door, partition, a screen, or as a set, grouping or compositional arrangement of these that is a single work; a tent, an awning, a fountain, a basket, a case or container, candelabrum, a window, a skylight, a lunette, shades, shutters, a tile, a column, or a set, grouping or compositional arrangement of these that is a single work; a building façade, a wall, a ceiling, a floor, stairs, a crosswalk, a bridge or an architectural form or structure; craft design; interior design; a work for spiritual or religious use, an alter, a menorah, or a work with a visible element indicating its religious or spiritual function;

a work of design for household use, a vase, a bowl, a tray, a cup or goblet, a plate, a dish, a pitcher, a soup tureen, a table cloth, runner or a placemat;

a wearable image, fashion design, a fashion accessory, a handbag, jewelry, a hat, a belt, a tote bag or a costume; a book or pad that is a new version of the conventional image making blank book or blank paper pad capable of being developed into visual pictorial image; a plurality of associated sheets arranged in a book or pad form capable of use for image making; a form that is one or more sheets or pages from a book or a pad, or a form developed from one or more sheets or pages from a book or pad; a two-dimensional pad, a two-dimensional pad that is planar, or a two dimensional image-making pad; book design, optimally free or nearly free of visible legible text; graphic design;

lighting, lighting design, a light fixture, or as a set, grouping or compositional arrangement with two or more light-emitting devices or fixtures that is a single work;

(27) a combination of any of these.

22. The method of claim 7 in which the two or three-dimensional image-making support medium or work is prepared with one or more of these specifications:

(1) the image making support medium and/or the work is prepared or developed with means that provides or enables interactivity; it is prepared or developed with means that provides or enables interactivity and it is capable of being responsive; or it is prepared or developed with a means that provides or enables interactivity enabling a visible pictorial, artwork or design element to be created, developed and/or changed in a process in which the work is active, or the image making support medium or work has at least one such interactive feature and: it has a control mechanism or device; it has means or a part that enables it or part of it to be controlled, modulated or changed; it is capable of using a trigger, stimulant or influence; it has sensing, detection or recognition capability; it has means of activation, input, or programming; it is capable of using a wireless connection, the Internet or a broadcast method; or it has a combination of these;

(2) preparing the image making support medium or work with at least one interactive feature that enables the creation, development or change of a visible pictorial, artwork or design element on one or more viewable areas wherein the image making support medium or work is active rather than entirely passive, with this interactive feature more complex than or other than a conventional on/off switch or dimmer, and also developing the image making support medium or work so that it shows at least one pictorial, artwork or design element that can be seen from one or more of its sides or angles;

(3) preparing the image making support medium or work with means enabling the creation, development and/or change of a visible pictorial, artwork or design element on one or more viewable areas wherein it actively responds: to movement, gesture, light, sound, temperature, the environment, a trigger or a stimulant; to a subject that is separate from it and/or not present with it; in a process that uses sensing, detection or recognition capability, wireless communication, broadcasting, input or the Internet; or any combination of these, or any of these and in addition, developing the image making support medium or work so that it shows at least one visible pictorial, artwork or design element; or (4) preparing the image making support medium or work with the means enabling the creation and/or development of a visible two or three-dimensional, pictorial, artwork or design element that can change over time, with the image making support medium or work being active rather than entirely passive, with the pictorial, artwork or design element more complex than or other than the visual effect of a conventional on/off switch, or a conventional dimmer, (5) the image making support medium and/or the work is prepared or developed so that it has a means enabling:

(i) it to actively respond to light or to changes in light, or enabling the creation, development and/or change of a visible pictorial, artwork or design element in a process in which the image making support medium or work actively responds to light or changes in light;

(ii) it has a means enabling it visibly change as a whole or partially in relation to change in natural light, skylight or nature, or enabling such visible change that resembles or looks like change in natural light, skylight or nature;

(iii) image making support medium or work has a means enabling it or part of it to be capable of changing; self-actuating: enabling such change using a control mechanism or device; using means or a part that enables it or part of it to be controlled, modulated or changed; using a trigger, stimulant or influence; using sensing, detection or recognition capability; using means of activation, input, or programming; using a wireless connection, the Internet or a broadcast method; or a combination of these;

(iv) it has a means enabling it to produce sound, music and/or voice, and/or respond to sound, music or voice;

(v) it has one or more of the variations above that is part of or throughout one or more of: an image support; an image support stabilizer; an underlayer; a light source; a light emitting display; an OLED; electronic paper or e-material; a non-light-emissive, reflective display; a form made with polymer or with polymer that is transparent or translucent; a work of art, design or architecture; a work that also serves as part or all of a wall, a ceiling, a window, a floor, furniture, a partition, a light, an architectural form, a wearable design, or a mural or (vi) any combination of any of these;

(6) the image making support medium and/or the work is prepared or developed so that it has a means enabling it to actively respond to one or more triggers or stimulants, or enabling the creation, development and/or change of a visible pictorial, artwork or design element in a process in which the work actively responds to one or more triggers and/or stimulants; or the image-making medium or work is capable of at least one of these kinds of active responses and it includes: use of a control mechanism or device; use of means or a part that enables the work or part of it to be interactive, controlled, modulated or changed; use of sensing, detection or recognition capability; use of means of activation, input, or programming; use of a wireless connection, the Internet or a broadcast method; or a combination of these;

(7) the image making support medium and/or the work is prepared or developed so that it has a means enabling it to actively respond to movement and/or gesture, or enabling the creation, development and/or change of a visible pictorial, artwork or design element in a process in which the work actively responds to movement and/or gesture, or the image-making medium or work is capable of at least one of these kinds of active responses and it includes: use of means or a part that enables the work or part of it to be interactive, controlled, modulated or changed; use of a trigger, stimulant or influence; use of sensing, detection or recognition capability; use of means of activation, input, or programming; use of a wireless connection, the Internet or a broadcast method; or a combination of these;

(8) the image making support medium and/or the work is prepared or developed so that it has a means enabling it to actively responds to the environment, to temperature, to heat, to an aspect of one or more of these, or to a combination of these, or enabling the creation, development and/or change of a visible pictorial, artwork or design element in a process in which it actively responds to the environment, to temperature, to heat, to an aspect of one or more of these, or to a combination of these, or the image-making medium or work is capable of at least one of these kinds of active responses and it includes: use of means or a part that enables the work or part of it to be interactive, controlled, modulated or changed; use of sensing, detection or recognition capability; use of means of activation, input, or programming; use of a wireless connection, the Internet or a broadcast method; or a combination of these;

(9) the image making support medium and/or the work is prepared or developed so that it has a means enabling interaction, control of it and/or change of it from a distance, using the Internet, using a wireless connection, or using a broadcast method, or enabling the creation, development and/or change of a visible pictorial, artwork or design element in a process in which the image-making medium or work actively responds to a subject that is separate from it and/or not present with it, or

(10) the image making support medium and/or the work is prepared or developed so that it has a means enabling it to actively respond in a process that uses sensing, detection and/or recognition capability, or enabling the creation, development and/or change of a visible pictorial, artwork or design element in a process in which the image-making medium or work actively responds, and the process uses sensing, detection and/or recognition capability;

(11) the image making support medium and/or the work is prepared or developed so that it has a means enabling it to actively respond in a process that uses the Internet; or enabling the creation, development and/or change of a visible pictorial, artwork or design element in a process in which the image-making medium or work actively responds, and the process uses the Internet;

(12) the work and/or the image-making support medium are prepared or developed with means enabling it to use a wireless connection, or enabling the creation, development and/or change of a visible pictorial, artwork or design element in a process that uses a wireless connection, or the image-making medium or work is capable of at least one of these variations and it includes: use of means or a part that enables it or part of it to be interactive, controlled, modulated or changed; use of a trigger, stimulant or influence; use of sensing, detection or recognition capability; use of means of activation, input, or programming; use of the Internet or a broadcast method; or a combination of these;

(13) the work and/or the image-making support medium are prepared or developed with means enabling it to actively use a broadcast, or enabling the creation, development and/or change of a visible pictorial, artwork or design element using a broadcast, or the image-making medium or work is capable of at least one of these variations and it includes: use of means or a part that enables it or part of it to be interactive, controlled, modulated or changed; use of a trigger, stimulant or influence; use of sensing, detection or recognition capability; use of means of activation, input, or programming; use of a wireless connection or the Internet; or a combination of these;

(14) the image making support medium and/or the work is prepared or developed so that it has a means enabling it to actively respond in a process that uses means of input or means of viewer input, or enabling the creation, development and/or change of a visible pictorial, artwork or design element in a process in which the image-making medium or work actively responds, and the process uses a means of input, or the image-making medium or work is capable of at least one of these kinds of active responses and it includes: the image-making medium or work changing or self-actuating: use of a control mechanism or device; use of means or a part that enables the work or part of it to be interactive, controlled, modulated or changed; use of a trigger, stimulant or influence; use of sensing, detection or recognition capability; use of means of activation or programming; use of a wireless connection, the Internet or a broadcast method; or a combination of these;

(15) the image making support medium or the work is prepared or developed with the means enabling the creation and/or development of a visible, two or three-dimensional, pictorial, artwork or design element or at least one aesthetic element that can change over time with the image-making medium or work being active, that is more complex than or other than the visual effect of a conventional on/off switch, or a conventional dimmer;

(16) part or all of the work and/or the image-making support medium is capable of being interactive, responsive, controlled, modulated and/or changed; or it has this capability when stimulated, activated, self-activated, influenced, triggered, and/or programmed; it has this capability with input, with the use of a control mechanism or device; with the use of sensing, detection or recognition capability; and/or with the use of a wireless method, the Internet or a broadcast method; or any combination of these;

(17) part or all of the work and/or the image-making support medium is made so that:
(a) it is capable of being responsive, self-actuating, interactive, controlled, modulated, changed and/or programmed, or it has a part with this capability; it has this capability when stimulated, activated, influenced or triggered or when externally stimulated, activated, influenced or triggered; and/or
(b) use of the capability in (a) above causes or assists in causing the work, or the image-making support medium, or at least one of their aesthetic elements: to change, modulate, move or stop moving; to be visible, hidden, audible or silent; or to change its electrical current, color, a light property, form, shape, position, volume, density, viscosity, appearance, a physical property, or a visible aesthetic property;

(18) the work and/or the image-making support medium has means, a part, an area, a layer, an element, a device or a mechanism that can be activated, stimulated, triggered or used by: a person intentionally or unintentionally, the environment, temperature, heat, radiation, light, movement, gesture, acidity, pH, magnetism, a magnetic field, a magnetic force, a solvent, a chemical, a liquid, moisture, pressure, stress, programming, electricity, ionic energy, an electron beam, by change in any of these, by sound, voice, using the Internet, using broadcasting, using wireless connection, from a distance, or a combination of these; and
this causes or assists in causing change, modulation or another response in the work, in the image-making support medium, in a part of one or more of these, or in one or more of their aesthetic elements;

(19) the work and/or the image-making support medium has programming and/or means by which a person can intentionally or unintentionally control, change or vary: the electrical current; its color, light, form, shape, movement, position, volume, density, viscosity or appearance; a physical property; an aesthetic element; or a combination of these;

(20) the work and/or the image-making support medium is capable of: (i) visible change, or visible change of at least one aesthetic element; (ii) visible change that is: a modulation; movement or stopping movement; a change from visible to unseen, or from unseen to visible; change in color, in a light property or in emitted light; to be audible, to be silent; change in form, in a physical property, in appearance, in it's its electrical current, in shape, in position, in volume, in density, or in viscosity; or (iii) a combination of these;

(21) the work and/or the image-making support medium is capable of producing sound, music and/or voice; it has at least one aesthetic property from music and/or sound; it is capable of responding to sound, music or voice; and/or
it has one or more of these capabilities and part or all of the image-making medium or work is: self-actuating, programmed, interactive, responsive, it has means of input or activation, it can use means of broadcast, a wireless means and/or the Internet; it can use a trigger, stimulant or influence, it can use sensing, detection or recognition capability; and/or it has a microphone and/or speaker; it has technology or capability for voice or speech recognition; it has means of sensing or detecting sound; or a combination of these;

(22) the work and/or the image-making support medium have the technology or the capability for: speech or voice recognition, movement or gesture recognition, capacitive sensing, human hand gesture-recognition, motion recognition, human body motion recognition, sign language recognition, facial gesture recognition, pattern recognition, sensing or detecting any of these, or a combination of these;

(23) the work and/or the image-making support medium have a touch control or a touch activated device;

(24) the work and/or the image-making support medium have one or more of: a control mechanism or device; an interactive part or device; a viewer input device; a switch, a dial, a button; a touch control or a touch activated device; a drawing device; a stylus or wand to control, interact with or change the work or image-making support medium; a trackball or a mouse; a computer vision system; a mechanism or device which enables control or change when pressure or stress is applied; or a combination of these;

(25) the work and/or the image-making support medium have: (i) a sensor and/or means detecting, (ii) it is capable of sensing and/or detecting: a viewer; movement, gesture, sound, light, the environment or an aspect of it, heat, temperature, change in any of these, or other change; (iii) it has means of sensing and/or detecting plus means of responding or responding with change in the work, the image-making support medium, or one of their aesthetic elements; (iv) it has a technology, sensor, device or ability that is sensitive to or that detects being bent or extended, or, such a technology, sensor, device or ability plus the ability to respond to this as a stimulant, trigger or influence, and/or it has a fabric strain gage or and/or (v) it has a combination of any of these;

(26) the work, part of it or the image support is an artist's canvas, canvas panel, art board, canvas pad or drawing pad; it is similar to one of these or it serves as a new reinvented version of one of these, and in addition or instead
the image-making medium or work's interactive or interactive responsive feature enables the creation, development, change and/or reworking of at least one visible artwork, pictorial, design, pattern, architectural or aesthetic element once, twice, multiple times and/or in an ongoing process, with this change occurring over any period of time at any rate of speed, and with this change visible from one or more of its sides or angles, therefore optionally, one or more sketches, versions, variations, developments, unfinished images and/or finished images might be generated and visible;

(27) the image-making support or work is made with the means for one or more visible aesthetic elements to be created, changed, developed and/or reworked, according to one or more of these descriptions:
using a process in which it is responsive and/or responsive to a stimulant, activation, a trigger or an influence;
using a process in which the image-making medium or work's change is activated by or in response to: a person, a subject or change in a subject that is separate from it, not present with it or distant from it; touch, movement, gesture, sound or voice; light, electricity, the environment or an aspect of it, change in any of these, heat, temperature, pressure, strain, bending, a stimulant, trigger, influence or means of input;
the aesthetic change resembles, it occurs in response to, in relation to, or it is activated by: change that occurs in the real version of its subject matter or in a related subject; change in a subject that is separate from the work, not present with it or distant from it; light, natural light, skylight, nature, a part of nature, an aspect of the environment, change in any of these; gesture, movement, voice or touch; or a combination of any of these;

(28) the image-making medium or work's visible presentation changes over time partially or entirely, at any rate of speed, any number of times, or continuously;

(29) the image-making support or work is made with the means for one or more aesthetic elements to be created, changed, developed and/or reworked, according to one or a combination of these descriptions:

using a brush, a stylus, a pen, a drawing device, any conventional artist's tool or medium, and/or a conventional computer image-making tool; using an input feature of the work or such a feature that is a part or a system; using touch control, a touch screen, a camera, the Internet, a wireless connection or a broadcast method; using sensing, detection and/or recognition capability;

using its capability for: sound, speech or voice recognition, movement or gesture recognition, capacitive sensing, human hand gesture recognition, motion recognition, human body motion recognition, sign language recognition, facial gesture recognition, pattern recognition;

using programming, using an interactive process with human initiation or free of physical contact between a person and any tangible part of the work; using an interactive feature that has an intangible element; using a process in which the image-making medium or work is non-responsive, inactive or other than interactive; or using a process that is a combination of these;

(30) the image-making support or work is made with the means for one or more visible aesthetic elements to be created, changed, developed and/or reworked according to one or a combination of these descriptions:

using a computer; using any number of existing or conventional image making mediums or means used by artists or designers; using one or more additive and/or subtractive processes; by drawing, painting, collage or photography; changing the work's color, one or more of its light properties, its opacity, transparency, translucency or its reflectivity;

by creating or changing the visible subject matter, shapes, spatial depth or form of the image-making medium or work by the use of a computer and/or using other means; adding, reworking and/or removing aesthetic elements that are tangible or intangible; physically changing the work, physically altering its shape, its form, its spatial depth or its structure;

or it is a combination of these;

(31) the image-making support or work is made with the means for one or more visible aesthetic elements to be created, changed, developed and/or reworked which is part or all of one or a combination of:

a two or three-dimensional: picture; design; pattern; artwork; depiction, portrayal or abstraction of a figure, an animal, a still life, landscape, nature, a realistic form or scene, a part or aspect of any of these, subject matter that is not physically present, an illusion of spatial depth that is not physically present, a recognizable subject or a surrealist subject; coloration that looks like flowing color, poured color, bleeding color or stained color, conventional shading or modeling of form, line drawing, a broken color effect, or an antiqued effect; or drawing; or it is the work showing a subject changing in a way that looks realistic or that looks unrealistic or unordinary; or

(32) the image-making support or work is made with the means for one or more visible aesthetic elements to be created, changed, developed and/or reworked which is: change of the work's visible physical movement; film, video or a moving picture presentation; color, light emission, and/or light transmission; music, voice or sound emission; showing and/or telling a story, narrative or spoken words; and/or photography; or it is a combination of these, and the image-making medium or work enables this change to occur any number of times, in a continuous manner if desired and at any rate of speed;

(33) the image-making medium or work's interactive or responsive feature responds to one or more stimuli, triggers or influences; the work's interactive or responsive feature is capable of responding by changing, by repeatedly changing or by continually changing at least one element that is visible and/or audible to viewers; the work is triggered, stimulated, and/or influenced in a way that is unseen by viewers and it is capable of responding in a way that is visible to viewers; the work is capable of responding by changing in a way that is different from the way it is triggered, stimulated, and/or influenced; the work is triggered, stimulated, and/or influenced in a way that is inaudible to viewers and it is capable of responding in a way that is audible to viewers; or a combination of these;

(34) the image-making medium or work requires interaction, responsive interaction and/or human interaction to present an artwork, pictorial or design element and/or to show an artwork, picture or design;

(35) the image-making medium or work's interactive feature is activated free of physical contact between a person and any tangible part of it and/or its interactive feature functions free of physical contact between a person and any tangible part of it; or (36) any combination of these.

23. The method of claim 7 in which the two or three-dimensional image-making support medium or work is prepared with one or more of:

at least one nanomaterial that is man-made and/or grown by man, or that is non-natural; or at least one nanomaterial with a name that begins with the prefix: nano, and that fits a nanox pattern, in which x is anything or x is a word describing the nanomaterial; or it is prepared with at least one nanocomposite, hybrid nanomaterial, nanotube, carbon nanotube, single wall carbon nanotube, graphene, buckypaper, nanoparticle, nanocrystal, quantum dot, nanowire, nanofiber, nanoclay, molybdenum, and/or nanomaterial made with molybdenum; or it is prepared with a nanocomposite, a hybrid nanomaterial, a polymer nanocomposite or a polymer hybrid nanomaterial, that is in the form of a thin or very thin layer, in or on which there is graphene, buckypaper, or at least one but optimally many nanoscale nanomaterials, carbon nanotubes, single wall carbon nanotubes, nanoparticles, nanowires, nanocrystals, nanofibers or molybdenum; or it is prepared with at least one nanomaterial that is partially, largely or completely: (i) nano-pure; (ii) made, manipulated, or engineered on an atomic or molecular scale or from the bottom up; (iii) made, manipulated, or engineered using nanotechnology to control most or all atoms, or to control most atoms or every atom that serves a particular function or that is in a particular position or on a particular part of the image; or (iv) one or more of (i)-(iii) and the nanomaterial is visible to the unaided or naked eye or it is unseen by viewers; or it is prepared with:

(i) a conventional image-making medium made with at least one nanomaterial, (ii) a conventional image making medium that is improved, enhanced, changed or made more permanent by at least one nanomaterial, or (iii) a nanocomposite or hybrid nanomaterial made with a conventional image making medium that is more permanent, stronger, tougher, more resilient, more durable, stiffer, less flexible, less breakable, less fragile, less brittle, or less fibrous than the conventional image-making medium in it's its conventional state, or that is enhanced for use in art, design or architecture or for use in making such works in comparison to the conventional image-making medium; or it is prepared with at least one material or medium that is entirely free of nanotechnological processing or that is made: (i) using bulk technology; (ii) by nature or a by a natural process; and/or (iii) with natural rather than manmade, nanoscale, structure(s), feature(s), or physical phenomena; or the work is prepared this way with at least one nanomaterial; or it is prepared with a conventional medium that is more permanent, stronger, tougher, more resilient, more durable, stiffer, less flexible, less breakable, less fragile, less brittle, less fibrous or enhanced for use in art, design or architecture or for use in making such works, due to one or more nanomaterials; or it is prepared with metal, glass, crystal, ceramic, clay, stone, paper, wood, conventional artist's canvas fabric, and/or plaster in a nanocomposite, a hybrid nanomaterial or a nanomaterial; or it is prepared with or as one or more: devices, machines and/or systems; fabrics, conventional artist's canvas fabrics, textiles, meshes, woven materials, threads, yarns, cords, cables, fibers, wires and/or ropes that is nanoscale or larger, made with one or more nanomaterials; and/or prepared with one or more nanomaterials that are conductive;

it is prepared with at least one fine-art stabilizer; it is prepared with at least one fine art stabilizer that is or that has at least one nanomaterial; at least one fine-art stabilizer that bonds to or enhances the bond to one or more superimposed conventional artists' mediums or paints; or at least one fine-art stabilizer that is a combination of these;

it is prepared with: polymer, transparent or translucent polymer, acrylic, poly(methyl methacrylate), methacrylate ester or methacrylamide derivative, absorbent polymer or conductive polymer, or they are prepared with one or more of these in a nanocomposite or hybrid nanomaterial, or in a polymer carbon nanotube nanocomposite, or a polymer clay nanocomposite;

it is prepared with conductive polymer, or polymer that is capable of conducting electricity and/or emitting light;

the work has conductive polymer as part of a non-woven form that is other than a textile;

it is prepared with one or more of:

(i) a monomer that is methacrylate ester, methacrylamide derivative or methyl methacrylate; (ii) a polymer that is poly(methyl methacrylate) or that is made from methacrylate ester or methacrylamide derivative; (iii) any of these that are strengthened, made stiffer or made more rigid by at least one nanomaterial, by a fine art stabilizer or by another polymer; (iv) polycarbonate; (v) a polymer and a stabilizer; (vi) a polymer and a stabilizer that provides or enhances its ability to remain unchanged with exposure to ultraviolet light or to remain color stable; or (vii) any of these that are transparent or translucent forms;

it is prepared with a viewable surface at least part of which has an absorbent polymer, and superimposing this absorbent polymer with a paint or other colorant to modify or change its color and/or light property;

it is prepared with: a polymer that is re-mendable, self-healing and/or regenerative; a polymer that is capable of changing or responding to stimulation, a control, activation, a trigger or influence; a photorefractive polymer, a polymer gel, hydrogel, or redox polymer; a shape memory polymer; and/or an ionomeric polymer-metal composite;

it is prepared with a material or a polymeric material that is: electroactive, thermochromic, piezochromic, piezorochromic, piezoelectric, solvatochromic, carsolchromic or gasochromic; a phase change material; or it is prepared with a photonic colorant, a photonic crystal, a photonic material, a photonic band gap material or structure, a synthetic opal or a synthetic opal containing silica spheres or imbibed with-liquid crystal, polymerized crystalline colloidal arrays, or gel particles embedded in crystalline colloidal arrays;

it is prepared with or is a field emission display;

it is prepared with a smart fluid that is a particle filled, oil based suspension that changes in viscosity reversibly or that changes from liquid to solid reversibly; electro-rheological or magneto-rheostatic fluids; a polymer or conductive polymer magnet; or porphyrin; or it is prepared with one or more organic electronics, polymer electronics, printed electronics; one or more of these that is at least partially transparent or translucent, or a combination of these; or it is prepared with a conductive electronic material or device that is: made with at least one nanomaterial; at least partially transparent or translucent; flexible; made with polymer or conductive polymer; or a combination of these; or it is prepared with an integrated circuit or chip, or a non-silicone integrated circuit or chip;

it is prepared with a transistor, a thin film transistor (TFT), a backplane, a TFT backplane, an active matrix backplane; a light emitting transistor, an organic transistor, one of these that is at least partially transparent or translucent; or a combination of these; or it is prepared with any combination of these.

24. The method of claim 7 in which Ihe two or three dimensional image-making support medium or work is prepared with one or more of these specifications:

(i) it has a portrayal, depiction or abstraction of Ihe sky. the light of Ihe sky, nature, a natural environment or scene, landscape, part thereof, plants, flowers or still life; and/or a portrayal, representation or abstraction of one or more people, human forms, part thereof, human heads or human torsos; one or more animals or parts of animals; subject matter that is pictorial and/or a pattern; any combination of these;

it has any of these that are: static, changing or that can be changed; that is: abstract, representational, realistic, surrealistic, or the depiction or representation of a recognizable subject; any of these that arc at least partially formed with light in one or more colors; or it has any of these that are at least partially formed by color or light changing as the real version of the subject matter might change or in a manner that portrays or represents the real version of the subject matter; or (ii) it has one or more of the variations above that changes over time, self-actuates, that changes discontinuously. interactively, in a responsive process, using: a trigger, a stimulant, an influence, programming or means of activation or input; using means or a part that enables (he work or part of the work to be interactive, controlled, modulated or changed; using a control mechanism or device; using sensing, detection or recognition capability; and/or using a wireless method, the Internet or a broadcast method;

(iii) it has any of the variations above with the work capable of producing sound, music and/or voice, and/or capable of responding to sound, music or voice;

(iv) it has one or more of the above as part of or throughout one or more of: an image support; an image support stabilizer; an underlayer; a light source; a light emitting display; an OLED; an e-material or electronic paper; a non-light-emissive. reflective display; a form made with polymer or with polymer that is transparent or translucent; a work of art. design or architecture; a work that also serves as part or all of a wall, a ceiling, a window, a floor, furniture, a partition, a light, an architectural form, a wearable design, or a mural; or (v) it has a combination of these.

25. The method of claim 7 in which the two or three-dimensional image making support medium or work is prepared as a two or three-dimensional mural, or it is prepared as a two or three-dimensional mural with one or more of these specifications:

(a) the mural is pictorial; kinetic; fine art; a work of design or a work of architecture;

(b) the mural shows: a figure, an animal, a still life, landscape, nature, the sky, light of a sky, a part or aspect of any of these; subject matter that is not physically present; drawing; collage; a pattern; a depiction or representation of a recognizable subject; a two-dimensional depiction of three-dimensional form; an illusion of spatial depth that is not physically present; it shows at least part of a drawing, picture or design, or the mural shows one of these that is figurative, realistic, representational, abstract, surrealistic, a landscape or a still life; or the mural shows a changing or unchanging design, drawing, pattern, artwork or picture or it shows this using light it emits;

(c) the mural has at least one light effect; the mural or part of it is capable of emitting light, the mural is capable of serving as a light fixture and/or the mural can serve as lighting design;

(d) the mural is partially or entirely self-actuating, capable of being changed, or the mural is capable of change by interactivity, using a responsive feature, using a trigger, stimulant or influence, using a means or a part that enables at least part of it to be controlled, modulated or changed; using a control mechanism or device; using sensing, detection or recognition capability; using programming; using means of activation or input, using a wireless means, the Internet or a broadcast method;

(e) the mural is partially or entirely: transparent, translucent, opaque, rigid, inflexible, flexible; capable of rolling, scrolling and/or folding; with at least one curve, angle or undulation; made with two or more parts or layers that are joined or separate; made with two or more parts that emit light; layered; made with a layer, part or other ingredient that enhances permanence or stability; made with at least one image support, image support stabilizer, strengthening stabilizer, underlayer, frame, framework, support or bracing; or made with any combination of these;

(f) the mural has: means of installation or display; it has means of display on or in a wall or vertical surface; it has a mount, a mount part or means of mounting; it has means enabling it to partially or entirely roll out, roll up, scroll, fold or unfold; it has a hook, wire, holes and/or means that enable it to be hung; the mural is capable of freestanding, or a combination of these;

the mural is on, in, or on and in a wall, a partition, a ceiling, a window, a floor or a support;

the mural has a means of attaching or installing on, in, or on and in: a two or three dimensional support or structure, a wall, a partition, a window, a ceiling, a floor, one of these that is partially or entirely transparent or translucent, part of one or more of these forms, or the mural is one work with the means of attaching or installing on, in, or on and in two or more of these forms; or the mural's means of attaching or installing on a support is or has one or more: strong bonds, loose bonds and/or tacks;

the mural's means of attaching or installing on a support is or has a means enabling the mural to also be reworked, removed, or removed and reinstalled or reattached, or a combination of these; and/or the mural has one or more parts hidden from view and/or entirely or largely unobvious or unapparent to viewers looking at the work as a whole, and this part or these parts are: for mounting, installation or display, one or more utilitarian parts; electronic parts, wiring, cords, control buttons, its battery or power source; a framework, support or bracing; an interactive feature or part, and/or most or all of its utilitarian elements;

(g) the mural is part or all of: an architectural form or structure, a wall, a work of design, a work of interior design, a door, a ceiling, a floor, a building façade, a window, a skylight, a lunette, a stage set, a partition, a screen, furniture, a table, a cabinet, a case or container, a shade, a grouping or set of tiles, a freestanding work, craft design; a work that functions as lighting; a set, grouping or compositional arrangement of forms that is a single work of art, design or architecture; or any combination of these; or (h) the mural is made with any combination of these.

26. The method of claim 7 in which the two or three dimensional image-making art-design medium or work has one or more of these specifications:

A) it is capable of being responsive, self-actuating, interactive, controlled, modulated, changed and/or programmed, or it has a part with this capability; it has this capability when stimulated, activated, influenced or triggered or when externally stimulated, activated, influenced or triggered;

B) use of the capability in A) above causes or assists in causing the image or the image-making support medium, or at least one of their aesthetic elements: to change, modulate, move or stop moving; to be visible, hidden, audible or silent; or to change its electrical current, color, a light property, form, shape, position, volume, density, viscosity, appearance, a physical property, or a visible aesthetic property;

C) the work or the image-making support medium has means, a part, an area, a layer, an element, a device or a mechanism that can be activated, stimulated, triggered or used by: a person intentionally or unintentionally, the environment, temperature, heat, radiation, light, movement, acidity or pH, magnetism or magnetic field, a solvent, a chemical, a liquid, moisture, pressure, stress, programming, electricity, ionic energy, an electron beam, or by change in any of these, and this causes or assists in causing change, modulation or another response in the image, in the image-making support medium, in a part of one of these or in one or more of their aesthetic elements;

D) the work or the image-making support medium is prepared with one or more of: programming, means which enables it to be programmed; a computer, part of a computer or memory; an interactive part, means device or system; sound, music, light, or the presence and the absence of sound, magnetism or a magnetic force, music or light; a microphone or a speaker; a control mechanism or device; a viewer input device, a switch, a dial, a button, a touch control or touch activated device; a mechanism or device which enables control or change when pressure or stress is applied, a drawing device, a stylus or wand to control, interact with or change the image or image-making support medium; a trackball or a mouse; a computer vision system; means of responding to sound or voice command; technology or capability for: speech or voice recognition, movement or gesture recognition, capacitive sensing, human hand gesture recognition, motion recognition, human body motion recognition, sign language recognition, facial gesture recognition, pattern recognition, sensing or detecting; a fabric strain gage or a technology, sensor, device or ability that is sensitive to or that detects being bent or extended, or, such a technology, sensor, device or ability plus the ability to respond to this as a stimulant, trigger or influence; means of controlling, interacting with or changing the image or image-making support medium from a distance, using the Internet, using wireless communication or using a broadcast method; a sensor, means of sensing or detecting a viewer, movement, sound, light, the environment or an aspect of it, heat, temperature, change in any of these or other change, or such means of sensing or detecting plus means of responding or responding with a change in the image or image-making support medium, or in one of their aesthetic elements;

a part that is a camera that is subsidiary or that is subordinate in proportion to the visible work as a whole or hidden from view, or making the work free of a camera; a means of being programmed; a means by which a person can intentionally or unintentionally control, change or vary the electrical current, color, light, form, shape, movement, position, volume, form, density, viscosity, appearance, a physical property or an aesthetic element of the image-making support medium or the work; an interactive feature or part which is hidden from view, unobvious or unapparent to viewers, or an interactive feature that is perceived to be visually continuous with, or visually integrated with the appearance of the rest of the image-making support medium or image; a photorefractive polymer absorbent polymer, polymer gel, hydrogel, or redox polymer; a shape memory polymer; an ionomeric polymer-metal composite; conductive polymer; or polymer capable of changing or responding to stimulation, a control, activation, a trigger or influence;

a solar cell, photovoltaics; a non-silicon solar or photovoltaic cell; a solar cell or photovoltaics applied or partially applied by painting, brushing, printing, spraying, spin casting, solution processing or a solution coating method; a power source, means of carrying power, a battery, a thin film battery, a circuit, an electrode, conductive ink, or a composition, material or technology that provides or carries power; polymer electronics, printed electronics, an integrated circuit or chip, a non-silicone integrated circuit or chip; a transistor, a thin film transistor (TFT), an organic transistor, a light emitting transistor, a backplane, a TFT backplane, an active matrix backplane; a nanoscale device, machine or system; a light emitting material, light emitting silicon; an electroluminescent material, a metal coated polymer, a polymer coated metal or a semiconductor; a material or a polymeric material that is: photochromic, thermochromic, piezorochromic, piezoelectric, piezochromic, solvatechromic, carsolchromic, electroactive, gasochromic, a photonic colorant, a photonic crystal, a photonic material, a synthetic opal or a synthetic opal containing silica spheres or imbibed with liquid crystal, polymerized crystalline colloidal arrays, gel particles embedded in crystalline colloidal arrays, a photonic band gap material or structure; a phase change material; liquid crystal, liquid crystal elastomer; a smart fluid that is a particle filled, oil based suspension that changes in viscosity reversibly or that changes from liquid to solid reversibly; electro-rheological or magneto-rheostatic fluids; a polymer or conductive polymer magnet; porphyrin; a polymer that is re-mendable, self-healing or regenerative; a hologram or a hologram that appears two or three dimensional and at least partially intangible; or one or more of the above, a device, a material and/or a conductive electronic material or device that is: at least partially transparent, translucent or flexible; thin or very thin; made with polymer or conductive polymer; a nanomaterial or made with at least one nanomaterial, carbon nanotube or carbon nanomaterial; or made in a roll to roll or continuous manufacturing process, a printing process, a coating process or a non-vacuum process;

E) the work or the image-making support medium has one or more from A) or B) above that functions with, that employs, that is activated by, stimulated by, triggered by, produced by, or produced in part by one or more from C) or D) above;

F) the work or the image-making support medium has or is an OLED, a LED, a light emitting device or display, a field emission display, electronic paper or an e-material, another device, machine or system; or the work is prepared with or as at least one of these and also with one or more from A) - E) above; or G) the work or the image making support medium is prepared according to one or more from A) - F) above and: it has at least one device that is partially or entirely transparent or translucent; the work has a form or a part that is partially or entirely transparent or translucent; the work is made with polymer or with transparent or translucent polymer, or a combination of these;

H) at least part of the work or the image-making support medium shows a visual presentation, a visible or aesthetic element, color and/or light that is capable of partially or entirely changing over time at any rate, or changing over time like or as video or film;

I) any combination of any of the above.

27. The method of claim 3 in which the finished or unfinished, two or three-dimensional artwork, picture, work of design, or work of architecture or one or more of its aesthetic elements changes or can be changed, partially, on one or more sides or areas or wholly, one or more times over any length of time, to create the work, to present the work, to develop the work, to rework it, or for a combination of these purposes; and/or the work is partially or wholly created, developed, changed, seen, and/or recreated in a process in which one, two or more finished and/or unfinished versions or variations are made over any period of time using one or more of the work's sides or areas.

28. The method of claim 3 in which the image support medium, artwork, picture, work of design or work of architecture has two or more parts that are physically connected, that are separate or it has a combination of these.

29. The method of claim 3 in which the image support medium, artwork, picture, work of design or work of architecture has at least one display device and it is made and/or used with one or more additional display devices that may be physically connected, separate, or both; or the work has this or these additional display devices and they are one or more: display devices, interactive image-making supports, a light-emitting displays or devices, e-materials, electronic paper devices; OLEDs, LEDs, LCDs, or a combination of these.

30. The method of claim 3 in which the image support medium or the finished or unfinished aesthetic work is graphic design, graphic art, it is book design; or it is an image making book, an image making pad or it resembles a conventional image making book or pad; or it is a book or pad that is a new version of the conventional image making blank book or blank paper pad capable of being developed into visual pictorial image.

31. The method of claim 3 in which the image support medium or the finished or unfinished aesthetic work is a two or three dimensional pad of any size and shape; it is a two-dimensional pad that is planar, or it is a two dimensional image-making pad.

32. The method of claim 6 in which the two or three dimensional image support medium, artwork, picture, work of design, or work of architecture is free of a computer, or it has a computer for the purpose of creating, further developing, reworking and/or showing a two or three-dimensional artwork, picture or design from one or more of the work's sides or angles, and this computer is free of functionality that is a separate alternative to this purpose;

the finished or unfinished artwork, picture, work of design or work of architecture has a computer that is subsidiary or subordinate to the work's visible aesthetic effect or effects;

the work has a computer that is free of a visible display screen; the work has a computer that is a hidden part of the work; it has a computer that is free of word processing capability; it has a computer free of a tangible alphanumeric keyboard; it has a computer free of communication capability using visible legible text or numbers;

the work has a computer with a display screen that is: (a) free of visible clearly legible text and numbers, (b) showing clearly legible text and numbers: only temporarily and/or only on part of the work; or (c) showing text, numbers or both that are poetic, nonsensical, unclear in appearance, with an aesthetic purpose, or the work has a combination of these.

33. The method of claim 6 in which the two or three-dimensional image support medium, artwork, picture, work of design, or work of architecture is or has at least one display, material or technology that is electronic paper or an e-material; or it is or has a non-light-emitting display capable of change that is electro-optic, bistable and/or electrophoretic; the work is or has a display device with multiple non-light-emissive colorants capable of changing their visibility, their color or both with energy; the work is or has a non-light-emissive display prepared with non-light-emissive colorants in one or multiple microcapsules; and/or the work is made with or as a technology, material or display prepared with charged non-light-emissive colorants that are able to change from visible to hidden, or from hidden to visible with electrical current which causes their position to change within a fluid with respect to an electrode.

34. The method of claim 6 in which the two or three-dimensional image support medium, artwork, picture, work of design or work of architecture is made with organic electronics.

35. The method of claim 7 in which the two or three-dimensional image support medium, artwork, picture, work of design, or work of architecture is or has at least one display, material or technology capable of change that is one or more of: electro-optic, a reflective display, a non-light-emitting display, bistable and/or electrophoretic.

36. The method of claim 7 in which the two or three-dimensional image support medium, artwork, picture, work of design or work of architecture is made with or as a visible display device capable of change that has multiple non-light-emissive colorants capable of changing their visibility, their color or both with energy.

37. The method of claim 7 in which the two or three-dimensional image support medium, artwork, picture, work of design or work of architecture is made with one or more of: organic electronics; electronics that are transparent or translucent;

a material, a polymer or a polymeric material that is: electroactive, thermochromic, piezochromic, piezorochromic, or piezoelectric; a phase change material;

an absorbent polymer; a polymer that is re-mendable, self-healing and/or regenerative; a polymer capable of changing or responding to stimulation, a control, activation, a trigger or influence; it is made with a photorefractive polymer, a polymer gel, hydrogel, or redox polymer; or a shape memory polymer;

a photonic colorant, a photonic crystal, a photonic material, a photonic band gap material or structure, a synthetic opal or a synthetic opal containing silica spheres or imbibed with liquid crystal, polymerized crystalline colloidal arrays, or gel particles embedded in crystalline colloidal arrays;

a field emission display; or it is made with a combination of these.

38. The method of claim 7 in which the two or three-dimensional image support medium, artwork, picture, work of design or work of architecture is made with or as a technology, material or display capable of change, prepared with charged non-light-emissive colorants that are able to change from visible to hidden, or from hidden to visible with electrical current which causes their position to change within a fluid with respect to an electrode.

39. The method of claim 7 in which the two or three-dimensional image support medium, artwork, picture, work of design or work of architecture is made with or as a non-light-emissive technology, material or display that changes over time, that is prepared with: cells, globes, capsules, spheres, a honeycomb structure, or enclosed parts, electrochromic molecules, and/or micro-variations of any of these;
that is prepared with non-light-emissive colorants in one or multiple microcapsules;
and/or
that is prepared with parts that show different coloration when their position changes or when the position of their contents or parts changes.

40. The method of claim 7 in which the two or three-dimensional image support medium, artwork, picture, work of design, or work of architecture has one or more: light-emitting diodes (LEDs), liquid crystal displays (LCDs), liquid crystals, cholesteric liquid crystals, liquid crystal elastomers, and/or
one or more of these that is: at least partially flexible, relatively thin; transparent or translucent; capable of self-actuating, changing, changing interactivity or changing in a responsive way, changing or modulating in a controlled way; or a combination of these.

41. The method of claim 7 in which part or all of the finished or unfinished, two or three-dimensional image support medium, artwork, picture, work of design, or work of architecture is: transparent, translucent or light-emitting; made with two or more parts that are connected and/or separate; made so that its form has at least one open space within it; made with at least one curve or undulation; or any combination of these.

42. The method of claim 7 in which the finished or unfinished, two or three-dimensional image support medium, artwork, picture, work of design, or work of architecture has: a means of installation, mounting or display; one or more parts for mounting, installation or display; a frame, framework, support or bracing; a base, a stand or a pedestal for installation, mounting and/or display; the capability to be freestanding; the ability to scroll, roll out and/or physically unfold; or a combination of these.

43. The method of claim 7 in which the finished or unfinished two or three-dimensional image support medium, artwork, picture, work of design, or work of architecture has a means of installation, mounting or display on a wall or vertical surface or by hanging; it has a hook or wire attached to enable hanging; it has holes to enable hanging; it has a means of installation, mounting or display that leaves space between it and the wall, ceiling, floor or other structure from which it is installed, mounted or displayed; the work has a part or all of a means of installation, mounting or display hidden from view and/or entirely or largely unobvious or unapparent to viewers looking at the work as a whole; the work is installed, mounted, hung, displayed or it is wearable art or design that is worn; or a combination of these.

44. The method of claim 7 in which the two or three-dimensional image support medium, artwork, picture, work of design, or work of architecture has at least one: metal, fabric, polymer, glass, crystal, a gem; electrochromic technology, material, display or effect; projection; visible light property or effect that employs: a lens, a Fresnel lens, a grating, a lenticular lens or form, a filter, a diffraction grating, a prism, crystal, glass, a light emitting material, light emitting silicon, an electroluminescent material, reflectivity, a photochromic, dichroic, iridescent or holographic effect, material or form; or the work has a combination of any of these.

45. The method of claim 7 in which the two or three-dimensional image support medium, artwork, picture, work of design, or work of architecture has one or more:
(i) parts, areas, layers, elements, devices, mechanisms or means that are physically connected and/or physically separate, to activate, influence, create, assist or continue change, modulation or response in part or all of the work or at least one of its aesthetic elements;
(ii) means of having and using energy from a source that is part of it or separate from it; the work has: a power source, a battery, a thin film battery, a solar cell or panel, a non-silicon solar or photovoltaic cell; a photovoltaic device or cell; electronics, wiring, one or more electrical parts, cords or control buttons; a circuit, conductive ink, or a composition, material or technology that provides or carries power; one or more of these made with at least one nanomaterial; a means of conducting energy or electricity using at least one nanomaterial; one of these that is at least partially transparent or translucent, flexible, thin or very thin; one or more of these that are hidden from view and/or entirely or largely unobvious or unapparent to viewers looking at the work as a whole; and/or
(iii) a combination of these.

46. The method of claim 7 in which the two or three-dimensional artwork, picture, work of design, or work of architecture has a visible hologram or it has a visible hologram that that is one or a combination of these:
(i) its hologram appears two or three dimensional and partially or entirely intangible;
(ii) its hologram is interactive or responsive;
(iii) its hologram, or part or all of the work: can change or be changed over any period of time; can self-actuate; or is unchanging; can be changed using a means or a part that enables the work or part of the work to be interactive, controlled, modulated or changed; can be changed using a control mechanism or device; can be changed using sensing, detection or recognition capability or by touch; can be changed using programming, or using a means of activation or input; or can be changed using a wireless method, the Internet or a broadcast method; and/or
(iv) its hologram can partially or wholly: activate, trigger, stimulate, assist or produce change or modulation in the work, in part of the work, or in one or more of its aesthetic elements.

47. The method of claim 7 in which part or all of the image support medium, artwork, picture, work of design, or work of architecture, or one or more of its aesthetic elements is capable of being responsive, interactive, controlled, modulated, changed, self-actuating and/or being programmed; or the work has this capability when stimulated, activated, influenced, triggered or by programming; and/or the work has this capability when it is externally stimulated, activated, influenced or triggered.

48. The method of claim 7 in which part or all of the image support medium, artwork, picture, work of design, or work of architecture, or one or more of its aesthetic elements is activated, is able to continue to function, interacts, interacts in a responsive way, modulates and/or changes free of physical contact between any tangible part of it and a person; and/or change in, modulation in, or response from part or all of the work can be activated, triggered, assisted or continued by light or by change in light.

49. The method of claim 7 in which the work, part of the work, or one or more of its aesthetic elements changes, modulates or responds, or it can be changed, modulated or made to respond, and this change, modulation or response is: visible, audible, music, voice, sound, ceasing to emit sound, movement, ceasing to move, changing or modulating in form, shape or position, and/or changing or modulating by becoming hidden from view or by becoming visible.

50. The method of claim 7 in which the image support medium, artwork, picture, work of design or work of architecture has one or more of these specifications:
(a) it has two or more parts that are physically connected, separate or a combination of these; and/or it is made so that its form has at least one open space within it;
(b) it has two or more parts that are tiles or that are a set, grouping or compositional arrangement of tiles that is a single work;
(c) it has at least one display device and it is made and/or used with one or more additional display devices which are separate and/or physically connected; or it has one or more such additional display devices that are: interactive, light-emitting, e-materials or electronic paper displays, OLEDs, LEDs, LCDs, or a combination of these.

51. The method of claim 7 in which change in, modulation in, or response from part or all of the image support medium, artwork, picture, work of design or work of architecture, or one or more of its aesthetic elements can be activated, triggered, assisted or continued by one or more people intentionally or unintentionally, by gesture, movement and/or touch, or by the use of: a control mechanism or device; an input device or a viewer input device; touch, a touch control or a touch activated device; a drawing device; a stylus or wand to control, interact with or change the work; a trackball or a mouse; a computer or part of a computer, a computer vision system; a mechanism or device which enables control or change when pressure or stress is applied, or a combination of these.

52. The method of claim 7 in which change in, modulation in, or response from part or all of the image support medium, artwork, picture, work of design or work of architecture, or one or more of its aesthetic elements can be activated, triggered, assisted or continued from any distance, by using the Internet, using broadcasting, using wireless connection, or in a combination of these ways.

53. The method of claim 7 in which change in, modulation in, or response from part or all of the image support medium, artwork, picture, work of design or work of architecture, or one or more of its aesthetic elements can be activated, triggered, assisted or continued in one or more of these ways:
using sensing, detection or recognition capability; using a means of sensing and/or detecting plus means of responding; using movement or gesture recognition, capacitive sensing, human hand gesture recognition, motion recognition, human body motion recognition, sign language recognition, facial gesture recognition, pattern recognition, or by sensing or detecting any of these;
using sound, voice, music, speech or voice recognition, a microphone, and/or a speaker; using the work's ability to emit sound, music and/or voice;
using a technology, sensor, device or ability that is sensitive to or that detects being bent or extended; using a fabric strain device or gage; using a computer or part of a computer, or using any combination of these;
the change, modulation or response is activated, triggered, assisted or continued by: the environment or an aspect of it, temperature, magnetism, a magnetic field, a magnetic force, moisture, pressure, stress, electricity, by a subject that is physically separate from the work, by change in any of these, by a subject at any distance, or by a combination of these ways.

54. The method of claim 7 in which the two or three-dimensional image support medium, artwork, picture, work of design, or work of architecture has a means to show change in part or all of its subject matter; or
in part or all of its subject matter formed with light in one or more colors; in part or all of its subject matter that is abstract, realistic, representational, recognizable or surrealistic;
in part or all of its subject matter formed by color and/or light changing as the real version of the subject matter might change or in a manner that portrays or represents the real version of the subject matter;
in part or all of its subject matter that is a portrayal, depiction or abstraction of: a figure, an animal, a still life, landscape, nature or part of nature, a natural environment or scene or part thereof; one or more plants or flowers; the sky, the light of the sky, natural light; a recognizable subject; an illusionary depiction of spatial depth or form; a portrayal, representation or abstraction of part or all of one or more people or animals; in part of all of its subject matter that is not physically present; or
it is change in part or all of the work that resembles or looks like change in natural light, skylight or nature or it is such change visible in the work occurring in relation to change in real natural light, skylight or nature;
or a combination of these.

55. The method of claim 7 in which the two or three-dimensional image support medium, artwork, picture, work of design, or work of architecture has a means to show change in part or all of its design, its pattern, one or more of its pictorial or abstract elements, and/or some or all of its color.

56. The method of claim 7 in which the two or three-dimensional image support medium, artwork, picture, work of design, or work of architecture has the means for one or more of its visible light properties, transparency, reflectivity, emitted light and/or light effects to change or to be changed in part or all of the work.

57. The method of claim 7 in which the two or three-dimensional work is fine art, applied art, architecture, or an architectural form that is finished or unfinished.

58. The method of claim 7 in which the work is fine art or it is design that is applied art and the aesthetic work is partially or entirely: geometric, realistic, representational or abstract; the aesthetic work has two or more parts and its parts are physically connected, separate or both; or the aesthetic work meets a combination of these descriptions.

59. The method of claim 7 in which the image support medium or the finished or unfinished aesthetic work functions as: furniture, a table, a chair, a stool, a chest, a screen, a cabinet, a cart or a bench, a shade, shutters, a tile, or it is a set, grouping or compositional arrangement of these that is a single work.

60. The method of claim 7 in which the image support medium or the finished or unfinished aesthetic work has and/or functions as: a light-emitting device, lighting, lighting design, a light fixture, a window, a skylight, a lunette or a set, grouping or compositional arrangement of these.

61. The method of claim 7 in which the unfinished or finished, two or three-dimensional image support medium, artwork, picture, work of design or work of architecture functions as: a light-emitting device, lighting, lighting design, a light fixture, or a set, grouping or compositional arrangement of these, and it has one or more organic light-emitting diodes (OLEDs), one or more nanomaterials, or both.

62. The method of claim 7 in which the image support medium or the finished or unfinished aesthetic work has and/or functions as: a wall, a partition, a ceiling or a floor; a set, grouping or compositional arrangement of one or more of these that is a single work; or the work is interior design.

63. The method of claim 7 in which the image support medium or the finished or unfinished aesthetic work functions as craft design; as a basket, a case or container; as a work of design for household use; or it functions for spiritual or religious use, as an alter, or a menorah; and/or it is a work with a visible element indicating its religious or spiritual function.

64. The method of claim 7 in which the image support medium or the finished or unfinished aesthetic work functions as wearable art, wearable design, fashion design, clothing design or as a costume; it is partially or entirely woven; it is or has a textile; or a combination of these.

65. The method of claim 7 in which the image support medium or the finished or unfinished aesthetic work functions as jewelry, as a fashion or clothing accessory, as a bracelet, necklace, pin, earrings, an anklet, a ring, a handbag, a hat, a belt or a tote bag.

66. The method of claim 7 in which the unfinished or finished, two or three-dimensional image support medium, artwork, picture or work of design is: wearable art, wearable design, fashion design, clothing design, a costume, a textile, jewelry, a bracelet, a necklace, a pin, earrings, an anklet, a ring, a fashion or clothing accessory, a handbag, a hat, a belt or a tote bag, and it has one or more organic light-emitting diodes (OLEDs), e-material or electronic paper devices, and/or one or more nanomaterials.

67. The method of claim 7 in which the image support medium or the finished or unfinished aesthetic work is accompanied by instructions for developing it as or into art, a picture, design or architecture, or for modifying or changing it; it is accompanied by instructions for displaying it as art, a picture, design or architecture; and/or
   it is made by one image-maker or by one group of image-makers, and transferred to one or more different image makers and/or viewers who further develop it, display it or both.

68. The method of claim 7 in which the image support medium or the aesthetic work provides the means for a unique work of art or design to be created on it, in it, with it or a combination of these way, and the image-making support or the aesthetic work provides image-making options that are greater, more complex or different than a viewing device that only to displays photographs, video or film made externally and input into it; or
   such an image-making support or aesthetic work is also capable of being displayed on a table; it is made with an extreme minimal style means of display with an extreme minimal style frame; or
   the image-making support or aesthetic work has a combination of these features.

69. The method of claim 7 in which the two or three-dimensional image support medium, artwork, picture or work of design or work of architecture has a minimal or minimalistic style or aesthetic.

\* \* \* \* \*

UNITED STATES PATENT AND TRADEMARK OFFICE
CERTIFICATE OF CORRECTION

| | |
|---|---|
| PATENT NO. | : 9,744,800 B2 |
| APPLICATION NO. | : 14/203327 |
| DATED | : August 29, 2017 |
| INVENTOR(S) | : Sydney Hyman |

It is certified that error appears in the above-identified patent and that said Letters Patent is hereby corrected as shown below:

At Column 46, Lines 26-67 and Column 47, Lines 1-52 (Claim 4): Please delete all this text and replace it with the following:
--A method of making a macroscopic, two or three dimensional image-making support medium which is a new reinvented version of a conventional utilitarian fine artist's canvas, canvas panel, canvas pad, art board, or drawing pad, the novel image support medium facilitates artistic expression and the creation and display of two or three-dimensional macroscopic art, design that is applied art, and/or architecture, made therewith, thereupon and/or therefrom, and the method requires making or developing the work with or as one or more display devices that are two or three dimensional, making or developing the work so that it is macroscopic, and so that it is a whole in and of itself with distinct edges or boundaries, and making or developing the work with the means to show a two or three-dimensional artwork, picture or design that is applied art that changes over time from one or more of its sides or angles, and making or developing the work as or with at least one display device that is light emissive or non-light-emissive, or a compositional arrangement with two or more such display devices, and in addition making or developing the work with the means for using one or more display devices for the creation, development, change and/or recreation of an aesthetic work that is: art, a work of design that is applied art, a picture or an architectural work or part thereof, one time, twice, multiple times and/or in an ongoing process employing one or more image making options that are greater and/or more complex than those on a viewing device for displaying externally produced images input into it, with the visual effect that can be created, changed and/or recreated visible from one or more of the work's sides or angles, and with this visual effect more complex than or other than that from a conventional on/off switch or dimmer;

thus as an option, two or three-dimensional art, design, pictures and/or architecture can be created, developed, changed and/or recreated in a process in which one or more finished or unfinished sketches, versions, variations, works in progress and/or images are generated over any period of time, using one or more of the work's sides or angles;

in addition, the aesthetic work made or developed according to the specifications above is also made or developed according to one or more of (i) – (xi) below:

Signed and Sealed this
Twenty-second Day of May, 2018

Andrei Iancu
*Director of the United States Patent and Trademark Office*

(i) making or developing the aesthetic work so that it is: sculpture, a mobile, a mural, an openwork form, a kinetic work, pictorial, a painting, fine art, collage, a work of design that is applied art, architecture, an abstract work of art or an abstract work of design that is applied art, a wearable work of art and/or a wearable work of design that is applied art; or making or developing the aesthetic work so that it shows: a figure, an animal, a still life, landscape, nature, the sky, a part or aspect of any of these, subject matter that is not physically present, drawing, painting, an imprimatura, underpainting, collage, a pattern, a depiction or representation of a recognizable subject; a visual effect or design resembling that in a well-known work of art or design or resembling that by a well-known artist or designer; an overall aesthetic shape or form that is figurative or that depicts or represents a recognizable subject; a visible aesthetic element free or nearly free of visible legible text that is pictorial or a design that is applied art; one or more of these that changes or that can be changed over time; or a combination of these;

(ii) making or developing the image support medium and/or aesthetic work so that it resembles a conventional artist's canvas, canvas panel, canvas pad, art board or drawing pad; making it as an image making book, as an image making pad or so that it resembles a conventional image making book or pad; making or developing it with deckled edges, irregularities resembling handmade paper, and/or texture resembling conventional canvas;

making or developing the image support medium or the aesthetic work so that it has an aesthetic texture made by taking one or more positive or negative impressions from one or more organic or natural materials or so that it has an aesthetic texture resembling this;

(iii) making or developing the image support medium and/or aesthetic work with a means of display or installation like or resembling that used on a conventional artwork or picture;

making or developing it with one or more of: a matt or a frame; a means of hanging; a means of mounting or installation on a vertical support or a wall; a pedestal or base; a means that enables it to be freestanding or vertically freestanding; a means by which it can roll, scroll and/or fold; a rigid mount system, a wire mount system, or a combination rigid and wire mount system; or a means of installation, mounting or display that displays it leaving space between it and the wall, ceiling, floor or other structure from which it is installed, mounted or presented; and/or hanging, installing or mounting the aesthetic work for display as art;

(iv) making or developing the image support medium or the aesthetic work so that most or all of its utilitarian elements are hidden from view and/or entirely or predominantly unobvious or unapparent to viewers looking at it as a whole, or most or all of its utilitarian elements are integrated in this way when the work is inactive;

(v) making or developing the aesthetic work so that it shows the signature or distinguishing mark identifying the artist, designer or group of artists and/or designers who created it which is other than the mark of an industrial or commercial manufacturer or scientific organization; or preparing the aesthetic work with a title as art or design that is applied art;

(vi) cleaning the surface of the image support medium or the aesthetic work sufficiently to render it receptive to superimposed artists' paint, so that it has enhanced bond strength and permanence;

(vii) making or developing the image support medium or the aesthetic work with a fine-art stabilizer and/or a surface preparation stabilizer that bonds to or enhances its bond to one or more superimposed conventional artists' paints;

(viii) accompanying the image making support medium or the aesthetic work with instructions for developing it, instructions for modifying or changing it, and/or instructions for displaying it;

(ix) making or developing the aesthetic work that so that it has two or more superimposed layers contributing to its visible aesthetic as a whole work, (with at least one of these layers separate from the utilitarian function of a device if the work has a device), so that the aesthetic work has at least one underlayer visible through at least one superimposed layer that is at least partially transparent or translucent, that has at least one negative space, or that has a combination of these visible features;

(x) making or developing the aesthetic work so that it is:

(a) capable of serving as: furniture, a table, a chair, a stool, a chest, a cabinet, a cart, a bench, or as a set, grouping or compositional arrangement of these that is a single work; (b) capable of serving as: a tile or as a set, grouping or compositional arrangement of tiles that is a single work; (c) capable of serving as: a door, a partition, a screen, or a set, grouping or compositional arrangement of these that is a single work; (d) capable of serving as: a gate, a fence, a column, a stage set, a tent, an awning, a fountain, a candelabrum, or a set, grouping or compositional arrangement of these that is a single work; (e) capable of serving as: a basket, a case or container, or a set, grouping or compositional arrangement of these that is a single work; (f) capable of serving as lighting, a light fixture or as a set, grouping or compositional arrangement of these that is a single work; (g) capable of serving as: a window, a skylight, a lunette, or as a set, grouping or compositional arrangement of these that is a single work; (h) capable of serving as: shades, shutters, or a set, grouping or compositional arrangement of these that is a single work; (i) capable of serving as: an architectural form or structure, a building facade, stairs, a crosswalk or a bridge; (j) capable of serving as a wall, a ceiling or a floor; (k) capable of serving as craft design that is applied art; (l) capable of serving as: a work of design that is applied art for home use, or as a vase, a bowl, a tray, a cup, a goblet, a plate a dish, a pitcher, soup tureen or a placemat; (m) capable of serving as work of art, as design that is applied art, or as architecture for spiritual or religious use, or as an altar, or a menorah; (n) capable of serving as: a book or pad that is a new version of the conventional image making blank book or blank paper pad capable of being developed into visual pictorial image; capable of serving as a plurality of associated sheets arranged in a book or pad form capable of use for image making; or capable of serving as book design, optimally nearly free or free of visible legible text; (o) capable of serving as graphic art or graphic design; (p) capable of serving as a wearable work of art or design as fashion design and/or as a costume; (q) capable of serving as: a fashion or clothing accessory, a hat, belt, a handbag or a tote bag; (r) capable of serving as jewelry, a necklace, bracelet, pin, or ring; or (s) capable of a combination of any of these; and/or (xi) making or developing the work with the means to change one or more visible aesthetic elements by the use of one or more of: gesture and/or movement control, detection, sensing and/or recognition technology; capacitive sensing technology, 3D capacitive sensing technology, active capacitive sensing technology, gesture recognition technology, a computer vision system, human hand gesture recognition technology, human body motion recognition technology, motion recognition technology, sign language recognition technology, facial gesture recognition technology, face recognition technology, and/or pattern recognition technology; and making or developing the aesthetic work according to the description above, with one or more of (i) – (xi) above, and in addition, making or developing the aesthetic work so that it is free from any separate alternative functionality or purpose that differs from that described in this claim, so that it is free of being purely commercial or informational, and so that it is also other than a conventional computer, camera, phone, personal digital assistant device, portable media player device, a utilitarian wrist watch or a conventional window that changes uniformly to serve purely utilitarian purposes.--.

At Column 47, Line 61 (Claim 5, Line 53), delete "it's" and insert --its--.

At Column 48, Lines 52-65 (Claim 6): Please delete all this text and replace it with the following:
--6. The method of claim 3 which further comprises providing an interactive or responsive feature that is integrated into the image-making art-design medium or work as a whole wherein most or all utilitarian elements of the interactive or responsive feature are hidden from view or are entirely or predominantly unobvious or unapparent to viewers looking at the whole, or they are integrated in this way until the image making art-design medium or work is activated.--.

At Column 52, Line 6 (Claim 13, Line 3), delete "its".

At Column 53, Line 6 (Claim 20, Line 49), delete "it's".

At Column 54, Line 53 (Claim 20, Line 49), delete "it's".

At Column 55, Line 10 (Claim 20, Line 49), delete "it's".

At Column 59, Line 41 (Claim 21, Line 6), delete "it's".

At Column 59, Line 55 (Claim 21, Line 6), delete "it's".

At Column 60, Line 5 (Claim 21, Line 6), delete "it's".

At Column 60, Line 52 (Claim 21, Line 6), delete "it's".

At Column 60, Line 57 (Claim 21, Line 6), delete "it's" and insert --its--.

At Column 60, Line 62 (Claim 21, Line 6), delete "it's" and insert --its--.

At Column 60, Line 67 (Claim 21, Line 6), delete "it's" and insert --its--.

At Column 65, Line 48 (Claim 22, Line 44), delete "it's".

At Column 69, Line 16 (Claim 23, Line 40), delete "it's".

At Column 70, Line 52 (Claim 24, Line 52), delete "Ihe." and insert --the--.

At Column 70, Line 55 (Claim 24, Line 52), delete "Ihe sky." and insert --the sky,--.

At Column 70, Line 56 (Claim 24, Line 52), delete "Ihe" and insert --the--.

At Column 70, Line 66 (Claim 24, Line 52), delete "arc" and insert --are--.

At Column 71, Line 1 (Claim 24, Line 52), delete "arc" and insert --are--.

At Column 71, Line 6 (Claim 24, Line 52), delete "discontinuously." and insert --discontinuously,--.
At Column 71, Line 10 (Claim 24, Line 52), delete "(he" and insert --the--.

At Column 71, Line 22 (Claim 21, Line 52), delete "non-light-emissive." and insert --non-light-emissive,--.

At Column 71, Line 24 (Claim 24, Line 52), delete "art." and insert --art,--.

At Column 75, Line 45 (Claim 32, Line 45), delete "6" and insert --4--.

At Column 76, Line 5 (Claim 33, Line 5), delete "6" and insert --4--.

At Column 76, Line 24 (Claim 34, Line 5), delete "6" and insert --4--.